(12) United States Patent
Barton et al.

(10) Patent No.: US 10,747,243 B2
(45) Date of Patent: *Aug. 18, 2020

(54) HVAC CONTROLLER WITH HVAC SYSTEM FAILURE DETECTION

(75) Inventors: Eric Barton, Eden Prairie, MN (US);
Cary Leen, Hammond, WI (US); Stan Zywicki, Eden Prairie, MN (US);
David Schultz, Savage, MN (US);
Mohammad Aljabari, Brooklyn Park, MN (US)

(73) Assignee: Ademco Inc., Golden Valley, MN (US)

( * ) Notice: Subject to any disclaimer, the term of this patent is extended or adjusted under 35 U.S.C. 154(b) by 546 days.

This patent is subject to a terminal disclaimer.

(21) Appl. No.: 13/325,315

(22) Filed: Dec. 14, 2011

(65) Prior Publication Data

US 2013/0158715 A1   Jun. 20, 2013

(51) Int. Cl.
*G05D 23/19* (2006.01)

(52) U.S. Cl.
CPC ................................ *G05D 23/1902* (2013.01)

(58) Field of Classification Search
None
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong | |

(Continued)

FOREIGN PATENT DOCUMENTS

| | | |
|---|---|---|
| DE | 3334117 | 4/1985 |
| EP | 0070414 | 1/1983 |

(Continued)

OTHER PUBLICATIONS

NPL_1: puleed from https://www.engineersedge.com/heat_exchanger/ac_evap_conden.htm, on Oct. 19, 2017.*

(Continued)

*Primary Examiner* — James J Lee
*Assistant Examiner* — Christopher W Carter
(74) *Attorney, Agent, or Firm* — Shumaker & Sieffert, P.A.

(57) ABSTRACT

An HVAC controller that monitors a current performance level of an HVAC system, and determines if the current performance level falls below a minimum performance threshold level for at least a first predetermined amount of time. The HVAC controller may be configured it display an alert on the display of the HVAC controller if the HVAC controller determines that the current performance level has fallen below the minimum performance threshold level for at least the first period of time. In some cases, the HVAC controller may remove the alert from the display of the HVAC controller if the current performance level subsequently rises and remains above the minimum performance threshold level for at least a second predetermined amount of time. In some cases, the first predetermined amount of time may include a utility shutoff period component and/or a defrost cycle period component.

21 Claims, 47 Drawing Sheets

(56) References Cited

U.S. PATENT DOCUMENTS

| | | |
|---|---|---|
| 4,298,946 A | 11/1981 | Hartsell et al. |
| 4,308,991 A | 1/1982 | Peinetti et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,709,554 A * | 12/1987 | Umemura et al. ............ 62/156 |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Metha |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Metha et al. |
| 5,348,078 A | 9/1994 | Dushane et al. |
| 5,351,035 A | 9/1994 | Chrisco |
| 5,369,597 A | 11/1994 | Bujak, Jr. |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown, Jr. et al. |
| 5,782,296 A | 7/1998 | Metha |
| 5,810,908 A | 9/1998 | Gray et al. |
| 5,818,428 A | 10/1998 | Eisenbrandt et al. |
| 5,833,134 A | 11/1998 | Ho et al. |
| 5,839,654 A | 11/1998 | Weber |
| 5,840,094 A | 11/1998 | Osendorf et al. |
| 5,862,737 A | 1/1999 | Chin et al. |
| 5,873,519 A | 2/1999 | Beilfuss |
| 5,886,697 A | 3/1999 | Naughton et al. |
| 5,901,183 A | 5/1999 | D' Souza |
| 5,902,183 A | 5/1999 | D' Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 6,009,355 A | 12/1999 | Obradovich et al. |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,351,693 B1 | 2/2002 | Monie et al. |
| 6,344,861 B1 | 3/2002 | Naughton et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |

(56) References Cited

U.S. PATENT DOCUMENTS

| | | |
|---|---|---|
| 6,580,950 B1 | 6/2003 | Johnson et al. |
| 6,581,846 B1 | 6/2003 | Rosen |
| 6,595,430 B1 | 7/2003 | Shah |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,663,010 B2 | 12/2003 | Chene et al. |
| 6,685,098 B2 | 2/2004 | Okano et al. |
| 6,726,112 B1 | 4/2004 | Ho |
| D492,282 S | 6/2004 | Lachello et al. |
| 6,783,079 B2 | 8/2004 | Carey et al. |
| 6,786,421 B2 | 9/2004 | Rosen |
| 6,789,618 B2 * | 9/2004 | Pearson ............... F24F 11/0001 165/210 |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,868,293 B1 | 3/2005 | Schurr et al. |
| D512,208 S | 12/2005 | Kubo et al. |
| 6,973,410 B2 | 12/2005 | Seigel |
| 7,001,495 B2 | 2/2006 | Essalik et al. |
| D520,989 S | 5/2006 | Miller |
| 7,050,026 B1 | 5/2006 | Rosen |
| 7,055,759 B2 | 6/2006 | Wacker et al. |
| 7,080,358 B2 | 7/2006 | Kuzmin |
| 7,083,109 B2 * | 8/2006 | Pouchak ....................... 236/1 E |
| 7,083,189 B2 | 8/2006 | Ogata |
| 7,084,774 B2 | 8/2006 | Martinez |
| 7,089,088 B2 | 8/2006 | Terry et al. |
| 7,108,194 B1 | 9/2006 | Hankins, II |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al. |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,261,762 B2 | 8/2007 | Kang et al. |
| 7,274,973 B2 | 9/2007 | Nichols et al. |
| 7,302,642 B2 | 11/2007 | Smith et al. |
| 7,331,187 B2 | 2/2008 | Kates |
| 7,341,201 B2 | 3/2008 | Stanimirovic |
| 7,354,005 B2 | 4/2008 | Carey et al. |
| RE40,437 E | 7/2008 | Rosen |
| 7,419,532 B2 | 9/2008 | Sellers et al. |
| 7,435,278 B2 | 10/2008 | Terlson |
| 7,451,606 B2 | 11/2008 | Harrod |
| 7,452,396 B2 | 11/2008 | Terlson et al. |
| 7,496,627 B2 | 2/2009 | Moorer et al. |
| 7,505,914 B2 | 3/2009 | McCall |
| 7,542,867 B2 | 6/2009 | Steger et al. |
| 7,556,207 B2 | 7/2009 | Mueller et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,676,282 B2 | 3/2010 | Bosley |
| 7,707,189 B2 | 4/2010 | Haselden et al. |
| 7,713,339 B2 | 5/2010 | Johansson |
| 7,739,282 B1 | 6/2010 | Smith et al. |
| 7,770,242 B2 | 8/2010 | Sell |
| 7,793,056 B2 | 9/2010 | Boggs et al. |
| 7,814,516 B2 | 10/2010 | Stecyk et al. |
| 7,849,700 B2 * | 12/2010 | Seefeldt ........................ 62/185 |
| 7,865,252 B2 | 1/2011 | Clayton |
| 7,941,431 B2 | 5/2011 | Bluhm et al. |
| 7,952,485 B2 | 5/2011 | Schechter et al. |
| 7,957,775 B2 | 6/2011 | Allen, Jr. et al. |
| 7,984,220 B2 | 7/2011 | Gerard et al. |
| 8,032,254 B2 | 10/2011 | Amundson et al. |
| 8,087,593 B2 | 1/2012 | Leen |
| 8,091,796 B2 | 1/2012 | Amundson et al. |
| 8,167,216 B2 | 5/2012 | Schultz et al. |
| 8,239,066 B2 | 8/2012 | Jennings et al. |
| 8,280,556 B2 * | 10/2012 | Besore et al. ................. 700/278 |
| 8,548,630 B2 * | 10/2013 | Grohman ....................... 700/276 |
| 8,902,071 B2 | 12/2014 | Barton et al. |
| 8,939,827 B2 * | 1/2015 | Boudreau ............. F24F 12/006 454/252 |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0014179 A1 | 1/2003 | Szukala et al. |
| 2003/0018241 A1 * | 1/2003 | Mannheimer ................. 600/300 |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2004/0193324 A1 | 3/2004 | Hoog et al. |
| 2004/0074978 A1 | 4/2004 | Rosen |
| 2004/0133314 A1 | 7/2004 | Ehlers et al. |
| 2004/0177627 A1 * | 9/2004 | Fujimoto ............... F24F 12/006 62/151 |
| 2004/0245352 A1 | 12/2004 | Smith |
| 2004/0262410 A1 | 12/2004 | Hull |
| 2005/0028539 A1 * | 2/2005 | Singh ....................... A23G 9/00 62/127 |
| 2005/0083168 A1 | 4/2005 | Beitenbach |
| 2005/0119794 A1 * | 6/2005 | Amundson et al. .......... 700/276 |
| 2005/0270151 A1 | 12/2005 | Winick |
| 2006/0032379 A1 | 2/2006 | Kates |
| 2006/0071086 A1 | 4/2006 | Kates |
| 2006/0150644 A1 * | 7/2006 | Wruck ............................ 62/126 |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2007/0013534 A1 | 1/2007 | DiMaggio |
| 2007/0029397 A1 | 2/2007 | Mueller et al. |
| 2007/0045429 A1 | 3/2007 | Chapman, Jr. et al. |
| 2007/0114293 A1 | 5/2007 | Gugenheim |
| 2007/0114295 A1 | 5/2007 | Jenkins |
| 2007/0277061 A1 | 11/2007 | Ashe |
| 2007/0278320 A1 * | 12/2007 | Lunacek et al. ................. 236/94 |
| 2007/0289731 A1 | 12/2007 | Deligiannis et al. |
| 2008/0015740 A1 | 1/2008 | Osann, Jr. |

(56) References Cited

U.S. PATENT DOCUMENTS

| | | | |
|---|---|---|---|
| 2008/0276638 A1* | 11/2008 | Seefeldt | 62/238.7 |
| 2009/0140056 A1 | 6/2009 | Leen | |
| 2009/0140060 A1 | 6/2009 | Stoner et al. | |
| 2009/0140062 A1 | 6/2009 | Amundson et al. | |
| 2009/0143879 A1 | 6/2009 | Amundsom et al. | |
| 2009/0143880 A1 | 6/2009 | Amundson et al. | |
| 2009/0143916 A1 | 6/2009 | Boll et al. | |
| 2009/0143918 A1 | 6/2009 | Amundson et al. | |
| 2009/0165644 A1 | 7/2009 | Campbell | |
| 2009/0199212 A1 | 8/2009 | Schneider | |
| 2010/0008422 A1 | 1/2010 | Shimizu et al. | |
| 2010/0030396 A1* | 2/2010 | Patterson et al. | 700/300 |
| 2010/0084482 A1 | 4/2010 | Kennedy et al. | |
| 2010/0102973 A1* | 4/2010 | Grohman et al. | 340/584 |
| 2010/0107112 A1 | 4/2010 | Jennings et al. | |
| 2010/0161574 A1 | 6/2010 | Davidson et al. | |
| 2010/0197238 A1 | 8/2010 | Pathuri et al. | |
| 2010/0204834 A1 | 8/2010 | Comerford et al. | |
| 2010/0206869 A1* | 8/2010 | Nelson | F24D 11/02 219/494 |
| 2011/0061527 A1 | 3/2011 | Sullivan | |
| 2011/0078515 A1 | 3/2011 | Yasukawa | |
| 2011/0093424 A1 | 4/2011 | Zimmermann et al. | |
| 2011/0185895 A1 | 8/2011 | Freen | |
| 2012/0310418 A1* | 12/2012 | Harrod et al. | 700/276 |
| 2012/0318073 A1 | 12/2012 | Zavodny et al. | |
| 2012/0318135 A1 | 12/2012 | Hoglund et al. | |
| 2012/0318137 A1 | 12/2012 | Ragland et al. | |
| 2012/0318138 A1 | 12/2012 | Bisson et al. | |
| 2012/0319851 A1 | 12/2012 | Hoglund et al. | |
| 2012/0323374 A1 | 12/2012 | Dean-Hendricks et al. | |
| 2012/0323375 A1 | 12/2012 | Dean-Hendricks et al. | |
| 2012/0323377 A1 | 12/2012 | Hoglund et al. | |

FOREIGN PATENT DOCUMENTS

| | | |
|---|---|---|
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 2138919 | 12/2009 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 02/23744 | 3/2002 |
| WO | WO 2010/021700 | 2/2010 |

OTHER PUBLICATIONS

"Comfort™ Programmable Owner's Manual," Carrier Touch-N-Go™, 60 pages, 2010. Catalog No. 0M-TCPHP-4CA, Replaces: OM-TCPHP-3CA.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes-200-08-28-Dallas Business Journal," http://bizjournals.com/dallas/stories/2000/08/28/focus4, 3 pages, dated Aug. 28, 2000, printed Aug. 19, 2000.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, Downloaded Sep. 9, 2011. 2.0.105.
"Spotlight on integrated systems," Custom Builder, V8, N2, p. 66(6), Mar.-Apr. 1993.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review,"Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control, Installation, Start-Up, and Operating Instructions," pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/434,778, filed Mar. 29, 2012.

(56) References Cited

OTHER PUBLICATIONS

U.S. Appl. No. 13/227,395, filed Sep. 11, 2011.
U.S. Appl. No. 13/325,300, filed Dec. 14, 2011.
U.S. Appl. No. 13/325,503, filed Dec. 14, 2011.
U.S. Appl. No. 13/325,515, filed Dec. 14, 2011.
U.S. Appl. No. 13/325,525, filed Dec. 14, 2011.
U.S. Appl. No. 13/325,554, filed Dec. 14, 2011.
U.S. Appl. No. 13/325,617, filed Dec. 14, 2011.
U.S. Appl. No. 13/326,553, filed Dec. 15, 2011.
U.S. Appl. No. 13/415,743, filed Mar. 8, 2012.
U.S. Appl. No. 13/420,120, filed Mar. 14, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.
Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System For Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011. 50/1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Homeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents,"53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://hunter-thermostats.com/hunter_programmable_thermostats.html, Hunter Thermostat 44668 Specifications, and 44758 and Specifications, 2 pages, printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.

(56) References Cited

OTHER PUBLICATIONS

OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 For All Programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 22 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/ Single Stage Cool or Single Stage Heat Pump/Manual Changeover, 1 page, prior to Jul. 7, 2004.
www.icmcontrols.com, Simplecomfort, SC3001 Single Stage Heat/ Single Stage Cool or Single Stage Heat Pump/Manual Changeover, 1 page, prior to Jul. 7, 2004.
www.icmcontrols.com, Simplecomfort, SC3006 Single Stage Heat/ Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
"Air Conditioner Evaporator and Condenser—Heat Exchanger," Machinery's Handbook, 29th Edition, accessed from https://www.engineersedge.com/heat_ exchanger lac_ evap conden.htm on or about Oct. 19, 2017, 1 pp.

* cited by examiner

HVAC CONTROLLER WITH HVAC SYSTEM FAILURE DETECTION

TECHNICAL FIELD

This disclosure relates generally to HVAC systems, and more particularly, to HVAC controllers that may be used for controlling HVAC systems.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. The performance of many HVAC systems can degrade over time, fail, or otherwise operate in a less than ideal manner, which can produce undesirable results.

SUMMARY

This disclosure relates generally to HVAC systems, and more particularly, to HVAC controllers that may be used for controlling such HVAC systems.

In some illustrative embodiments, an HVAC controller may be configured to monitor one or more signals related to a current performance level of the HVAC system and determine if the current performance level falls below a minimum performance threshold level for at least a first predetermined amount of time. In some cases, the one or more signals received form the HVAC system relate to a current delta T of the HVAC system. The HVAC controller may be configured to display an alert on the display of the HVAC controller if the HVAC controller determines that the current performance level has fallen below the minimum performance threshold level for at least the first period of time. In some cases, HVAC controller may be configured to display an alert on the display of the HVAC controller if the HVAC controller determines that the current performance level has fallen below the minimum performance threshold level for at least two or more periods of time. In some cases, the HVAC controller may remove the alert from the display of the HVAC controller if the current performance level subsequently rises and remains above the minimum performance threshold level for at least a second predetermined amount of time. The alert may be recorded in a log stored in a memory of the HVAC controller. In some cases, the first predetermined amount of time may include a utility shutoff period component and/or a defrost cycle period component.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
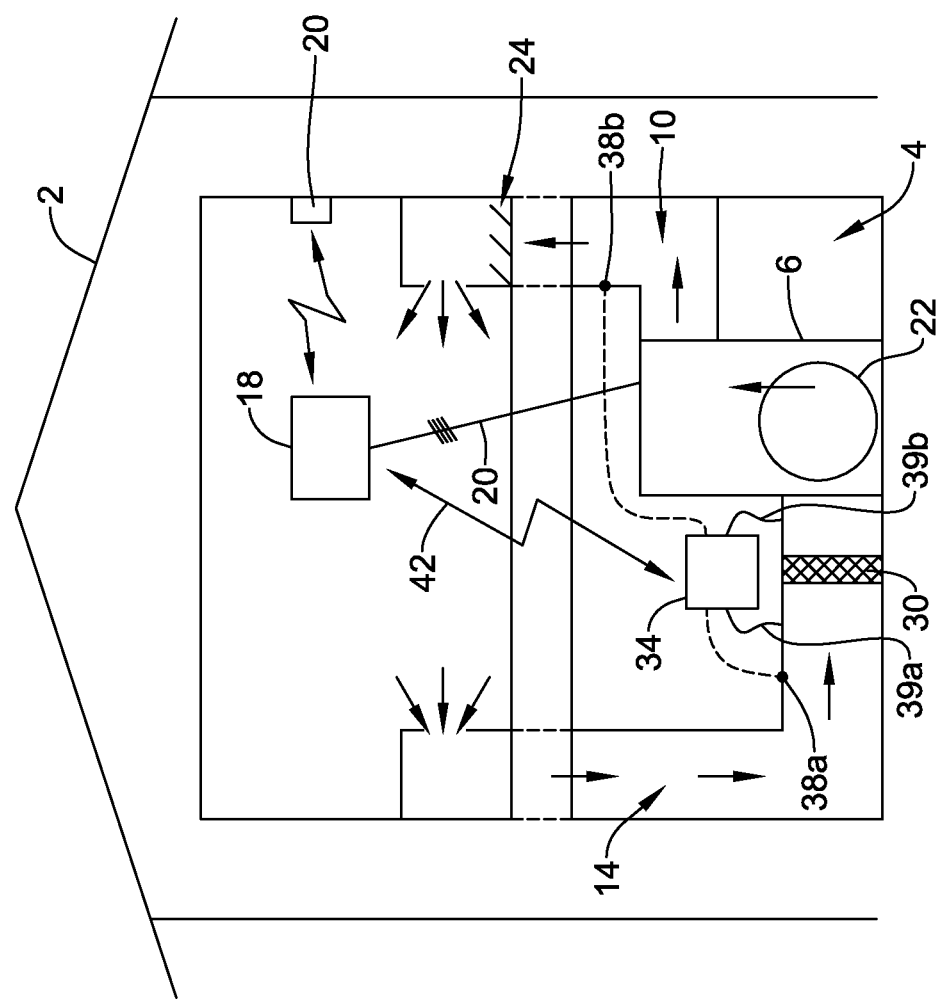
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 that may allow one or more of the HVAC components, as described herein, to communicate over the internet or other wide area network (WAN).

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
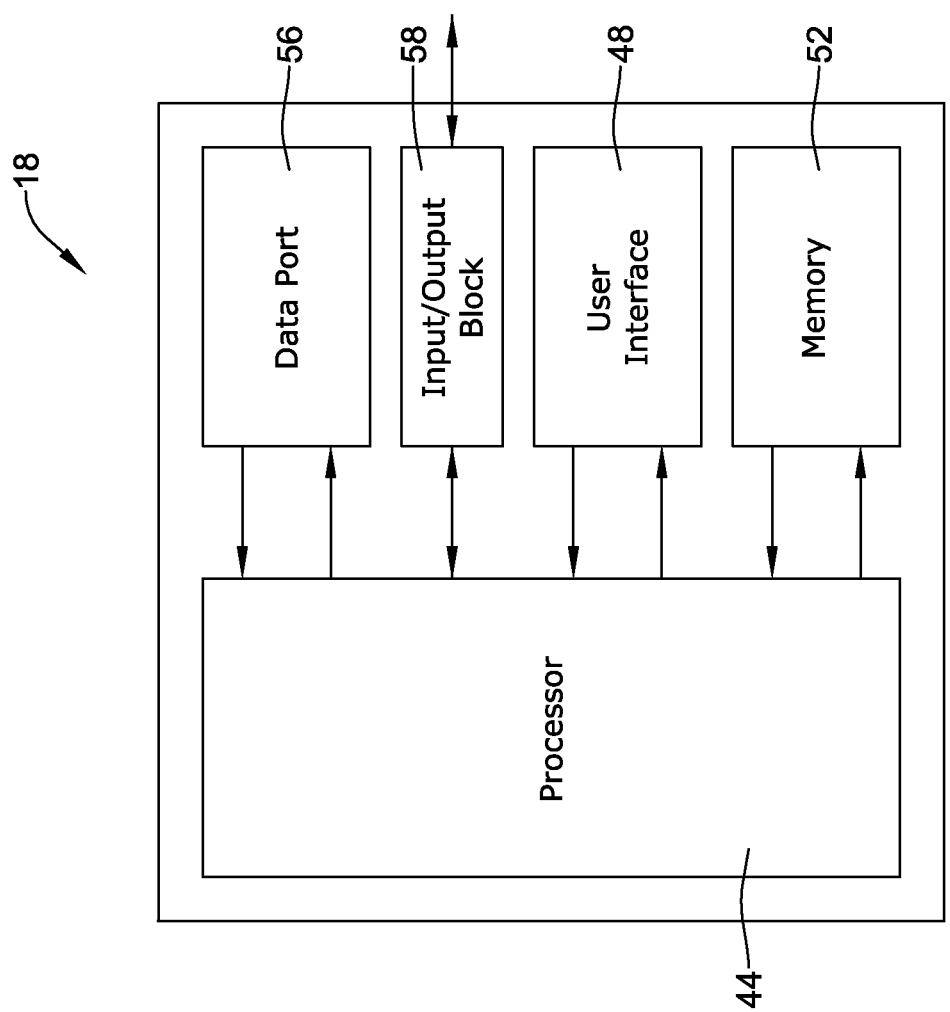
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a processor (e.g. microprocessor, microcontroller, etc.) 44, a user interface 48, and a memory 52. In some cases, the HVAC controller 18 may optionally include an input/output block (I/O block) 58 for receiving one or more signals from the HVAC system and/or for providing one or more control signals to the HVAC system. The I/O block 58 may communicate with one or more HVAC components 6 of the HVAC system 4. Alternatively, or in addition, the I/O block 58 may communicate with another controller, which is in communication with one or more HVAC components 6 of the HVAC system 4, such as a zone panel in a zoned HVAC system.

The processor 44 may operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, HVAC controller 18 may include a timer (not shown). The timer may be integral to the processor 44 or may be provided as a separate component.

In the illustrative embodiment of FIG. 2, user interface 48 may be any suitable use interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, and the like. In some cases, user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative HVAC controller 18 may be in communication with the processor 44. Memory 52 may be used to store any desired information, such as the aforementioned control algorithm, set points, schedule times, diagnostic limits such as, for example, differential pressure limits, delta T limits, and the like. Memory 52 may be any suitable type of storage device including, but not limited to, RAM, ROM, EPROM, flash memory, a hard drive, and/or the like. In some cases, processor 44 may store information within memory 52, and may subsequently retrieve the stored information.

In some cases, the processor 44 may be programmed to monitor one or more signals received from the HVAC system, either directly or via the I/O block 58, to determine whether or not the HVAC system has violated a predetermined diagnostic limit for a selected parameter stored in the controller memory 52. In some cases, for example, the processor 44 may monitor the signals from the HVAC system to determine whether or not the HVAC system has violated a predetermined delta T limit for either the heating and/or cooling mode. A violation of a predetermined diagnostic limit such as, for example a delta T limit, may occur if the HVAC system fails to reach a minimum delta T limit or exceeds a maximum delta T limit. In some cases, a violation may occur, for example, if the HVAC system fails to meet or exceed a minimum delta T limit within a predetermined period of time. These are just some examples. The diagnostic limits and the conditions for violating a diagnostic limit can be dependent upon the HVAC system set-up, the number and type of HVAC components included in the HVAC system, whether or not the HVAC system is subject to a utility load shutoff, user preference, user specified conditions for determining a diagnostic fault, and/or the like.

In many cases, when a diagnostic limit has been violated, the processor 44 may be configured to indicate to the user that a diagnostic fault has occurred. This may be accomplished in any of a variety of ways. For example, if the processor 44 has determined that a diagnostic limit has been violated, and a diagnostic fault has occurred, the processor 44 may display a user alert on the display of the user interface 48 of the HVAC controller 18. In some cases, the processor 44 may be programmed to alert the user to a diagnostic fault only after a predetermined number of faults are detected by the processor 44. In some cases, the user alert may be a simple text string displayed on the display of the user interface 48 describing the nature of the violation that has occurred. In other instances, the processor 44 may provide some visual indication to alert the user that a fault has occurred. Such visual indication may include a colored, flashing, highlighted, or grayed-out button or icon provided on the user interface 48. In still other instances, the processor 44 may be configured to send an email, instant message, text message or some other message to a user to alert the user that a fault has occurred via an internet gateway or other device (e.g. internet gateway 20 of FIG. 1) that is adapted to communicate over the internet or other wide area network. Such an alert may be provided to the user even when the user is away from the home, building, or other structure in which the HVAC system is located.

In some instances, as will be described in greater detail herein, the processor 44 may also be programmed to query a user via the user interface 48 for one or more conditions that specify when a user is not to be alerted to a detected fault of the HVAC system. The user may specify one or more conditions for when the HVAC controller 18 is not to alert a user to a detected fault for each heating and/or cooling stage of the HVAC system, as desired. For example, the user may specify that the user is not to be alerted to a diagnostic fault when the diagnostic fault occurs during a utility shutoff period or a defrost cycle. Regardless of whether or not indication of a fault is provided to a user, the processor 44 may be programmed to record the fault in a faults log stored in the memory 52 of the processor 44. An illustrative log is shown and described in co-pending U.S. application Ser. No. 13/227,395, entitled, "HVAC Controller Including User Interaction Log," filed on Sep. 7, 2011, which is incorporated herein by reference in its entirety and for all purposes.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CATS port, a USB (universal serial bus) port, and/or the like. In some instances, data port 56 may be a USB port and may be used to download and/or upload information from a USB flash drive or some other data source. Other remote devices may also be employed, as desired.

Data port 56 may be configured to communicate with processor 44 and may, if desired, be used to upload information to processor 44 and/or download information from processor 44. Information that can be uploaded and/or downloaded may include, for example, values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats, hastening their programming process. In some cases, data port 56 may be used to upload and/or download information pertaining to an HVAC dealer or contractor, if desired.

In some cases, data port 56 may be used to download data stored within the memory 52 for analysis. For example, data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required.

Figure 3:
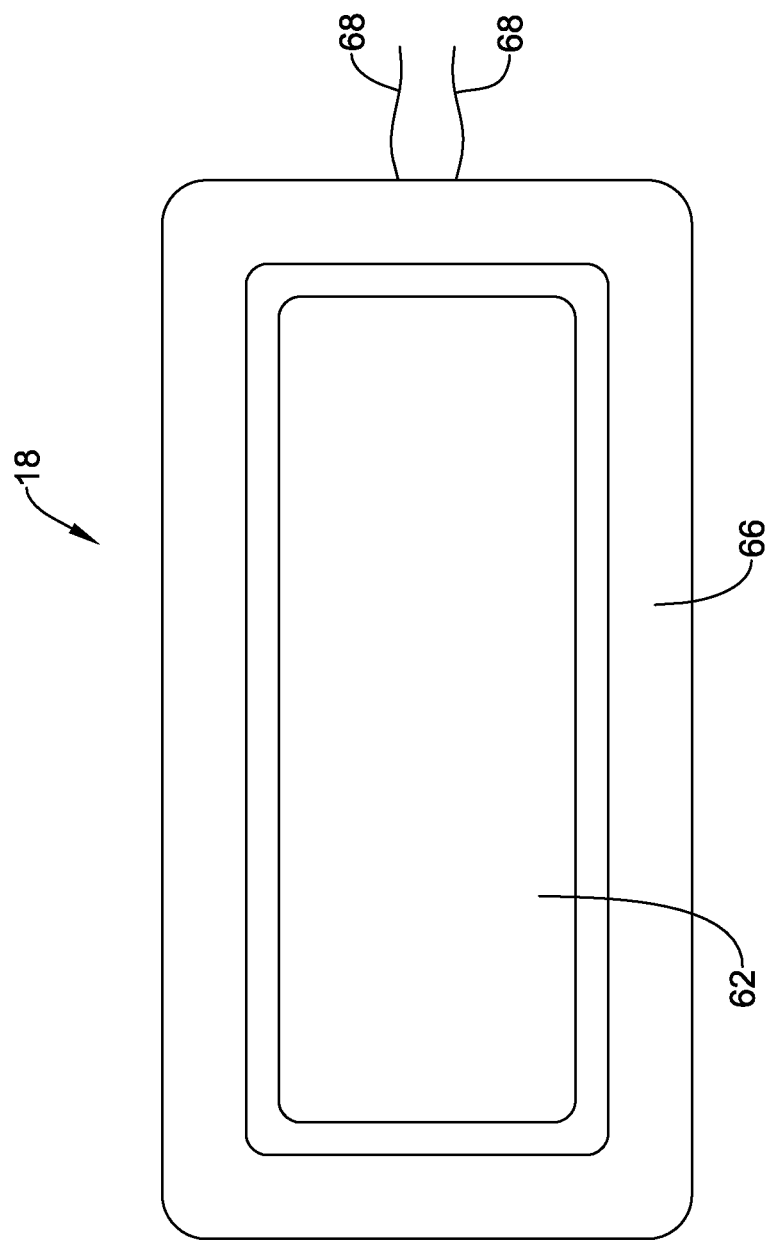
FIG. 3 is a front view of an illustrative HVAC controller.

FIG. 3 is a front view of an illustrative HVAC controller 18. In the illustrative embodiment of FIG. 3, HVAC controller 18 may include a display 62 that is disposed within a housing 66 but viewable externally from the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 66 may be formed of any suitable material, such as a polymeric material. In some cases, the housing 66 may be formed such that it defines a data port 56 (see FIG. 2). The housing 66 may also include suitable wiring and/or other electrical connections 68 such that the HVAC controller 18 may be electrically coupled to the HVAC system 4.

Figure 4A:
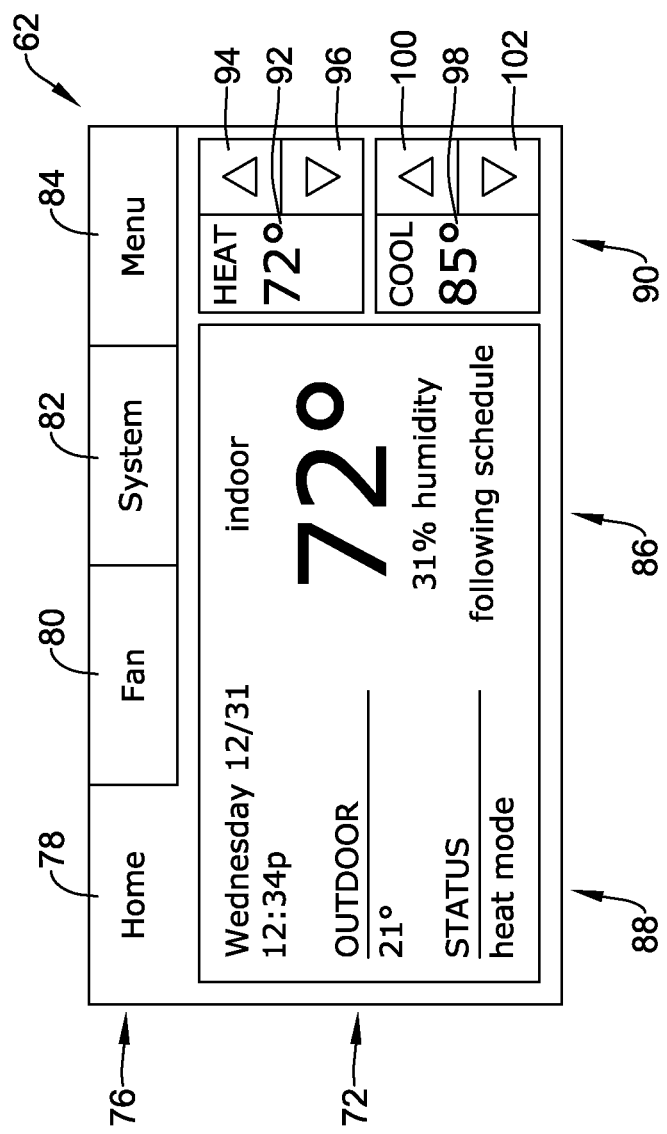
FIGS. 4A-4B provide illustrative examples of home screens that may be displayed upon the HVAC controllers of FIGS. 2 and 3.
Figure 4B:
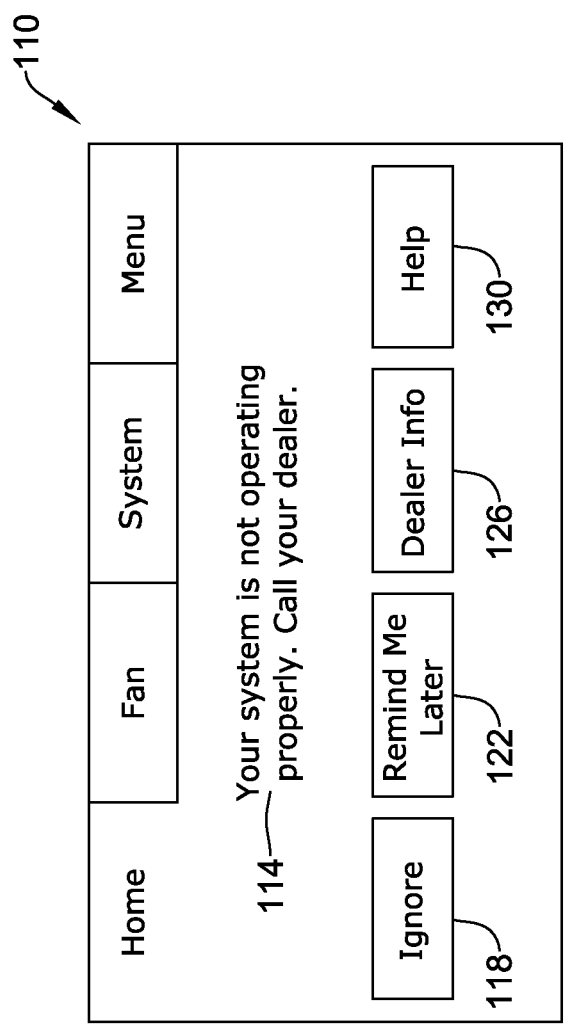

In some cases, HVAC controller 18 may be configured to provide substantial display and/or programming functionality. In some cases, HVAC controller 18 may be configured to display a default display, referred to herein as a home screen, that is displayed by HVAC controller 18 when no other data entry is underway for a period of time. FIGS. 4A-4B provide exemplary home screens 72, 110 that may be displayed by HVAC controller 18. In some cases, home screens 72, 110 may include screens that can be accessed by a top level navigational menu. A home screen may, if desired, display one or more parameters relating to environmental conditions such as indoor and/or outdoor air temperature and/or humidity, expected weather conditions, and/or the status of equipment that is at least partially controlled by HVAC controller 18. In some instances, a home screen may display a user alert that may indicate that the system is not operating properly or that a routine maintenance such as, for example, a filter change, is desirable, but this is not required.

FIG. 4A shows one such home screen 72. FIG. 4A is an example of a screen that may be displayed after a user has pushed HOME button 78, or when no other data entry is underway for a period of time. In many cases, the illustrative home screen 72 of FIG. 4A may include a navigational bar 76 along the top. Navigational bar 76 may be considered as providing top level navigation. In some cases, if desired, navigational bar 76 may include one or more of a HOME button 78, a FAN button 80, a SYSTEM button 82 and/or a MENU button 84. In the illustrative embodiment, the user may access one or menus from which the user may make a temperature set point change, a humidity set point change, an indoor air quality change, a programmable schedule change, a system mode change, a fan setting change, an installer set-up change, among others. Such changes may be considered a user interaction.

In some cases, home screen 72 may be considered as having two or more regions. For example, home screen 72 may include a first region 86 and a second region 88. In some instances, first region 86 may be considered as displaying or otherwise providing primary information, while second region 88 may be considered as displaying or otherwise providing secondary information. In some cases, primary information may be information that is considered to be more important, more interesting and/or more useful than secondary information. To illustrate, first region 86 may display one or more of a current air temperature reading, a current indoor humidity, a schedule status, and the like. Second region 88 may display one or more of a date and time, an outdoor air temperature reading, an outdoor humidity reading, an equipment status, and the like.

Home screen 72 may also include a third region 90 that may be used for displaying and/or adjusting a parameter value such as a parameter that is displayed within first region 86 of home screen 72. In some cases, for example, third region 90 may, as illustrated, display both a heating temperature set point and a cooling temperature set point, but this is not required. Third region 90 may display a first parameter 92, a first up arrow 94 and a first down arrow 96. Third region 90 may also display a second parameter 98, a second up arrow 100 and a second down arrow 102. First parameter 92 may be adjusted up or down by a user using first up arrow 94 and/or first down arrow 96, as appropriate. Second parameter 98 may be adjusted up or down by a user using second up arrow 100 and/or second down arrow 102, as desired.

In some cases, HVAC controller 18 may be configured to display a user alert on the display 62 which may prompt the user to take action. In one case, a user alert may be displayed when the processor 44 determines that system maintenance is needed. For example, processor 44 may determine that a filter change is necessary, a battery change is necessary, a UV bulb change is necessary or some other maintenance is necessary that requires a user's attention. In another case, the HVAC controller 18 may display a user alert indicating that the HVAC system 4 is operating outside of a predetermined set of "normal" operating parameters. Such an alert, for example, may be displayed when the HVAC system 4 has exceeded a predetermined delta T limit stored in the controller memory 52 for either a heating or a cooling mode. A user's response (or, in some cases, absence of a response) to an alert may be considered a user interaction. In some cases, a user's interactions with HVAC system may be recorded and stored in a user interaction log contained within the controller memory 52.

FIG. 4B provides another illustrative home screen 110 that may be displayed when the HVAC controller 18 determines that the HVAC system 4 has exceeded a normal operating parameter such as, for example, when the HVAC system 4 is operating outside of a predetermined delta T limit in either the cooling or the heating mode. As shown in FIG. 4B, home screen 110 may display a user alert 114 indicating that the HVAC system 4 is not operating properly. In some cases, the user alert may also prompt the user to call their dealer or repair personnel, or perform some other action. Home screen 110 may also provide one or more selectable options for responding to the user alert 114. For example, home screen 110 may include a first button 118 that, when selected, may dismiss or ignore the alert. Home screen 110 may also include a second button 122 that, when selected, may initiate a snooze function that may temporarily remove the user alert for a predetermined period of time and return to home screen 72 of FIG. 4A. The second button 122 may be labeled "Snooze", "Remind me later", "Delay", "Dismiss", or the like. In other instances, home screen 110 may include a button 126 labeled "Dealer Information" that, when selected, may display the dealer's contact information (e.g. phone number, street address, email address, web address, and/or other contact information), and/or a button 130 labeled "Help" that when selected may provide additional information about the use of the current screen 110.

FIGS. 5-22 provide several illustrative examples of screens that may be displayed upon the HVAC controllers of FIGS. 2 and 3 when a user is determining and/or changing diagnostic limits for an HVAC system. In some instances, the determination of certain diagnostic limits for the HVAC system may occur during initial installation and set-up of at least some of the HVAC components 6 HVAC system 4. In other cases, determining diagnostic limits or changing the diagnostic limits for the HVAC system 4 may occur during routine maintenance or inspection of the HVAC system 4, or at any other suitable time as desired.

Figure 5:
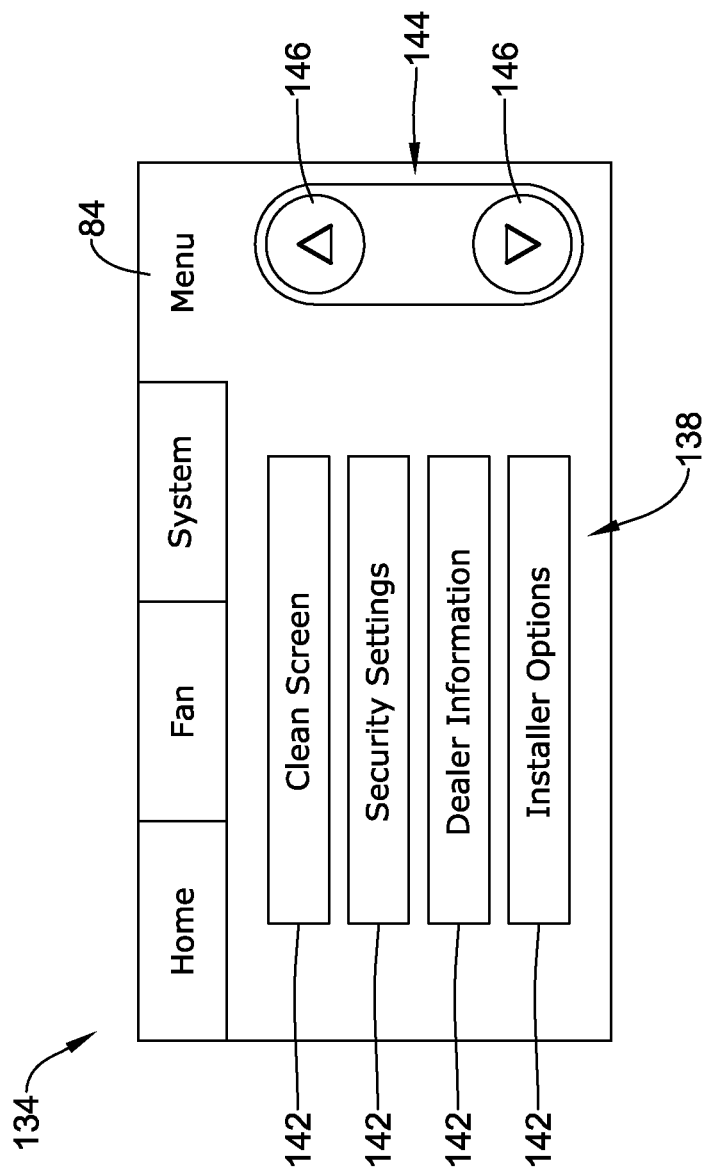
FIGS. 5-22 provide several illustrative examples of screens that may be displayed upon the HVAC controllers of FIGS. 2 and 3 when in use.

FIG. 5 shows an illustrative example of a menu screen 134 that may be displayed when a user selects the MENU button 84 on home screen 72 of FIG. 4A. The illustrative menu screen 134 may include a table 138 that includes one or more selectable menu options 142 that may be selected by the user. In some cases, the table 138 may be a scrolling table, in which case the menu screen 134 may also include a scroll bar 144 including first and second arrows 146a, 146b that may facilitate a user in scrolling through the available menu options 142.

Figure 6:
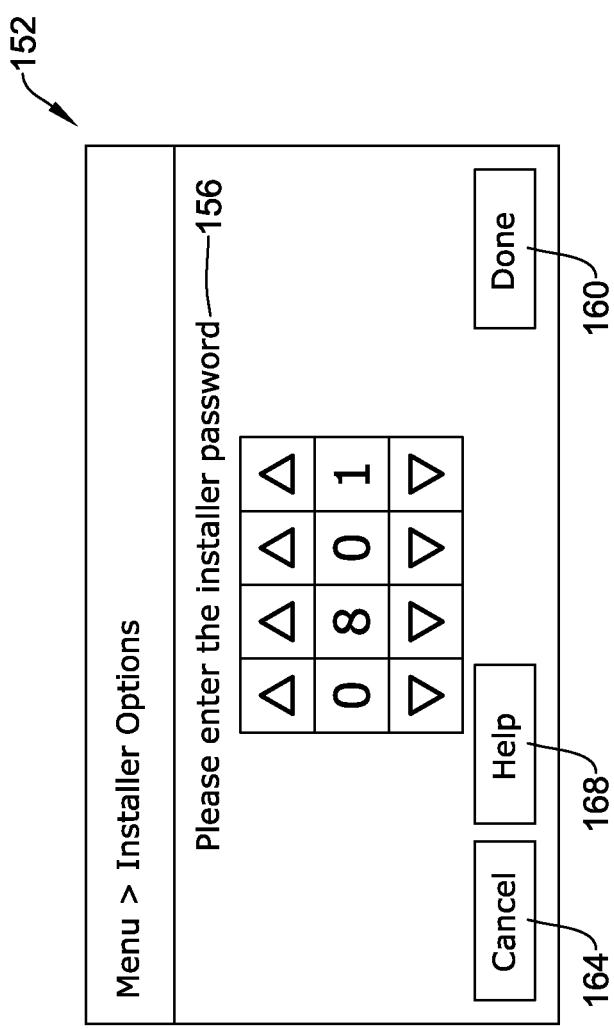

Upon selection of the INSTALLER OPTIONS menu option 142, the illustrative HVAC controller 18 may be configured to display a password prompt screen 152, as illustrated in FIG. 6. The password prompt screen 152 may include a user prompt 156 that may prompt the user to enter a user login ID which may include a user name and/or password. In some cases, certain rights may be associated with different user login IDs or passwords. For example, a homeowner may have a different login ID, with different associated rights than an HVAC contractor. The user login ID and/or password may include any combination of alphanumeric characters in the example shown. In one example, as illustrated in FIG. 6, the password may be a sequence of numbers. The sequence of numbers may be adjusted to the correct sequence by using the corresponding arrow keys. When properly set, the user may select the DONE button 160 to confirm entry of the user login ID. In some cases, the password prompt screen 152 may include a CANCEL button 164 which, upon its selection, may cancel the user's current actions and return the user to the previous screen, such as the menu screen 134 of FIG. 5. In some cases, the password prompt screen 152 may include a HELP button 168. Selection of the HELP button 168 may cause the HVAC controller 18 to display additional information about the currently displayed screen, such as information on how to use the password prompt screen 152. Sometimes this information screen may appear on an additional screen or a pop-up screen that overlays the current screen, but this is not required.

Figure 7:
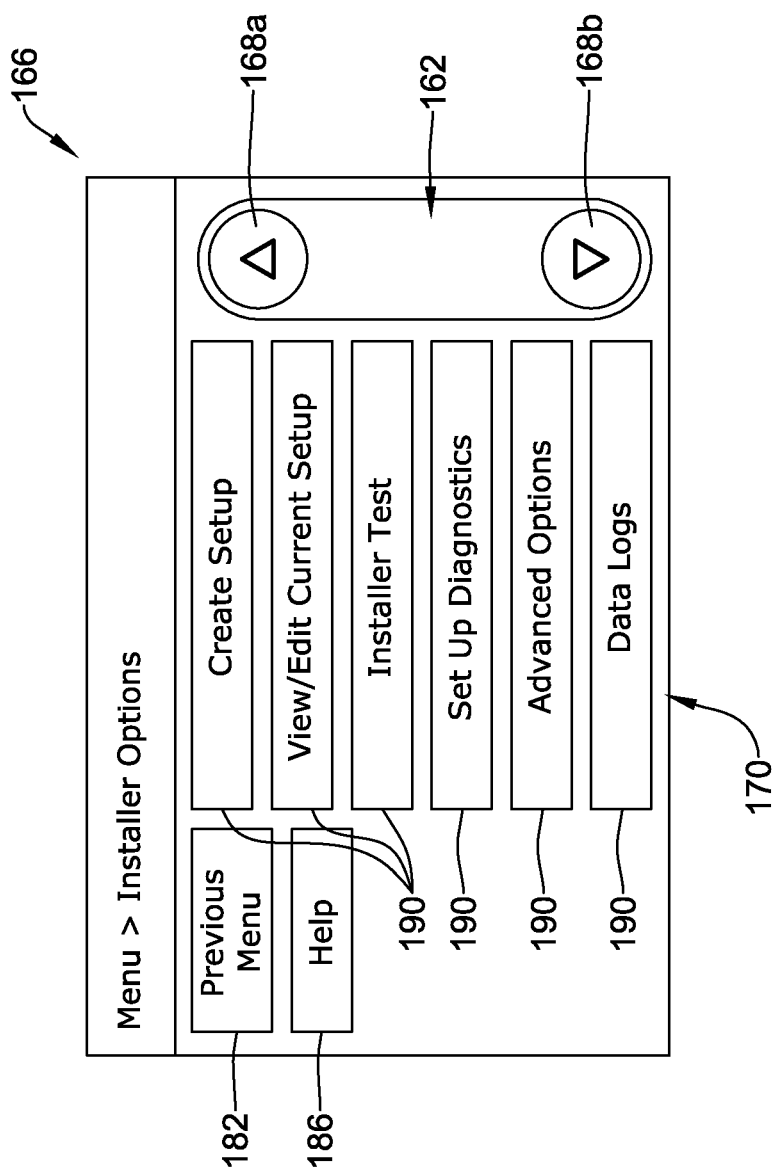

Upon selection of the DONE button 160 confirming entry of a password, the HVAC controller 18 may confirm that a valid password has been entered. If a valid password has been entered, the HVAC controller 18 may display an installer options menu screen 166, such as illustrated in FIG. 7. Like the previous menu screen 134, the installer options menu screen 166 may include a table 167 including one or more installer options. In some cases, the table 170 may be a scrolling table, in which case the installer options menu screen 166 may also include a scroll bar 162 having first and second arrows 168a, 168b that may facilitate a user to scroll through and view the available installer options presented in table 170. The installer options menu screen 166 may also include a BACK button or PREVIOUS MENU button 182 which, when selected, may cause menu screen 134 of FIG. 5 to be displayed. Additionally, in some cases, the installer options menu screen 166 may include a HELP button 186, which when selected, may cause additional information pertaining to the currently displayed screen to be displayed, such as information on how to use the installer options menu screen 166.

In many cases, the table 170 may include one or more installer options 190 that may be selected by the user. In some cases, a CREATE SETUP installer option 190 may be provided, which may provide access to a series of successive installer set-up screens that may query the user to specify one or more setup parameters relating to the system setup for the particular HVAC system 4. Selection of this option may be appropriate when the user is initially setting up the HVAC system prior to operation. For example, in some instances, the series of successive screens may query the user regarding parameters related to HVAC systems and their setup including, but not limited to, the following: the type of HVAC system (e.g. zoned or non-zoned), the type of heating system (e.g. conventional forced, air, heat pump, radiant heat, to name a few), the type of heating equipment (e.g. standard efficiency gas forced air, high efficiency gas forced air, electric forced air, etc.), the number of equipment stages for each of the cooling system and heating system, the temperature ranges (e.g. minimum and maximum set points) for both heating and cooling, what sensors are included in the HVAC system (e.g. indoor air temperature, outdoor air temperature, return air temperature sensor, discharge air temperature sensor, etc.), the number of air filters, whether not the HVAC system includes a humidifier, the type of humidifier (if applicable), whether or not the HVAC system includes a dehumidifier, ventilation, the number and type of UV devices (if applicable), among others. These are just some examples. In some instances, the HVAC controller 18 may be configured to automatically detect the various components of the HVAC system and parameters indicative of the system setup. Still, in other instances, the user may also view and/or edit the current setup by selecting the VIEW/EDIT CURRENT SETUP menu option 190 which may facilitate the user in viewing and/or making changes to previously entered and/or detected setup parameters.

The following illustrative figures and examples will be described as they relate to a conventional forced air system including a return air temperature sensor (RATS) (e.g. RATS 38a of FIG. 1) and a discharge air temperature sensor (DATS) (e.g. DATS 38b of FIG. 1). In some instances, the HVAC system may include a humidifier, a dehumidifier, ventilation, an outdoor air temperature sensor, an outdoor humidity sensor, an indoor humidity sensor, and/or any other suitable sensor or component, as desired. More specifically, FIGS. 8-17 provide examples of several illustrative screens that may be displayed by the HVAC controller 18 after the installer has indicated through their responses to the queries presented by the previous screens that the HVAC system is a conventional forced air HVAC system including at least a return air temperature sensor, a discharge air temperature sensor, and an outdoor temperature sensor.

Figure 8:
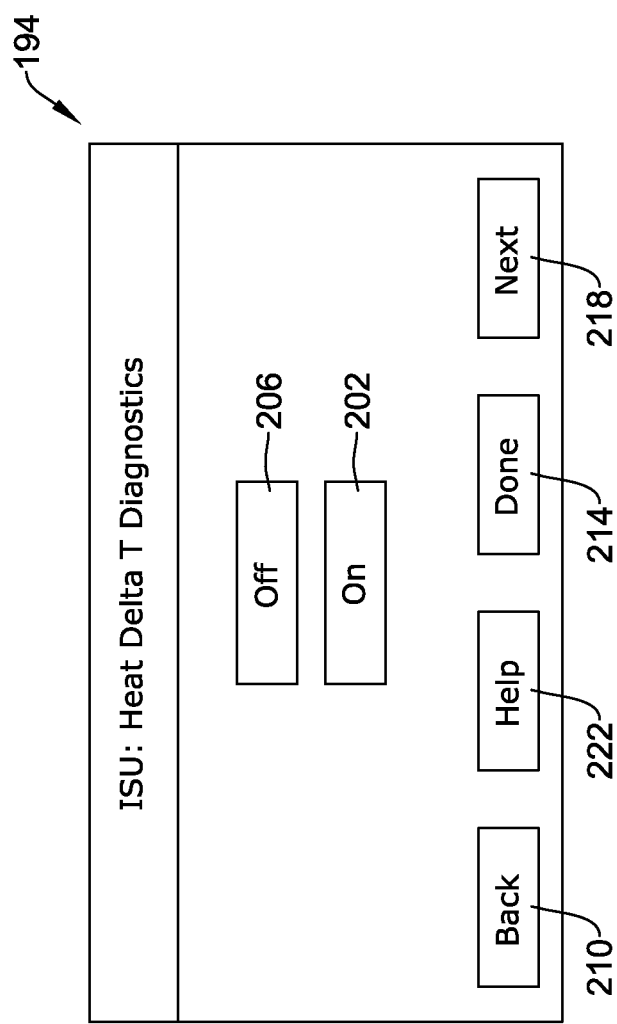
Figure 9:
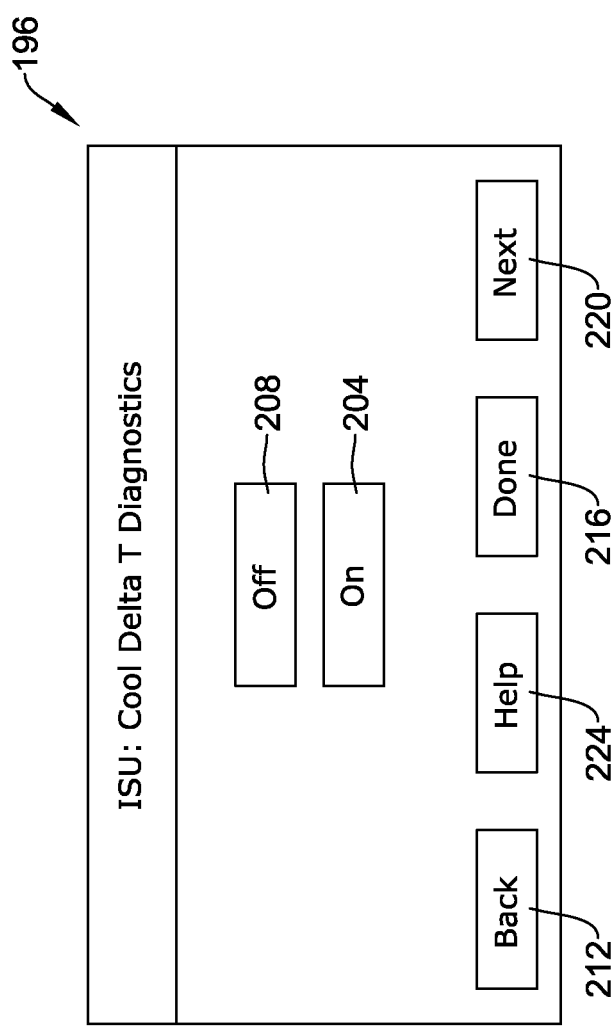

FIGS. 8-9 provide illustrative examples of diagnostics activation screens 194, 196 that may prompt a user to activate and/or deactivate delta T diagnostics for the heating and/or cooling mode of the HVAC system. As can be seen, screens 194, 198 may include a first button 202, 204 labeled "ON" or "ACTIVATE" for enabling delta T diagnostics for either the heating mode (FIG. 8) or the cooling mode (FIG. 9), and a second button 206, 208 labeled "OFF" or "DEACTIVATE" for disabling delta T diagnostics for either heating and/or cooling. In some instances, screens 194, 198 may also include: a BACK button 210, 212, that, when selected, may return the user to a previous screen within, for example, the CREATE SETUP or VIEW/EDIT CURRENT SEUP installer option menu tree; a DONE button 214, 216 that, when selected, may indicate that the user is finished making changes and may return the user to the installer options menu screen 134 as shown in FIG. 5; and a NEXT button 218, 220 that, when selected, may advance the user to the next screen in a series of screens related to specifying conditions for when a fault is to be allowed or ignored by the HVAC controller 18. Additionally, diagnostics activation screens 194, 196 may include a HELP button 222, 224 that, when selected, may cause the HVAC controller 18 to display additional, helpful information regarding the use of current screen 194, 196.

In some cases, when a user has indicated that the HVAC system includes a return air temperature sensor (RATS) (e.g. RATS 38a of FIG. 1) and a discharge air temperature sensor (DATS) (e.g. DATS 38b of FIG. 1) or, alternatively, when the HVAC controller 18 has detected both a RATS and a DATS, the delta T diagnostics may automatically default to "on" or "activate" for both heating and/or cooling, as applicable. The "ON" button 202, 204 may be highlighted, shaded, grayed-out, bolded, or include some other visual indicator that it has been selected either by the user or by default. If this is acceptable to the user, the user may simply select the NEXT button 218, 220 to advance the HVAC controller 18 to the next screen in a series of screens. If the user desires to disable the delta T diagnostics for either heating or cooling, the user may select the OFF button 206, 208, as desired, to deactivate delta T diagnostics for the selected mode (heating and/or cooling).

Figure 10:
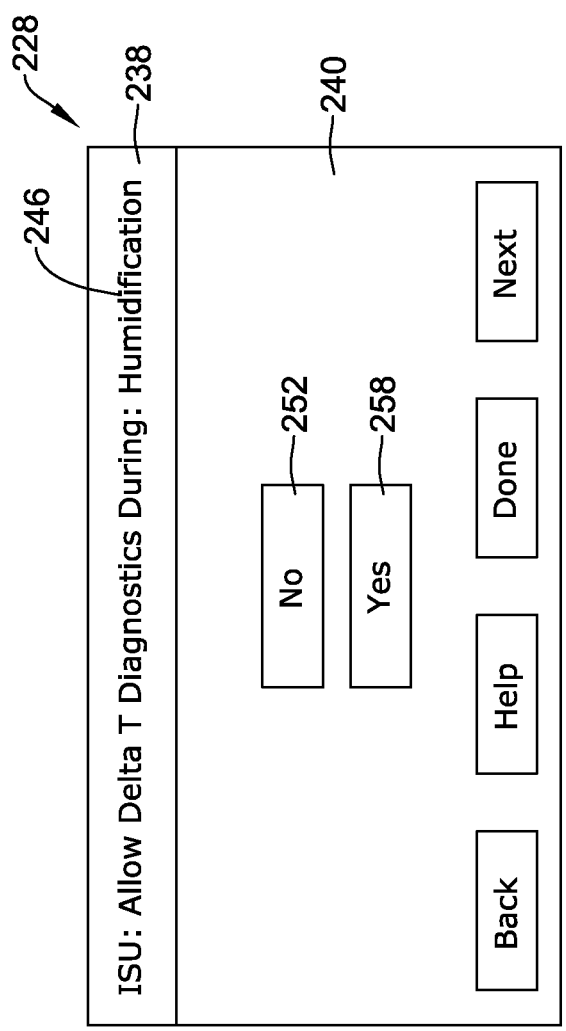
Figure 11:
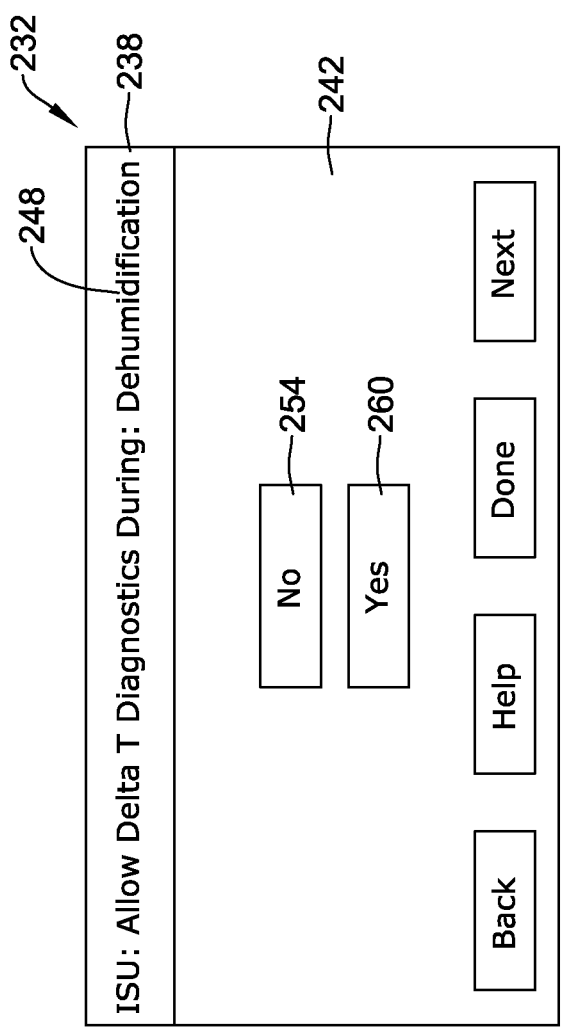
Figure 12:
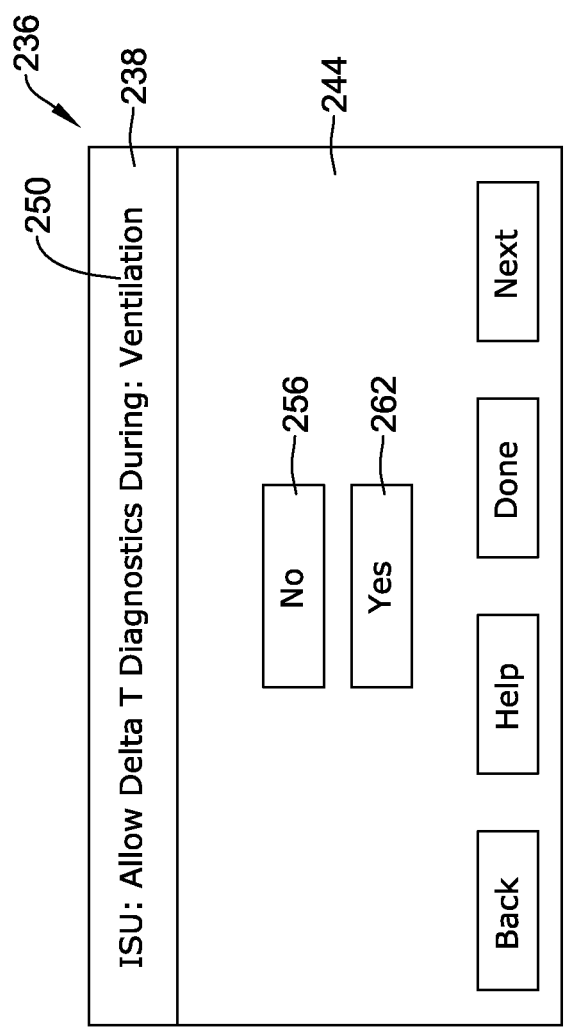

FIGS. 10-12 provide an illustrative series of successive user query screens 228, 232, 236 that may prompt a user to specify at least one condition under which certain diagnostic faults may be allowed or ignored by the HVAC controller 18. The conditions under which a diagnostic fault may be allowed or ignored by the HVAC controller 18 may relate to a variety of conditions including, but not limited to, an indoor air temperature, an indoor humidity level, an outdoor air temperature, an outdoor humidity level, call for humidification, a utility load shutoff event, a defrost cycle, among others. These are just some examples. More than one condition under which certain diagnostic faults may be allowed or ignored by the HVAC controller 18 may be specified by the user for each heating and/or cooling stage of the HVAC system, if desired. In some cases, each condition under which certain diagnostic faults may be allowed or ignored by the HVAC controller 18 may be independent of one another.

For example, in the illustrative examples provided in FIGS. 10-12, each of user query screens 228, 232, and 236 may query a user to specify a condition under which a delta T fault may be allowed. In some instances, a banner 238 may be provided along a top portion of each of screens 228, 232, and 236 containing a simple user prompt such as, for example, "Allow Delta T Faults During . . . " A middle portion 240, 242, 244 of each of the screens 228, 232, 236 may include a simple text string 246, 248, 250 identifying the specific condition under which delta T faults may or may not be permitted. For example, screens 228, 232, 236 allow a user to specify whether or not to allow delta T faults during humidification, dehumidification, and ventilation, respectively. These are just some examples. Also, each of screens 228, 232, and 236 may provide at least one option for responding to the user prompt for the displayed condition. In some instances, screens 228, 232, and 236 may include a first button 252, 254, 256 labeled and a second button 258, 260, 262 labeled, which the user may select to specify whether or not delta T faults should be allowed under the corresponding condition. In some cases, as illustrated, the first button 252, 254, 256 may be labeled "NO" and the second button 258, 260, 262 may be labeled "YES." It will be understood that other labels may be employed as applicable.

Figure 13:
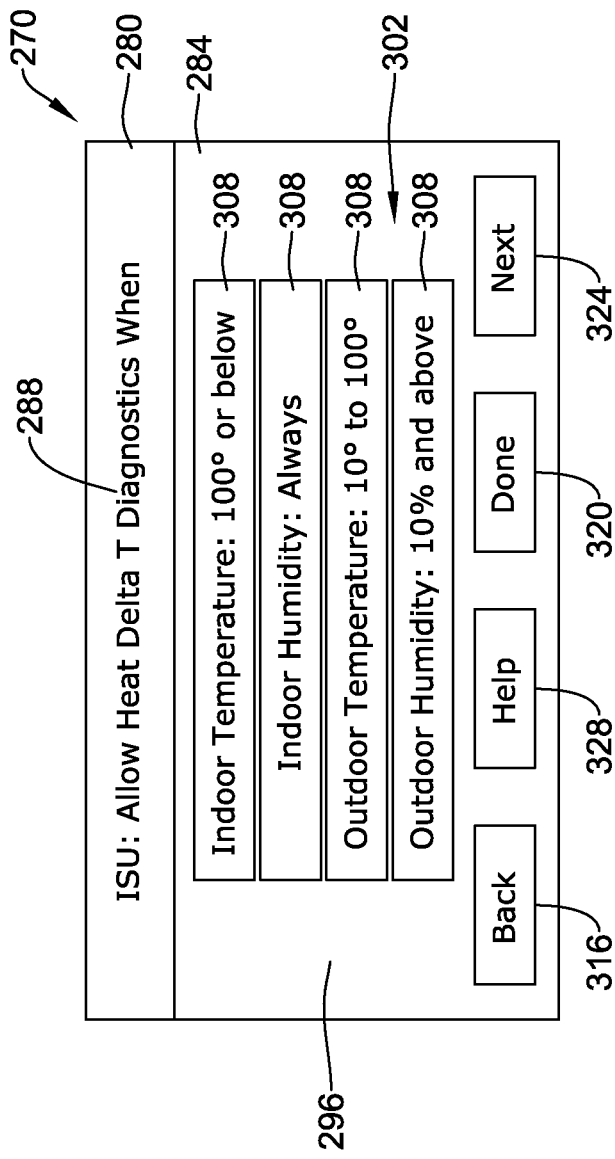
Figure 14:
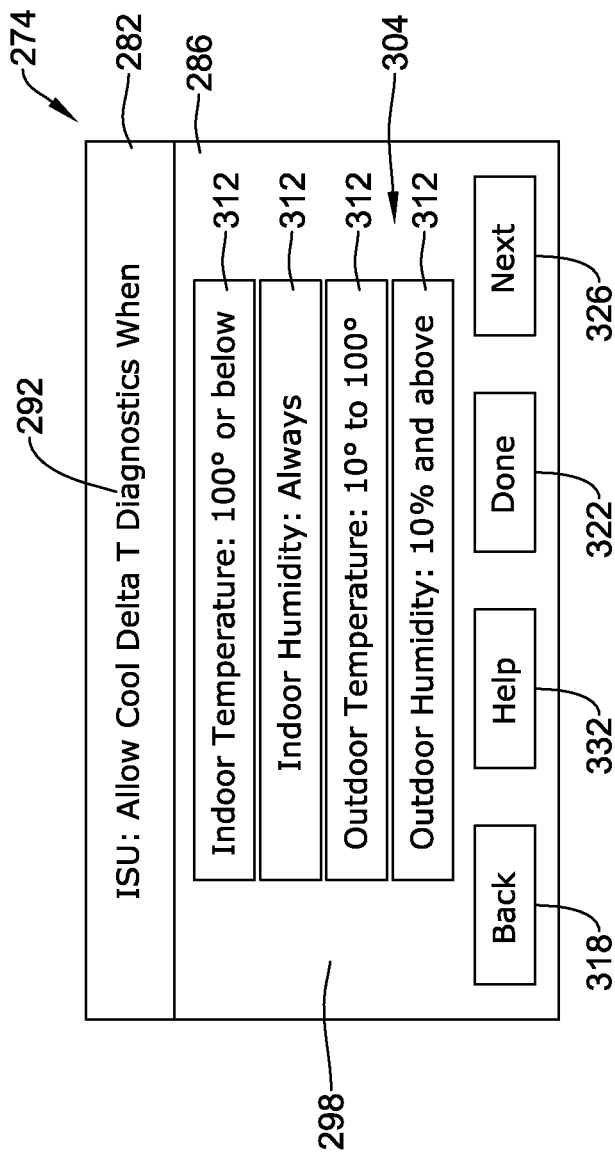

FIGS. 13-14 provide additional illustrative examples of user query screens 270, 274 that may be used to query a user to specify certain conditions under which delta T conditions may be allowed or ignored. In some instances, the HVAC controller 18 may be configured to display user query screens 270, 274 when a user has indicated that the HVAC system includes a return air temperature sensor (RATS) 38a and a discharge air temperature sensor (DATS) 38b or, alternatively, when the HVAC controller 18 has detected both a RATS and a DATS. Like the exemplary user query screens 228, 232, and 236 shown in FIGS. 10-12, each of screens 270, 274 may include a banner 280, 282 provided along a top portion 284, 286 of each of screens 270, 274 containing a simple text string 248 such as, for example, "Allow Heat Delta T Faults When . . . " (FIG. 13) or "Allow Cool Delta T Faults When . . . " (FIG. 14). A middle portion 296, 298 of each of screens 270, 274 may display a table 302, 304 listing one or more conditions 308, 312 under which a delta T fault may be allowed or ignored. In some cases, the table 302, 304 may be a scrolling table in which case a scroll bar for navigating the table 302, 304 (not shown) may be provided.

In some cases, each of screens 270, 274 may include: a BACK button 316, 318 that, when selected, may return the user to a previous screen displayed by the HVAC controller 18; a DONE button 320, 322 that, when selected, may cause the HVAC controller 18 to display the installer menu options screen 134 as shown in FIG. 5 or, in some instances, a home screen such as home screen 72 shown in FIG. 4A; and a NEXT button 324, 326 that, when selected, may cause the HVAC controller 18 to advance to the next screen in a series of screens. In some cases, selection of the NEXT button 324 of screen 270 as shown in FIG. 13 by a user may cause the HVAC controller 18 to display screen 274 as shown in FIG. 14. Each of screens 270, 274 may also include a HELP button 328 that, when selected, may cause the HVAC controller 18 to display helpful information about the use of the current screen.

Each of the conditions 308, 312 displayed in each of the screens 270, 274 may include default settings or values under which a delta T fault may be allowed or ignored. Additionally, in some instances, each of the conditions 308, 312 may be selectable by a user such that the default settings or values may be changed to reflect a user's preference or their specific knowledge about the system. In some instances, selection of an individual condition 308, 312 by a user may cause the HVAC controller 18 to display a screen specific to the selected condition.

Figure 15:
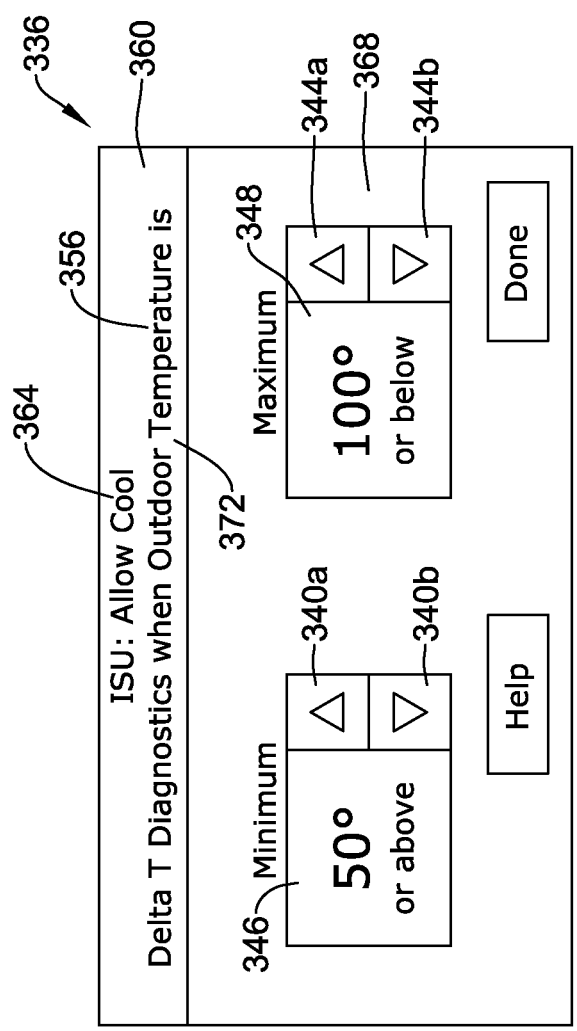

FIG. 15 provides an illustrative example of a condition specific screen that may be displayed by the HVAC controller 18 upon selection of a condition 308, 312 by a user. More particularly, FIG. 15 provides an illustrative example of condition specific screen 336 that may be displayed when the condition 312 labeled "Outdoor Temperature: 10° to 100°" is selected by a user on screen 274 as shown in FIG. 14. Through screen 336, the user may use first and second arrow keys 340a, 340b, 344a, 344b to adjust lower and upper temperature limits 346, 348 for the outdoor air temperature under which a delta T fault may be allowed when the HVAC system is operating in the cooling mode. In many instances, when a signal indicating that the outdoor temperature is outside of the upper and lower temperature limits is received or determined by the HVAC controller 18, a delta T fault may be ignored by the HVAC controller 18.

As shown in the illustrative example provided in FIG. 15, condition specific screen 336 may also include a banner 356 provided along a top portion 360 of the screen 336 containing a simple user prompt 364 such as, for example, "Allow Cool Delta T Faults When . . . " A middle portion 368 of condition specific screen 336 may include a simple text string identifying the specific condition that may be adjusted. Additionally, in some cases, condition specific screen 336 may include a CANCEL button that, when selected, may cause the HVAC controller 18 to cancel the current action and return to the previous screen such as, for example, screen 274 as shown in FIG. 14. Condition specific screen 336 may also include a DONE button that, when selected, indicates that the user is done making any adjustments to the upper and lower temperature limits, and which may cause the HVAC controller 18 to display the previous screen (e.g. screen 274 of FIG. 14) such that another condition 312 may be selected by the user, but this is not required. Condition specific screen 336 may also include a HELP button that, when selected, may display additional information that may be helpful to the user, including instructions on how to use the screen 336.

In some instances, the HVAC controller 18 may be configured to display one or more screens that query a user about certain conditions which may affect the HVAC controller's ability to accurately detect a diagnostic fault. For example, in some cases, the HVAC controller 18 may erroneously determine that an HVAC system is not operating properly when, in fact, the HVAC system is merely subject to, for example, a utility load shut off event or a defrost cycle. A utility load shut off event may occur when the utility is allowed to shut off the heating and/or cooling equipment for a period of time in order to cut peak power load on the utility system. During a utility load shut off event, the HVAC system 4 may not respond to a current call for heating and/or cooling of the HVAC controller 18 in an expected manner, and thus the delta T across the HVAC system 4 may not meet an expected delta T threshold value. In some cases, it may not be productive to report such an event as a delta T fault. In another example, a defrost cycle event may occur when the heating and/or cooling equipment is being defrosted. During a defrost cycle event, the HVAC system 4 may not respond to a current call for heating and/or cooling of the HVAC controller 18 in an expected manner (e.g. auxiliary electric heat may be on while the heat pump is being defrosted or compressor may not be operating in a heating mode), and thus the delta T across the HVAC system 4 may not meet an expected delta T threshold value. In some cases, it may not be productive to report such an event as a delta T fault.

As such, in some instances, the HVAC controller 18 may be configured to display one or more user query screens that query a user about certain events in which a diagnostic fault may be erroneously determined or otherwise not reported. FIGS. 16A-17B provide a few example user query screens 374, 376, and 378, which may be used to query a user about, for example, a utility load shut off event and/or a defrost cycle.

Figure 16A:
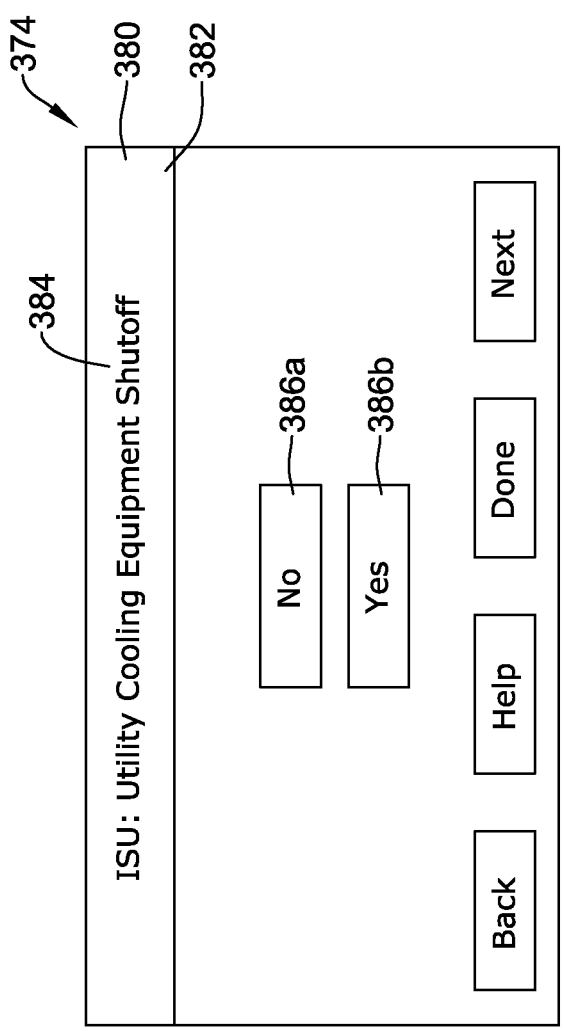
Figure 16B:
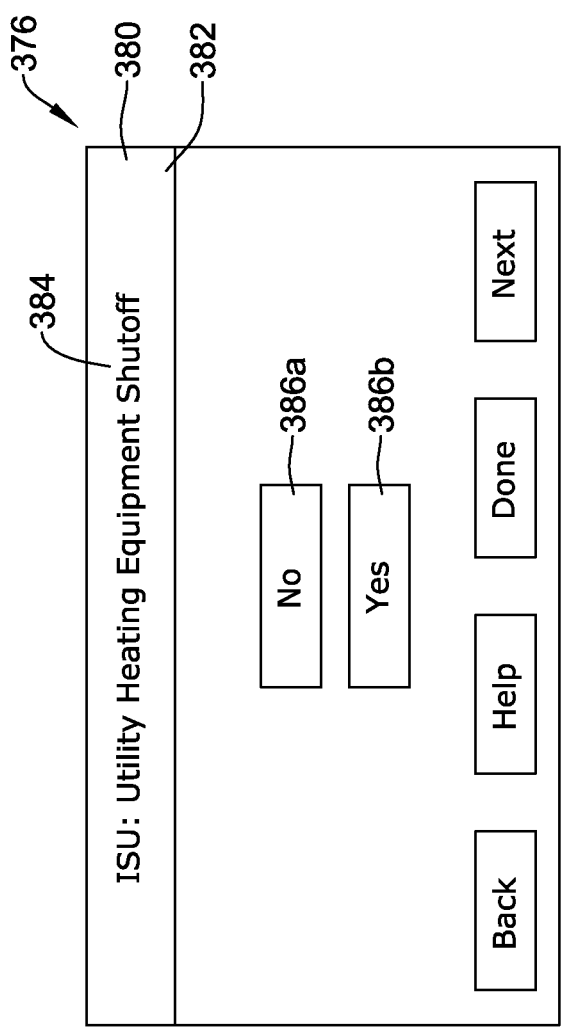
Figure 16C:
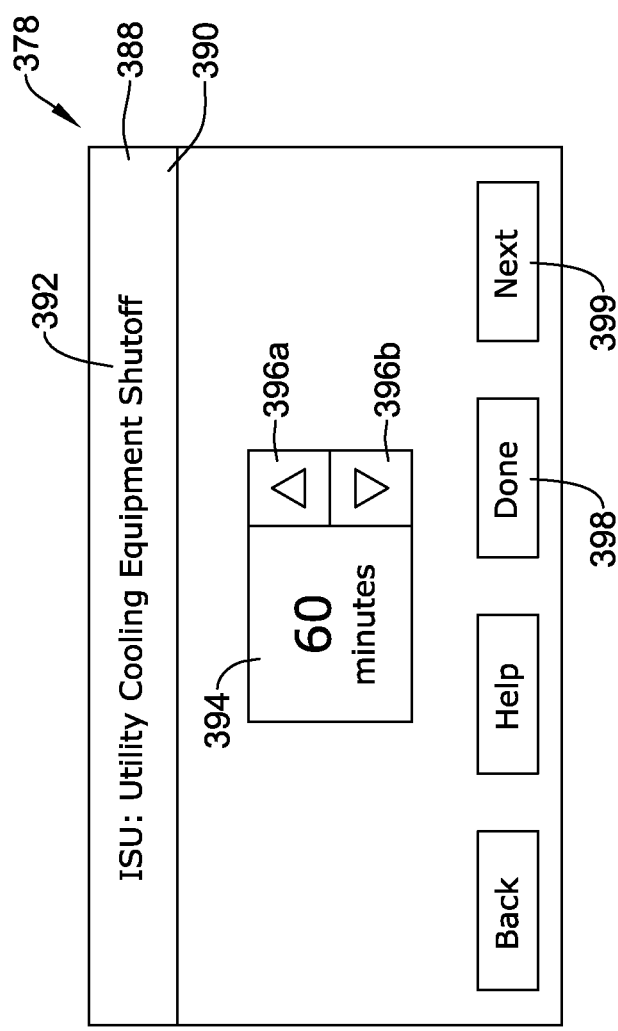

User query screens 374 and 376, shown in FIGS. 16A and 16B, may be used to query a user about a utility load shut off event related to the cooling mode and the heating mode, respectively, of the HVAC system 4. User query screens 374 and 376 each may include a banner 380 provided along a top portion 382 of each of the screens 374, 376 containing a user query prompt 384 such as, for example, "Utility Cooling Equipment Shutoff" or "Utility Heating Equipment Shutoff" Screens 374, 376 may also include a first button 386a labeled "NO" and a second button 386b labeled "YES", which the user may select to specify whether or not the identified mode is subject to a utility load shutoff event. If the identified mode such as, for example, the cooling mode as identified in FIG. 16A is indicated by the user as being subject to a utility load shutoff event, then the HVAC controller 18 may display an additional user query screen such as, for example, user query screen 378 as shown in FIG. 16C, which may allow the user to specify a duration of the utility load shut off event. The duration of the utility load shut off event may depend on the particular utility load shut off program that is offered in the particular geographic region of the HVAC system 4.

Like user query screens 374, 376, user query screen 378 of FIG. 16C may include a banner 388 provided along a top portion 390 of the screen 378 which may include a user prompt 392 such as, for example "Utility Cooling Equipment Shutoff Duration". User query screen 378 may display a default value 394 for the duration of the shutoff event, and may include first and second arrow keys 396a, 396b for increasing and/or decreasing the duration value 394. Additionally, user query screen 378 may include a DONE button 398 or a NEXT button 399 that when selected, may cause the HVAC controller 18 to accept the value set by the user for the duration of the utility shutoff event for the cooling mode and, in some instances, may cause the HVAC controller 18 to display further user query screens, if applicable. For example, selection of the DONE button 398 or NEXT button 399 may cause the HVAC controller 18 to display one more additional user query screens which may query the user about additional events that may affect the HVAC controller's ability to accurately determine a diagnostic fault for the HVAC system 4.

Figure 17A:
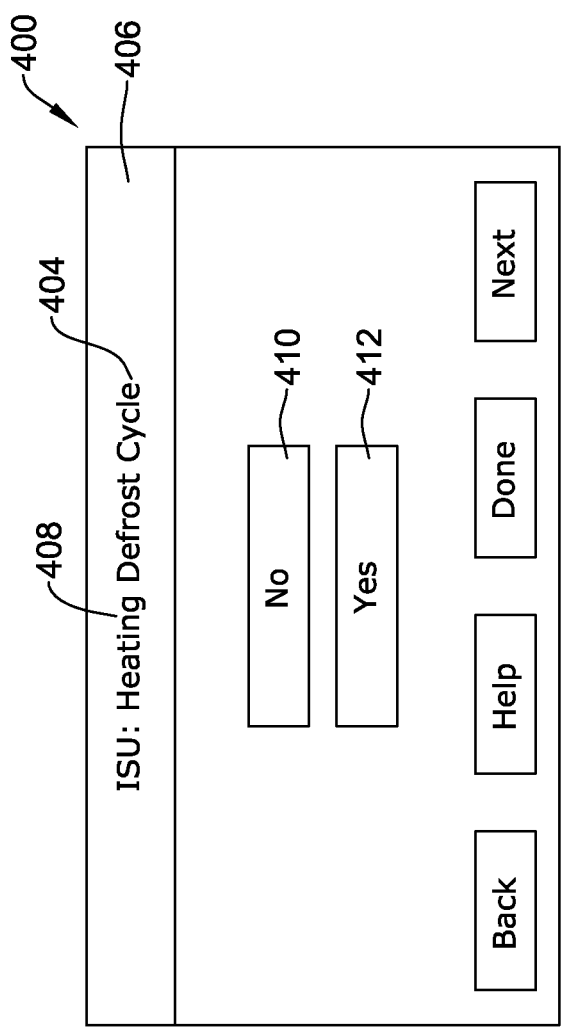
Figure 17B:
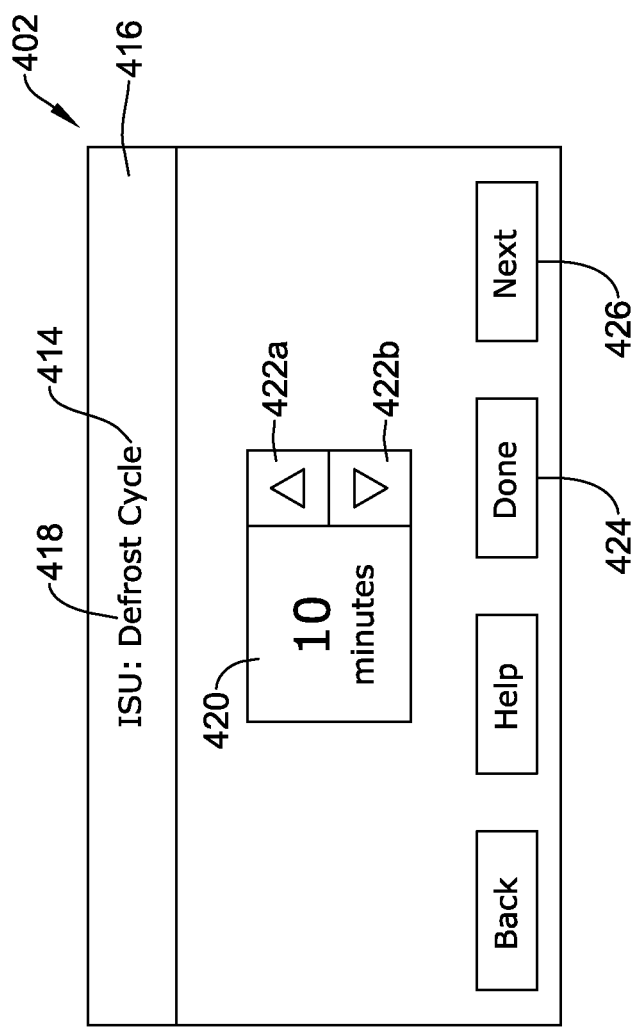

In some instances, the HVAC controller 18 may display one or more user query screens that may query a user about a defrost cycle such as, for example, user query screens 400, 402 as shown in the illustrative example provided in FIGS. 17A and 17B. It must be understood that while the illustrative example provided in FIGS. 17A and 17B relate to a defrost cycle for a heating mode of the HVAC system 4, that similar screens may also be displayed relating to a defrost cycle for a cooling mode of the HVAC system, as applicable.

In FIG. 17A, user query screen 400 includes a banner 404 provided along a top portion 406 of the screen which may include a user query or prompt 408 which may query the user about a defrost cycle for the identified mode (e.g. heating). Additionally, user query screen 400 may include a first button 410 labeled "NO" and a second button 412 labeled "YES", which the user may select to specify whether or not the identified mode is subject to a defrost cycle.

Selection of the second button labeled "Yes" confirms that the identified mode (e.g. heating) is subject to a defrost cycle, and may cause HVAC controller 18 to display user query screen 402, shown in FIG. 17B, which may prompt the user to adjust the duration of the defrost cycle. In some cases, the HVAC controller 18 may be configured to display a single user query screen, such as user query screen 402 of FIG. 17B.

Like user query screen 400, user query screen 402 may include a banner 414 provided along a top portion 416 of the screen 400 which may include a user prompt 418 such as, for example "Heating Defrost Cycle Duration." User query screen 402 also may display a default value 420 for the duration of the defrost cycle for the identified mode, and may include first and second arrow keys 422a, 422b, which the user may use to increase and/or decrease the time of the duration of the defrost cycle from the default value 420. In cases where a single user query screen 402 is displayed, the option "zero" or "none" may also be provided. The first and second arrow keys 422a, 422b may be used to select "zero" or "none" if the HVAC system is not subject to a defrost cycle. The duration of the defrost cycle event may depend on the particular HVAC components 6 used in the HVAC system 4.

After the user is finished making any adjustments to the duration of the defrost cycle, the user may select the DONE button 424 or the NEXT button 426. Upon selection of the DONE button 424 or the NEXT button 426, the HVAC controller 18 may accept the user determined value for the duration of the defrost cycle and, in some instances, may display additional user query screens. In other instances, selection of the DONE button 424 or the NEXT button 426 may cause the HVAC controller 18 to accept the user determined value for the duration of the defrost cycle and may cause the HVAC controller 18 to return to either the installer menu options screen 134 as shown in FIG. 5 or home screen 72 as shown in FIG. 4A, but these are just examples.

Figure 18A:
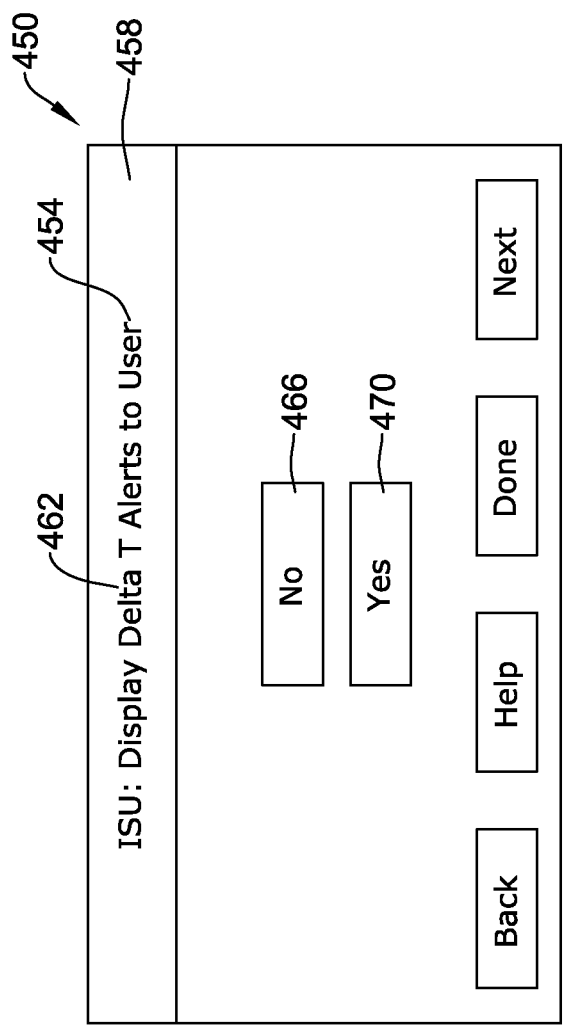

Before or after the user has completed making setting changes to one or more selected conditions under which a delta T fault may be allowed and/or ignored for the heating and/or cooling modes, the HVAC controller 18 may display a user query screen 450, such as shown in the illustrative example provided in FIG. 18A. The user query screen 450 may query a user as to whether or not delta T alerts should be displayed to the user (e.g. homeowner) on the display 62 of the HVAC controller 18. In some instances, the display alert screen 450 may correspond to a specific condition under which delta T faults may be allowed (e.g. not during a utility load shut off event or not during a defrost cycle). In other instances, the display alert screen 450 may correspond to all conditions under which delta T faults may be allowed.

As shown in FIG. 18A, the display alert screen 450 may also include a banner 454 provided along a top portion 458 of the screen 450 containing a simple user query 462 such as, for example, "Display Delta T Alerts to Homeowner." The display alert screen 450 may include at least one selectable option for responding to the user query 462. For example, in some instances, the display alert screen 450 may include a first selectable option 466 labeled "No" and a second selectable option 470 labeled "Yes." Regardless of whether or not the user determines that it is desirable that the delta T alerts should or should not be displayed to the homeowner or other building occupant, in some cases the HVAC controller 18 may be configured to log and record any detected delta T fault in a diagnostics fault log stored in the controller memory 52, as described herein.

Figure 18B:
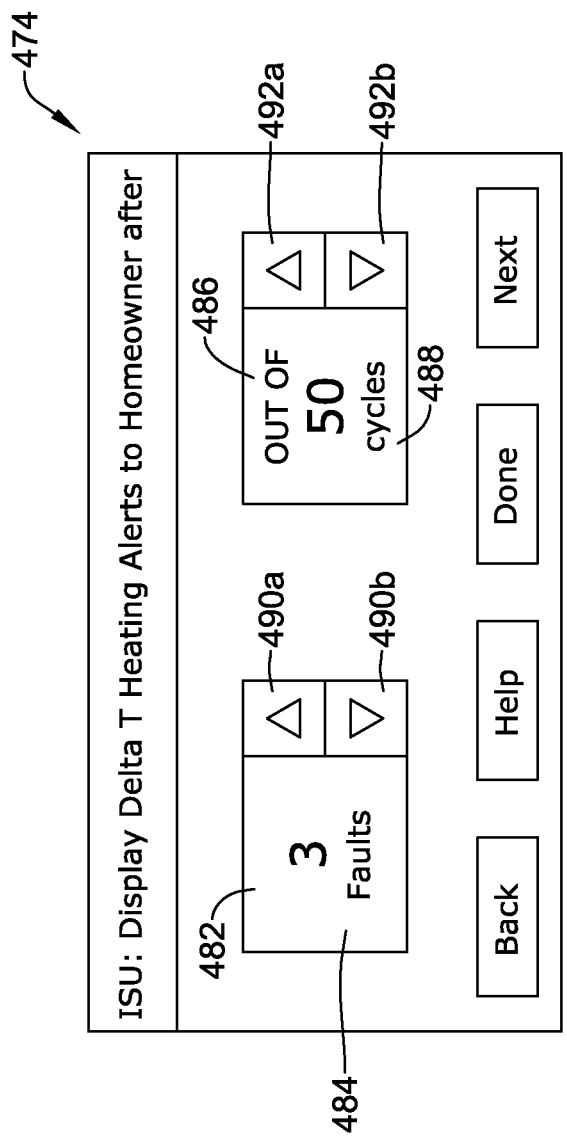

In some instances, selection of the second selectable option 470 labeled "YES" may cause the HVAC controller 18 to display a further user query screen, such as screen 474 shown in FIG. 18B. Through user query screen 474, a user may set a condition for when an alert is provided to a user based on the number of diagnostic faults detected by the HVAC controller 18 over a number of cycles for either the heating and/or cooling modes (or over a predetermined amount of time). In some cases, the user may set a condition for when an alert will be displayed to a user only after a predetermined number of the same or similar fault types are detected by the HVAC controller 18 within a predetermined specified number of the most recent HVAC cycles. An HVAC cycle may be defined as the period of time over which the heating or cooling relays are in a constant staging configuration. In some cases, the user may set a different condition for when an alert will be provided to a user for each mode (e.g. heating and cooling) and/or each stage combination (heating stage 1, heating stage 2, cooling stage 1, cooling stage 2, etc.) of the HVAC system 4, if desired. An HVAC stage combination may be defined as a combination of stages of a heating and/or a cooling system that may be activated by the HVAC controller 18. For example, a user may set a condition for the number of delta T faults that may be allowed during a predetermined number of the most recent HVAC cycles in either the heating and/or cooling modes (or over a predetermined amount of time). This feature may allow an installer to adjust the sensitivity of the HVAC controller 18 in detecting diagnostic faults and/or in alerting a homeowner that a fault has occurred.

In the example shown, user query screen 474 includes a banner 476 located at a top portion 478 of the screen, which may include a user prompt 480 such as, for example, "Display Delta T Heating Alerts to Homeowner After . . . " Additionally, user query screen 474 may include a first box 482 displaying the number of allowed faults 484 and a second box 486 displaying the number of the most recent HVAC cycles 488 to be considered. First and second arrow keys 490a, 490b, 492a, 492b may be used to increase and or decrease the number of allowed faults and the number of the most recent HVAC cycles to be considered so that a user may adjust the alert sensitivity to a desired level. Similar screens may be displayed for adjusting the sensitivity of the HVAC controller 18 to certain diagnostic faults for the cooling mode, if desired. Similar screens may be displayed for adjusting the sensitivity of the HVAC controller 18 to certain diagnostic faults for heating, cooling, and any other modes combined.

Figure 18C:
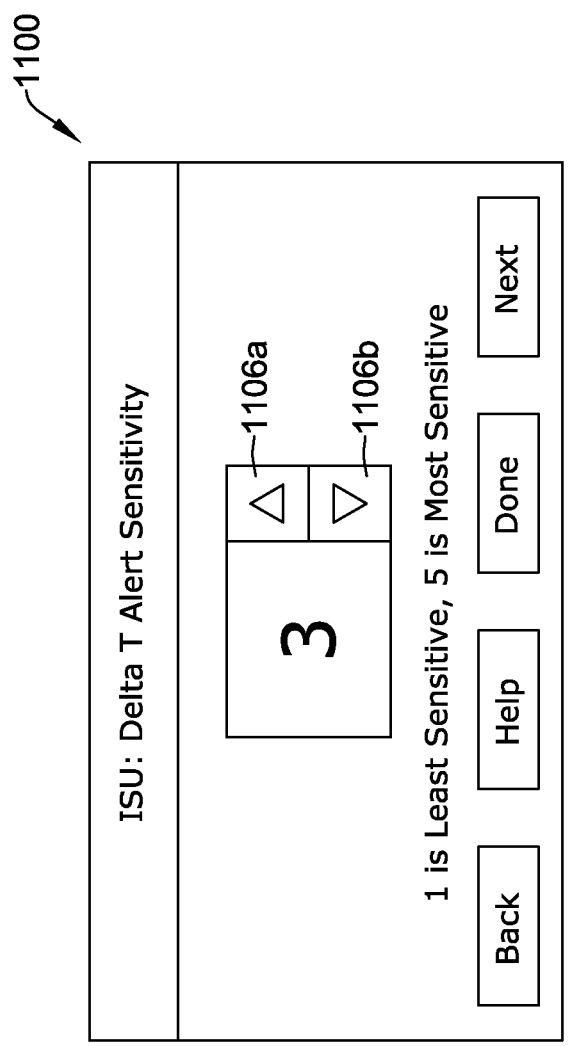
Figure 18D:
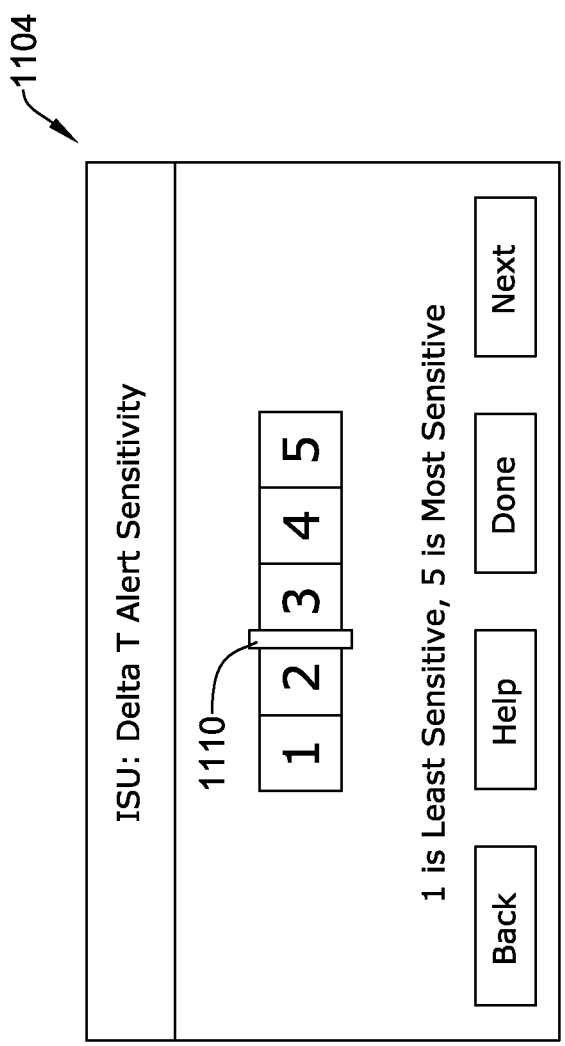

In other instances, the controller 18 be configured to display a screen 1100 or 1104 as shown in FIGS. 18C and 18D that may allow a user to select an alert sensitivity along a scale say 1 to 5, with 1 being least sensitive and 5 being most sensitive. In some instances, the HVAC controller 18 may display first and second arrow keys 1106a and 1106b or a slider bar that may allow a user to select a sensitivity along a scale of say 1 to 5, with 1 being least sensitive and 5 being most sensitive. In some cases, the first and second arrow keys 1106a, 1106b and/or the slide bar 1110 may be associated with certain qualitative indicators along the scale, such as "most sensitive" and "less sensitive" to provide the user with a qualitative description of the scale. The HVAC controller 18 may convert the selected sensitivity along the scale into, for example, quantitative numbers that can be used to determine if a user should be alerted to a detected fault. For example, a selected sensitivity of 1 (least sensitive) may be converted into 1 fault out of the most recent 200 HVAC cycles, and these quantitative numbers may be used by the HVAC controller 18 similar to those shown set in FIG. 18B. Likewise, a selected sensitivity of 5 (most sensitive) along the slider bar scale may be converted into a 10 fault out of the most recent 20 HVAC cycles. A selected sensitivity of 2.5 along the slider bar scale, as shown in FIG. 18D, may be converted into 3 faults out of the last 50 cycles. In any of these examples, a sensitivity selection may also correspond to more than one set of criteria to determine if a user should be alerted to a detected fault. For example, a single sensitivity selection could correspond to either 3 faults of the last 3 cycles, 5 faults of the last 10 cycles or 10 faults of the last 30 cycles. In some cases, it is contemplated that the quantitative numbers may also be displayed as the user manipulates the slider bar. As such, it is contemplated that qualitative and/or quantitative values may be displayed. The use of a slider bar 1110 and/or first and second arrow keys 1106a, 1106b are just some examples. It is contemplated that any suitable interface mechanism may be used that allows a user to adjust a sensitivity of the HVAC controller 18 to reporting certain diagnostic faults to the user, as desired.

Figure 19:
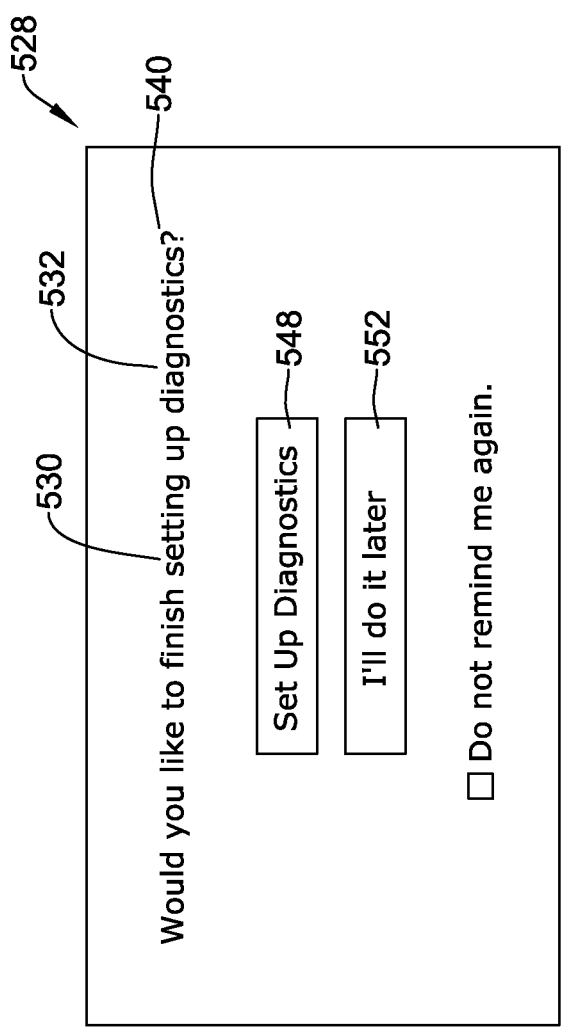

Before or after completion of determining the various conditions under which one or more diagnostic faults are to be ignored and/or whether or not certain alerts (e.g. delta T alerts) should be displayed to the building occupant (e.g. homeowner), the HVAC controller 18 may display another user query screen 528, such as shown in FIG. 19. The user query screen 528 of FIG. 19 may query a user as to whether or not they desire to complete diagnostics set up for the HVAC system 4. For example, as shown in the illustrative example provided in FIG. 19, the user query screen 528 may include a user query 532 containing a simple text string 536 that may query the user "Would you like to finish setting up diagnostics?" Additionally, user query screen 528 may include a user message 540 that provides additional information to the user. For example, user message 540 may include a simple text string that may caution the user that "Diagnostics are limited to basic failures until setup is complete." User query screen 538 may also provide at least a first option 548 for responding to the user query 532 that when selected, may cause the HVAC controller 18 to display an additional one or more screens that may allow the user to complete diagnostics set up for the HVAC system 4.

In some cases, user query screen 528 may also provide a second option 552 for responding to the user query 532 that, when selected, may allow a user to at least temporarily suspend completion of the diagnostics set up for the HVAC system 4 and may cause the HVAC controller 18 to display a home screen such as home screen 72 as shown in FIG. 4A or continue with other setup screens. If, at a later time, the user desires to complete the diagnostics set up process, the user may continue diagnostics setup by selecting the SET DIAGNOSTIC LIMITS installer option 190 as provided in the illustrative installer options menu screen 166 as shown in FIG. 7.

In some instances, and to complete the diagnostics set up process, the HVAC controller 18 may be programmed to display a series of diagnostics test screens that may guide the user through initiating and executing a test for determining minimum and maximum delta T limits upon which the delta T faults may be based. In some instances, upon selection of the first option 548 labeled "Set Up Diagnostics" in FIG. 19, the HVAC controller 18 may be programmed to display at least a first screen for initiating a test that may cause the HVAC controller 18 to operate the HVAC system 4 and identify a current delta T for a particular mode and stage combination of the HVAC system 4.

It will be understood by those of skill in the art that an HVAC system 4 may have more than one stage for both cooling and heating. In some cases, an exemplary HVAC system 4 may include two or more equipment stages for heating and/or cooling. Additionally, it is to be understood that the number of equipment stages for one mode (e.g. heat) may be the same or different as the number of equipment stages for the other mode (e.g. cool). It may also be understood, that an HVAC system may have only one operational mode (e.g. heat or cool).

Figure 20A:
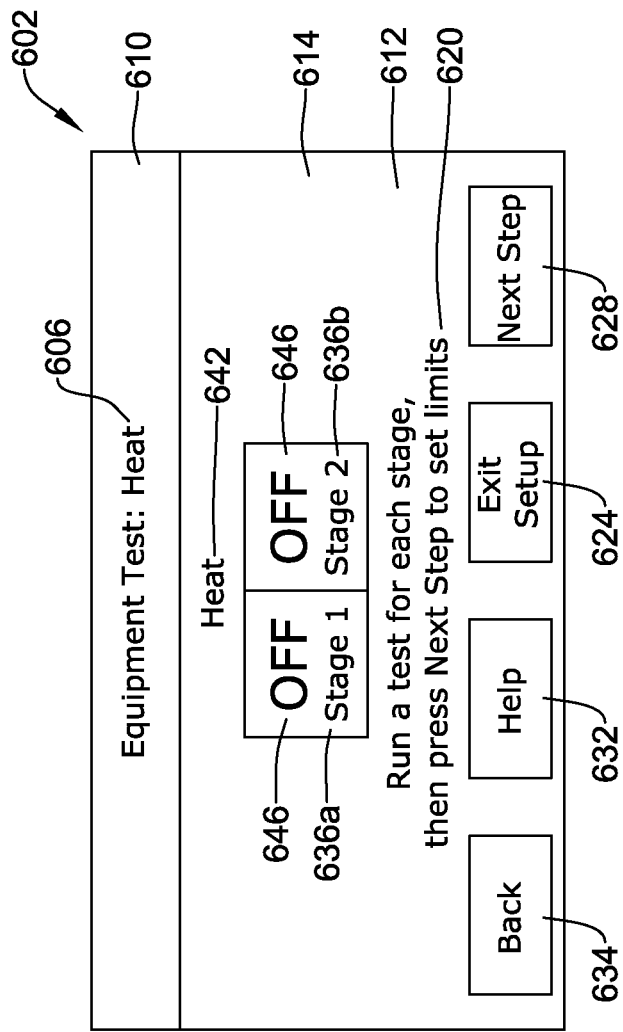
Figure 20B:
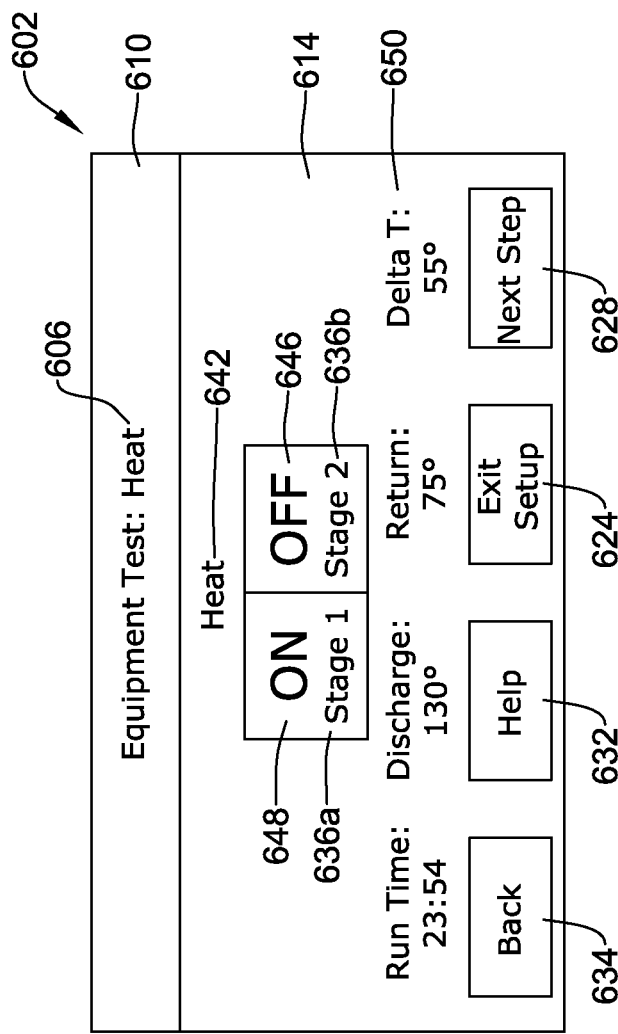
Figure 20C:
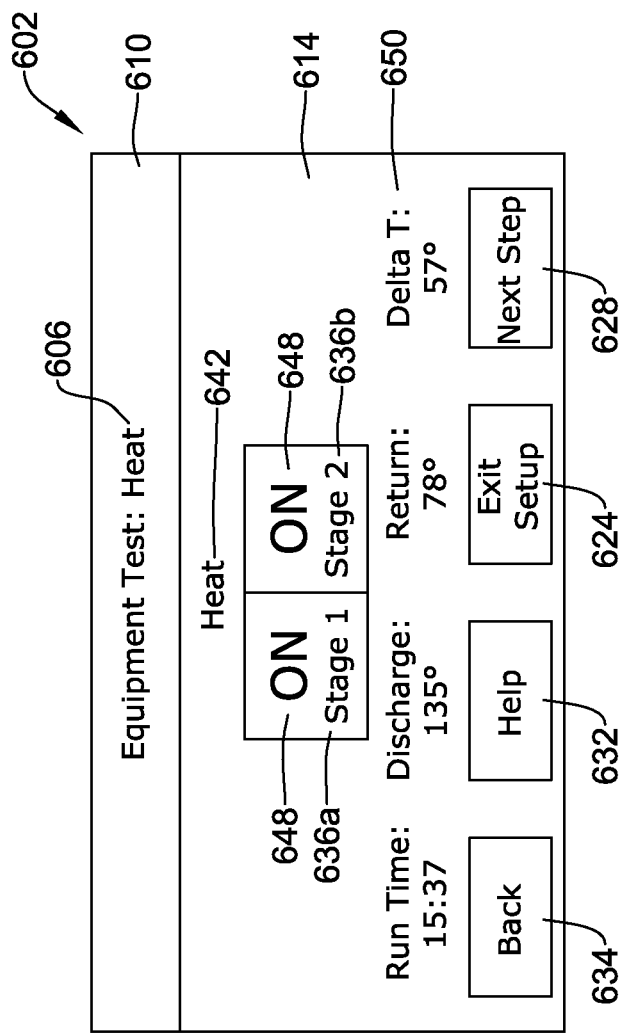

FIGS. 20A-20C provide illustrative examples of several diagnostics test screens that may be displayed by the HVAC controller 18 upon initiation of at least one diagnostic test that may be used to determine a minimum and maximum delta T limit upon which a delta T fault may be based, at least in part, for each mode and stage combination of the HVAC system. In some cases, a diagnostic test may be initiated separately for each mode and/or stage combination of the HVAC system 4. When so provided, a minimum and maximum delta T limit for each mode and/or stage combination of the HVAC system 4 may be independently determined.

FIGS. 20A-20C provide an illustrative example of a diagnostics test screen 602 that may be displayed by the HVAC controller 18 upon selection of, for example, the SET UP DIAGNOSTICS option 548 provided on a previous user query screen such as, for example, user query screen 528 shown in FIG. 19. FIG. 20A shows diagnostics test screen 602 prior to initiation of the installer test. FIGS. 20B-20C show diagnostics test screen 602 while the installer test is active for different equipment stages of the HVAC system 4 for a selected mode. In some instances, the HVAC controller 18 may initiate the diagnostic test upon receipt of a diagnostics test request entered by a user though the user interface. In other instances, upon selection of the SET UP DIAGNOSTICS option 548 provided on exemplary user query screen 528 as shown in FIG. 19, the HVAC controller 18 may be programmed to automatically initiate a diagnostics test for each mode and/or stage combination of the HVAC system 4.

Diagnostics test screen 602 may include a first banner 606 provided along a top portion 610 of screen 602 that may identify the equipment mode (e.g. heating or cooling) for which the test relates. Diagnostics test screen 602 may also include a second banner 612 provided in a middle region 614 of screen 602 that may display a user message 620 which may provide instruction to the user for initiating the installer test. In addition, diagnostics test screen 602 may include an EXIT SETUP button 624 that, when selected, may cause the HVAC controller 18 to exit the current setup and return to a home screen such as, for example, home screen 72 as shown in FIG. 4A. Diagnostics test screen 602 may also include a button 628 labeled NEXT STEP that, when selected, may cause the HVAC controller 18 to advance to and display a subsequent diagnostics test screen. In certain instances, a user may select the NEXT STEP button 628 when satisfied with the current diagnostics test results, and to signal to the HVAC controller 18 that the current test is finished. It should be noted that if the NEXT STEP button 628 is selected prior to activation of the installer test for the displayed mode, or when the run time for the installer test has failed to meet a predetermined measurement time delay, the HVAC controller 18 may skip the test for the displayed mode and/or stage combination, and the delta T data for the displayed mode and its associated equipment stages may not be recorded. It may be possible, however, to return to a skipped diagnostics test screen from a subsequent test screen such that the skipped test may be activated. The diagnostics test screen 602 may include a HELP button 632 that, when selected, may cause HVAC controller 18 to display additional information about the use of the current screen. The diagnostics test screen 602 may display a BACK button 634 that, when selected, may cause HVAC controller 18 to display a previous screen, such as screen 528 shown in FIG. 19.

As shown in FIGS. 20A-20C, the diagnostics test screen 602 may include an ON/OFF button 636a, 636b that, when selected, may activate or deactivate the installer test for each identified mode and/or stage. A separate ON/OFF button (e.g. ON/OFF buttons 636a, 636b) may be provided for each stage of the mode (heating or cooling) for which the diagnostics test is being run. As such, for a single stage heating system, only one ON/OFF button relating to the heat mode may be provided. For a three stage heating system, three ON/OFF buttons relating to the heat mode may be provided.

As shown in FIGS. 20A and 20B, an ON/OFF button 636a, 636b is provided for both a stage 1 and a stage 2 of the heating mode, such that a diagnostics test may be initiated separately for each heating stage. In addition, the diagnostics test screen may include a label 642 identifying the current operation mode of the HVAC system (e.g. cool or heat). The label 642 may appear adjacent the ON/OFF buttons 636a, 636b as shown in the illustrative examples provided in FIGS. 20A-20C.

When a diagnostics test for a selected mode and/or stage combination is not active, the ON/OFF button 636a and/or 636b may include an OFF label 646. When the diagnostics test for a selected mode and/or stage combination is active, the ON/OFF button 636a and/or 636b may include an ON label 648, such as shown in FIGS. 20B and 20C. Additionally, the ON/OFF button 636a and/or 636b may be shaded, grayed out, include a bolded outline or otherwise highlighted to indicate that the installer test is actively running for that stage.

When the diagnostics test for a particular stage has been initiated by a user through the user interface, the HVAC controller 18 may be programmed to operate the selected mode and/or stage combination of the HVAC system 4, and to not operate the non-selected mode and/or stage combination of the HVAC system such that a current delta T value may be determined for the selected mode and/or stage combination of the HVAC system 4. During the test, and as best shown in FIGS. 20B-20C, the HVAC controller 18 may be configured to display a current total run time, a current discharge air temperature, a current return air temperature, and/or a current delta T value for the selected mode and/or stage combination of the HVAC system 4 that is being evaluated. In some instances, and as shown in FIGS. 20B-20C, some or all of these values may be included in a third banner 650 that may be displayed by the diagnostics test screen 602. In some cases, these values may be displayed in the form of a chart or graph such as, for example, shown in FIGS. 23 and 24, which will be described in greater detail herein.

The HVAC controller 18 may be programmed to repeatedly update the current total run time, the current discharge air temperature, the current return air temperature, and/or the current delta T value for the HVAC system 4 displayed on the diagnostics test screen 602 during the diagnostics test. The user (e.g. installer) may monitor the displayed values during the test, and may determine when to terminate the test. In some instances, the test may be terminated by the user (e.g. installer) when the current discharge air temperature, return air temperature, and/or the delta T values that are displayed on the diagnostics test screen stabilize and do not substantially change over a predetermined amount of time.

The installer test for the current mode and stage combination may be terminated by selecting the NEXT STEP button 628 or by selecting an additional equipment stage for evaluation such as, for example HEAT Stage 2 as shown in FIG. 20C.

Selection of an additional equipment stage for testing for the identified mode may cause the HVAC controller 18 to reset the current total run time that is displayed on the diagnostics test screen. Additionally, the HVAC controller 18 may update the discharge air temperature, the return air temperature, and the delta T, as applicable, to reflect the current values associated with the equipment stage currently being evaluated. As the test continues, the HVAC controller 18 may continuously display the current total run time and repeatedly update the displayed values for the discharge air temperature, the return air temperature, and the delta T. The user (e.g. installer) may monitor the displayed values during the test, and determine when to terminate the test. In some instances, the test may be terminated by the user (installer) when the current discharge air temperature, return air temperature, and/or the delta T values that are displayed on the diagnostics test screen stabilize and do not substantially change over a predetermined amount of time. The installer test for the current mode and/or stage combination may be terminated by selecting the NEXT STEP button 628. In other instances, the test may be terminated by the HVAC controller 18 itself after a predetermined amount of time has elapsed, or if the HVAC controller 18 determines that the current discharge air temperature, return air temperature, and/or the delta T values stabilize.

It must be understood that while the illustrative example provide in FIGS. 20A-20C relate to initiating and executing a diagnostics test for each stage of a heating mode of an HVAC system 4, similar screens may be displayed for initiating and executing a diagnostics test for each stage of a cooling mode of an HVAC system 4, as applicable.

Figure 21A:
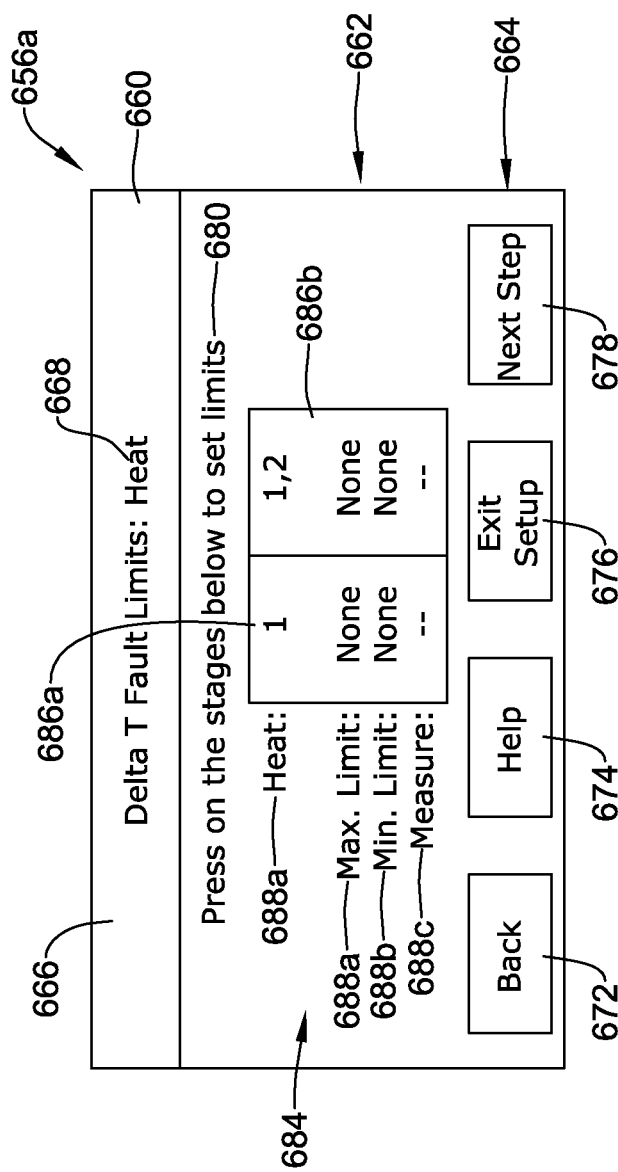

In the example shown, after an installer test has been initiated and activated for each stage (or at least a selected stage) of the selected mode (e.g. heat or cool), selection of the NEXT STEP button 628 may cause the HVAC controller 18 to display at least a first user query screen, such as user query screen 656a of FIG. 21A, through which a user (e.g. installer) may be queried to enter delta T limits for a selected mode and/or stage combination of the HVAC system based, at least in part, on the results from the installer tests. FIGS. 21A-21E provide illustrative examples of user query screens that may be displayed by the HVAC controller 18 on the display 62 of the user interface 48, and that may be used to solicit and accept a delta T limit from a user (e.g. installer) for each selected mode and/or stage combination of the HVAC system 4. In many instances, the delta T limit is a user determined delta T limit that may be determined from, at least in part, the results of the installer tests, but in some cases, may also incorporate some of the installers own knowledge and experience relative to the particular HVAC system 4 at hand.

Figure 21B:
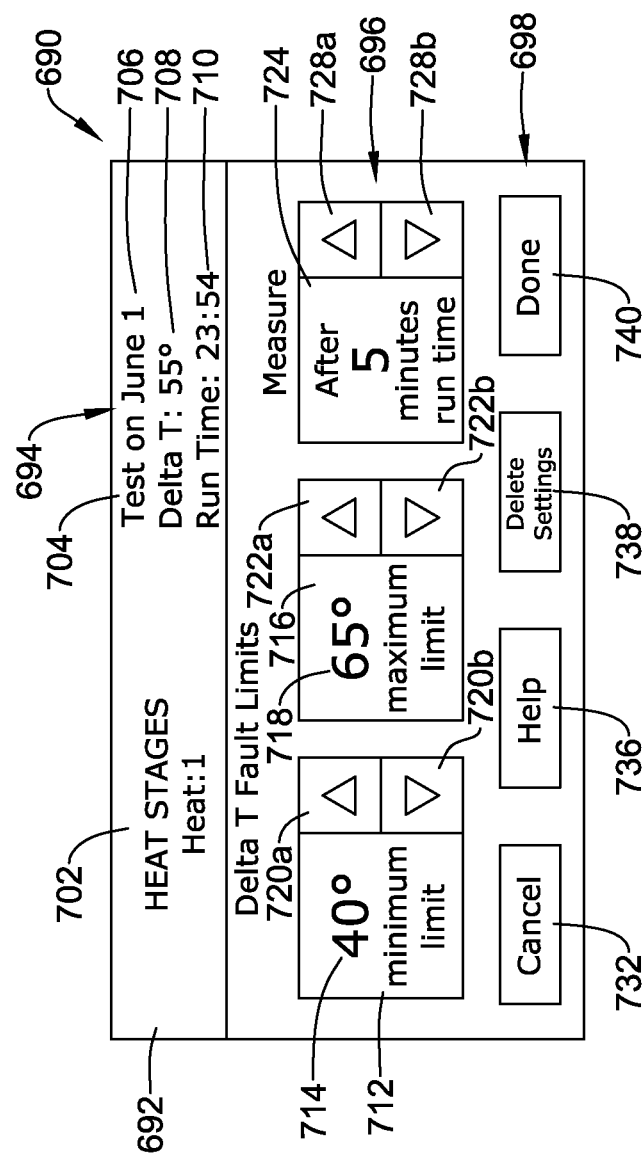
Figure 21C:
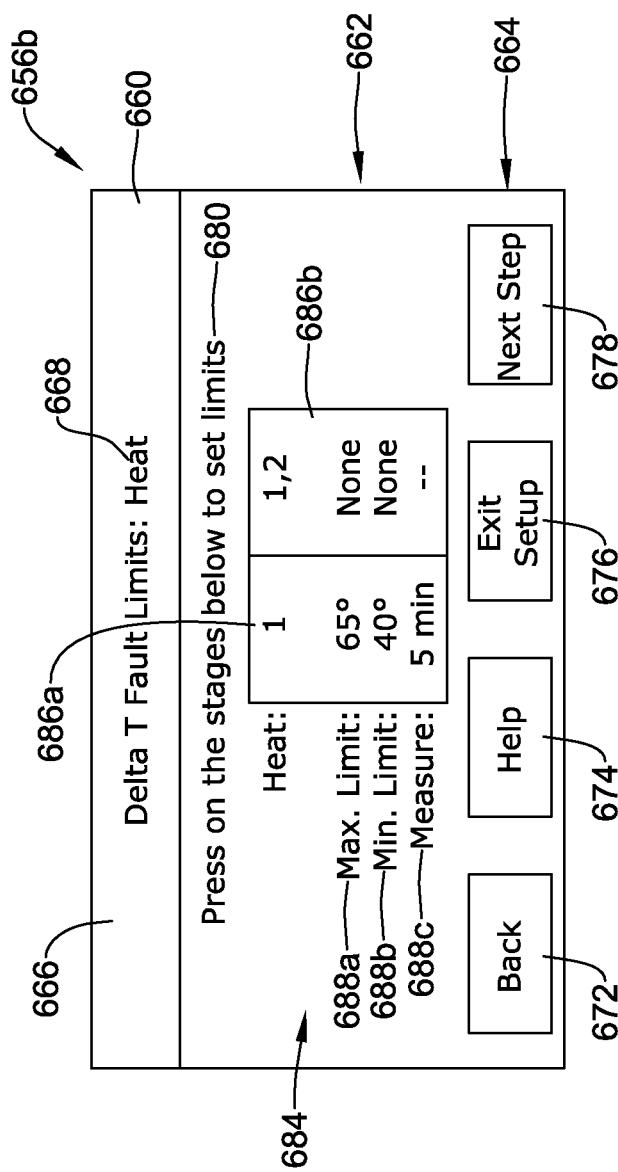

User query screens 656a, 656b, as shown in FIGS. 21A and 21C, may be divided into three regions: a top region 660, a main region 662, and a bottom region 664. The top region 660 of user query screens 656a, 656b may include a banner 666 containing a simple text string 668 identifying the HVAC system mode (e.g. heat or cool) for which the delta T limits are being set. Bottom region 664 of user query screens 656a, 656b may include: a BACK button 672 that, when selected, may cause the HVAC controller 18 to display a previous screen; a HELP button 674 that, when selected, may cause the HVAC controller 18 to display additional information about the use of the current screen; and an EXIT SETUP button 676 that, when selected, may cause the HVAC controller 18 to display a home screen such as, for example, home screen 72 as shown in FIG. 4A.

In some instances, main region 662 of user query screens 656a, 656b (FIGS. 21A and 21C) may contain a user prompt 680 that may be used to prompt the user to take a desired action. For example, user prompt 680 may prompt the user to "Press on the stages below to set limits." Additionally, main region 662 of user query screen 656a, 656b may include a table 684 that may display the minimum and maximum delta T limits for each stage of the selected mode. The table 684 may include any number of rows and columns that may be necessary to display the minimum and maximum delta T limits for each equipment stage of the identified mode. In some cases, the table 684 may display the minimum and maximum delta T limits for each mode and stage combination of the HVAC system 4, but this is not required. As shown in FIGS. 21A and 21C, table 684 includes a column 686a, 686b for each heat stage combination (e.g. stage 1, stage 1,2), and also includes a separate row 688a-c for each of the maximum delta T limit, minimum delta T limit, and measurement time delay. This is just one example screen that may be used. Additional columns and rows for displaying additional data and/or labels related to the HVAC system 4 may be displayed as necessary or desired.

Additionally, it must be understood that while the illustrative example provided in FIGS. 21A-21E relate to setting delta T limits for each stage combination of a heating mode of an HVAC system 4, similar screens may be displayed for setting delta T limits for each stage combination of a cooling mode of the HVAC system 4, as applicable.

In some instances, each of columns 686a, 686b may be individually selectable by a user such that a user may select a stage combination for which to enter a minimum and/or maximum delta T limit and/or measurement time delay. Selection of a column such as, for example, column 686a, corresponding to Heat Stage 1, may cause the HVAC controller 18 to display user query screen 690, as shown in FIG. 21B, that corresponds to the selected stage or stage combination.

User query screen 690 of FIG. 21B may allow the user to enter a minimum and a maximum delta T limit for the selected mode and/or stage combination of the HVAC system 4 (e.g. Heat Stage 1). In many instances, the minimum and maximum delta T limit entered by the user (e.g. installer) may serve, at least in part, as a basis for determining a delta T fault during subsequent operation of the HVAC system 4. In many instances, the delta T limit is a user determined delta T limit that may be based, at least in part, on the results of the installer tests and/or on the experience and judgment of the installer.

In the example shown, the user query screen 690 may also permit the user (e.g. installer) to set a measurement time delay before a measurement is obtained for determining delta T. In many instances, the run time may correspond to a measurement time delay or "Td" for the selected mode and stage combination of the HVAC system 4. "Td" may be described as the amount of time necessary for the particular HVAC system 4 to run and provide significant heating or cooling before diagnostics are in effect. Like the minimum and maximum delta T limits, the measurement time delay or "Td" may be different for each mode and/or stage combination of the HVAC system 4, but this is not required. In many instances, the measurement time delay "Td" entered by the user (e.g. installer) may serve, at least in part, as a basis for determining a delta T fault during subsequent operation of the HVAC system 4. In many instances, the measurement time delay "Td" may be based, at least in part, on the results of the installer tests and/or the experience and judgment of the installer.

User query screen 690 may include one or more regions. In some instances, as shown in the illustrative example of FIG. 21B, user query screen 690 may include four regions: a first region 692; a second region 694; a third region 696; and a fourth region 698. First region 692 may include at least one label 702 identifying the mode and stage combination of the HVAC system 4 for which the delta T limits are being set. In some cases, second region 694 may display a summary of the diagnostic test results for the identified mode and/or stage combination of the HVAC system 4, which may have been initiated using the screens in FIGS. 20A-20C. The test results summary may be displayed in a simplified table 704, which may include the test date 706, a final delta T value 708, and the final run time 710. More or less test data may be collected and/or displayed, as desired.

The third region 696 of the illustrative user query screen 690 may include a first box 712 displaying a default minimum delta T limit value 714, and a second box 716 displaying a default maximum delta T limit value 718. First and second arrow keys 720a, 720b, 722a, 722b may be used to adjust the minimum and maximum delta T limit values 714 and 718 for the identified mode and/or stage combination of the HVAC system 4. In some instances, the third region 696 of user query screen 690 may include a third box 724 displaying a default value for a measurement time delay 726. First and second arrow keys 728a, 728b may be used to adjust the measurement time delay before a delta T measurement is obtained for the mode and/or stage combination identified in the first region 692 of the user query screen 690. In some cases, first box 712, second box 716, and third box 724 may or may not display a value that is not a default value, no value or an indicator that a value has not been set, then they may jump to a value that may or may not be a default value when first adjusted by the installer.

The fourth region 698 of the illustrative user query screen 690 may include a CANCEL button 732, a HELP button 736, and a DONE button 740. The CANCEL button 732, when selected, may cause the HVAC controller 18 to display the previous screen such as, for example, user query screen 656 shown in FIG. 21A. The HELP button 736, when selected, may cause the HVAC controller 18 to display additional information about the use of the current screen. The user may select the DONE button 740 when the user is finished adjusting the minimum and maximum delta T limits and/or the measurement time delay for the selected mode and/or stage combination of the HVAC system 4. The DONE button 640, when selected, may cause the HVAC controller 18 to accept the minimum and maximum delta T limits and/or the measurement time delay entered by the user, and to apply these values to each of the selected mode and/or stage combination during subsequent operation of the HVAC system 4. In some cases, user query screen 690 may also include a DELETE SETTINGS button 738 that, when selected, may allow the user to delete the previous settings by selecting a single button rather than having to reset each of the different limit values displayed in the first box 714, the second box 716 and/or the third box 724 to "None" or "Zero." The minimum and maximum delta T limits and the measurement time delay entered by the user and accepted by the HVAC controller 18 may provide a basis for the HVAC controller 18 to determine when one or more diagnostics faults of the HVAC system 4 occur. In some cases, selection of the DONE button 640 in FIG. 21B may cause to display user query screen 656b as shown in FIG. 21C.

User query screen 656b shown in FIG. 21C may be substantially the same as user query screen 656a shown in FIG. 21A. However, in some instances, user query screen 656b may display the minimum and maximum delta T limits and the measurement time delay for the selected mode and/or stage combination that were previously entered by the user through user query screen 690 shown in FIG. 21B and accepted by the HVAC controller 18. The minimum and maximum delta T limits and the measurement time delay may be displayed in column 686 corresponding to the appropriate mode and/or stage combination for which the values were entered by the user and accepted by the HVAC controller 18 (e.g. column 686a of FIG. 21C).

Figure 21D:
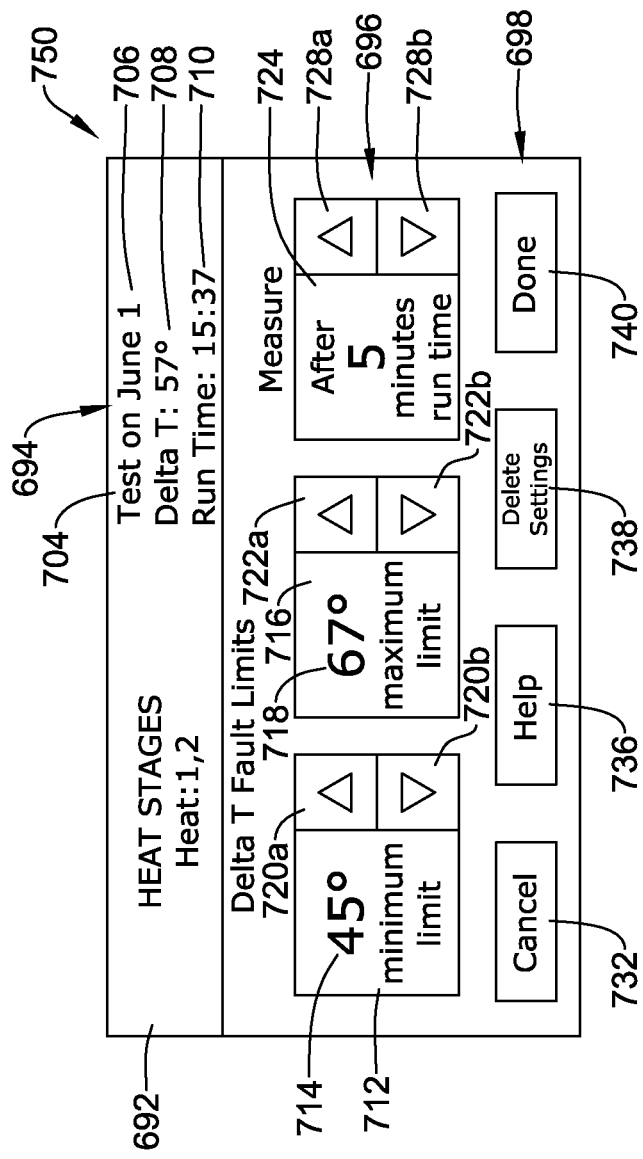

A user may continue to set the minimum and maximum delta T limits and measurement time delay for additional equipment stage combinations of the selected mode, as applicable, by selecting another column corresponding to an additional equipment stage combination. For example, a user may select column 686b in FIG. 21C, corresponding to HEAT Stage 1, 2. Selection of column 686b may cause the HVAC controller 18 to display another user query screen 750, as shown in FIG. 21D, that corresponds to the selected stage combination (e.g. HEAT Stage 1, 2). In some cases, the test results summary 704 may be updated to include the test date 706, a final delta T value 708, and the final run time 710 resulting from the test previously conducted on HEAT Stage 1, 2.

Figure 21E:
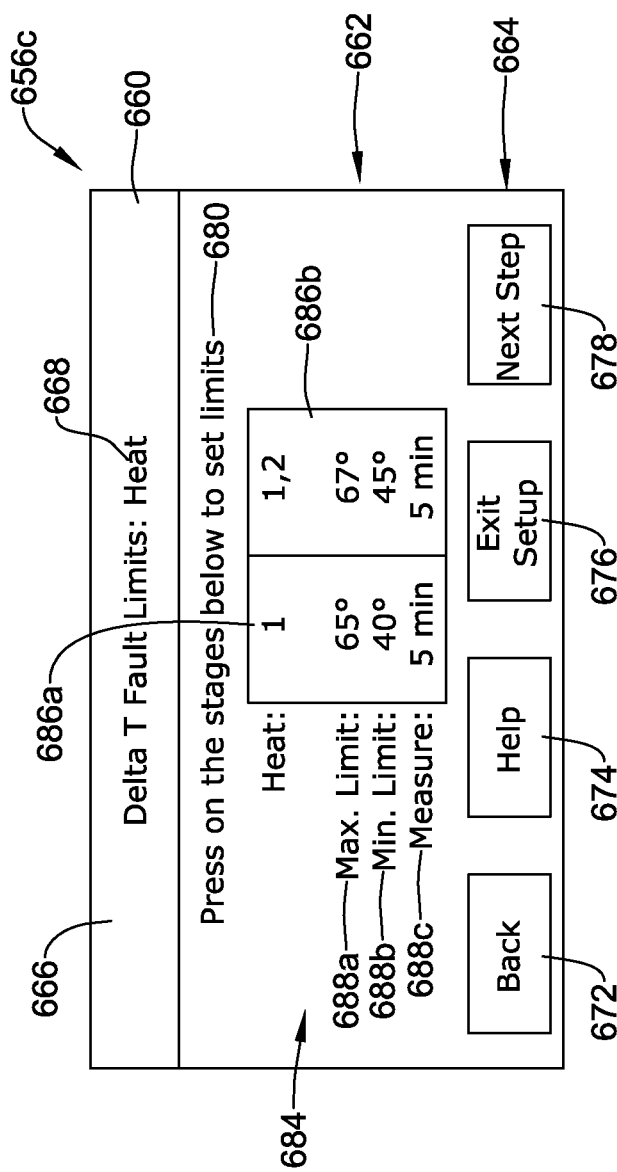

As shown in the illustrative example provided in FIG. 21D, user query screen 750 may include many of the same features as user query screen 690 as shown in FIG. 21B. Through user query screen 750, a user may enter a minimum and maximum delta T limit and a measurement time delay corresponding to the selected mode and/or stage combination (e.g. HEAT Stage 1, 2). Upon entry of minimum and maximum delta T limits and a measurement time delay for the selected mode and/or stage combination of the HVAC system 4, the user may select the DONE button 740 which may cause the HVAC controller 18 to accept the delta T limits and/or measurement time entered by the user and to display an updated user query screen 656c, as shown in FIG. 21E, which may include the minimum and maximum delta T limits and the measurement time that were previously entered by the user through user query screen 750 shown in FIG. 21D. In some cases, user query screen 750 may also include a DELETE SETTINGS button 738 that, when selected, may allow the user to delete the previous settings by selecting a single button rather than having to reset each of the different limit values displayed in the first box 714, the second box 716 and/or the third box 724 to "None" or "Zero." This may expedite alteration of any one of the one or more of the limit values displayed in the first, second and/or third boxes 714, 716 and/or 724. The minimum and maximum delta T limits and the measurement time delay may be displayed in the column corresponding to the mode and stage combination for which the values were set by the user (e.g. column 686b of FIG. 21E).

If there are additional mode and/or stage combinations such as for example, COOL Stage 1 and COOL Stage 1, 2, for which delta T fault limits may be entered, the user may select the NEXT STEP button 678. Selecting the NEXT STEP button 678 may cause the HVAC controller 18 to display additional user query screens that may guide the user through setting minimum and maximum delta T limits and/or a measurement time delay for additional mode and/or stage combinations of the HVAC system 4. When the user is finished entering the diagnostic fault limits (e.g. minimum and maximum delta T limits and/or measurement time delay) for the HVAC system 4, the user may select the EXIT SETUP button 676 that, when selected, may cause the HVAC controller 18 to accept and apply the delta T limit to each corresponding mode and/or stage combination of the HVAC system 4, as applicable. Additionally, selection of the EXIT SETUP button 676 may cause the HVAC controller 18 to display a home screen such as, for example, home screen 72 as shown in FIG. 4A.

Figure 22A:
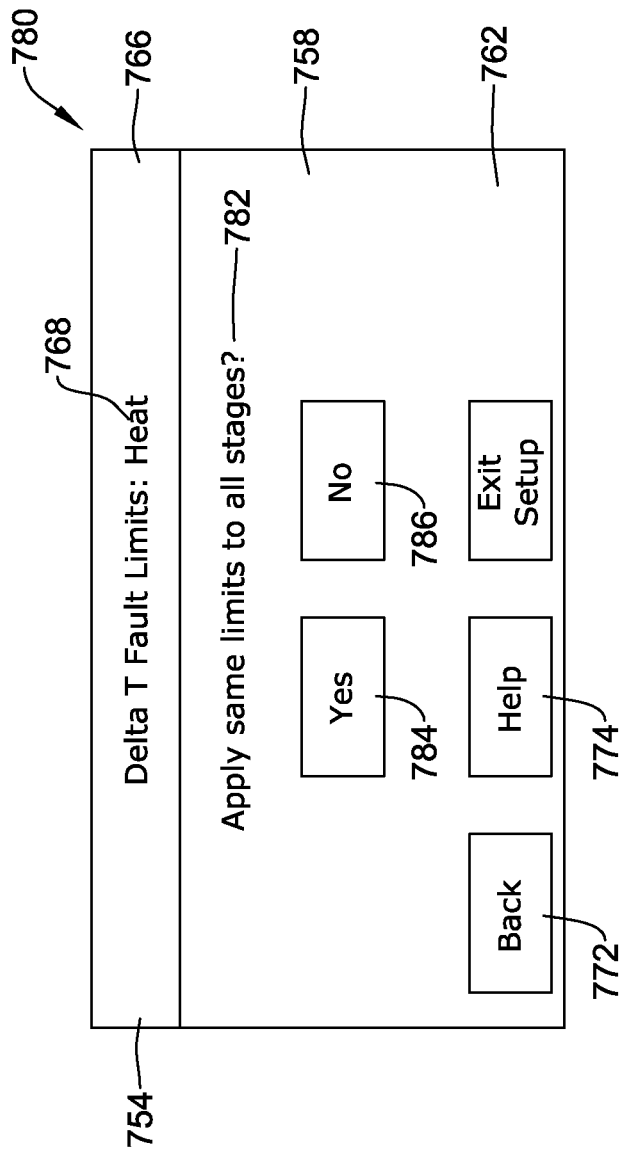
Figure 22B:
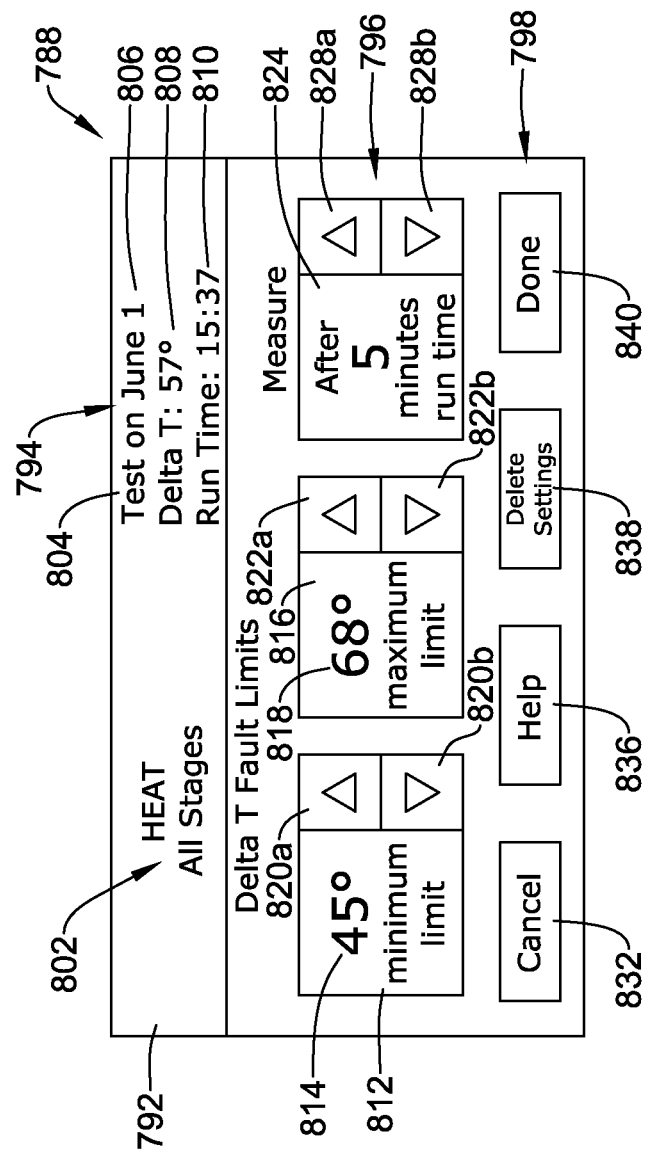

In some cases, a user may have the option to set the same diagnostic fault limits for each stage combination supporting a selected operational mode (e.g. heating or cooling) of an HVAC system. This may be useful in instances where the minimum and maximum delta T limits and/or a measurement time delay did not differ significantly between the different stage combinations supporting the selected operation mode and may, when selected, expedite the set-up process of the HVAC system 4. FIGS. 22A-22B provide illustrative user query screens that may be displayed on the display 62 of the user interface 48 of the HVAC controller 18 when such an option may be available to the user. In particular, FIGS. 22A-22B provide illustrative examples of user query screens that may be used to solicit and accept minimum and maximum delta T limits and/or a measurement time delay from a user for two or more stages that support a selected operational mode (e.g. Heating or Cooling) of the HVAC system 4. It should be understood that while the illustrative example provided in FIGS. 22A-22B relates to setting the same delta T limits for each stage of a heating mode of an HVAC system 4, similar screens may be displayed for setting delta T limits for each stage of a cooling mode of the HVAC system 4, if desired.

Specifically with respect to FIG. 22A, before or after an installer test has been initiated and activated for each stage of the selected mode (e.g. heat or cool), as applicable, the HVAC controller 18 may be configured to display at least a first user query screen 780 which may query the a user as to whether or not they desire to apply the same diagnostic limits to all stages of the selected mode. User query screen 780, as shown in FIG. 22A, may be divided into three regions: a top region 754, a main region 758, and a bottom region 762. The top region 754 may include a banner 766 containing a simple text string 768 identifying the HVAC system mode (e.g. heat or cool) for which the delta T limits may be set. Bottom region 762 of user query screen 750 may include: a BACK button 772 that, when selected, may cause the HVAC controller 18 to display a previous screen; a HELP button 774 that, when selected, may cause the HVAC controller 18 to display additional information about the use of the current screen; and an EXIT SETUP button 776 that, when selected, may cause the HVAC controller 18 to display a home screen such as, for example, home screen 72 as shown in FIG. 4A.

In some instances, main region 758 of user query screen 780 may contain a user query 782 that may query the user regarding a certain action. For example, illustrative user query 780 queries the user about whether or not to "Apply same limits to all stages?" Additionally, main region 758 of user query screen 780 may include at least a first option 784 for responding to the user query 782. In some cases, the user may be presented with a first option 784 labeled "Yes", and a second option 786 labeled "No" for responding to the user query 782. Upon selection of the option 784 labeled "Yes", the HVAC controller 18 may display subsequent user query screen 788, such as shown in FIG. 22B, which may prompt the user to set a minimum and maximum delta T limit and/or a measurement time delay for all of the equipment stages that support the selected mode.

With reference to FIG. 22A, user query screen 788 may permit the user to enter a minimum and a maximum delta T limit to be applied to each stage supporting the selected mode (e.g. Heat) of the HVAC system 4. In many instances, the minimum and maximum delta T limit entered by the user may serve, at least in part, as a basis for determining a delta T fault for each of the stages. Additionally, user query screen 788 may query the user to set a measurement time delay before a measurement is obtained for determining delta T, but this is not required. In many instance, the measurement time delay may correspond to "Td" for each equipment stage supporting the selected mode of the HVAC system.

User query screen 788 may include one or more regions. In some instances, and as shown in the illustrative example provided in FIG. 22B, user query screen may include four regions: a first region 792; a second region 794; a third region 796; and a fourth region 798. First region 792 may include at least one label 802 identifying the operation of the HVAC system for which the delta T limits are being set. In some cases, second region 794 may display a summary of the most recent diagnostic test results for the identified mode of the HVAC system, regardless of equipment stage, but this is not required. The test results summary may be displayed in a simplified table 804. In some instances, table 804 may include the test date 806, a final delta T value 808, and the final run time 810. It will be understood that table 804 may also include additional data that may be useful to the user.

The third region 796 of user query screen 788 may include a first box 812 displaying a default minimum delta T limit value 814, and a second box 816 displaying a default maximum limit value 818. First and second arrow keys 820a, 820b, 822a, 822b may be used to adjust the minimum and maximum delta T limits for the identified mode of the HVAC system. In some instances, the third region 796 of user query screen 788 may also include a third box 824 displaying a default value for a measurement time delay 826. First and second arrow keys 828a, 828b may be used to adjust the measurement time delay before a delta T measurement is obtained for the mode and/or stage combination identified in the first region 792 of the user query screen 788. In some cases, first box 812, second box 816, and third box 824 may or may not display a value that is not a default value, no value, or an indicator that a value has not yet been set. If boxes 812,816, and/or 824 display no value or an indicator than a value has not been set, then they may jump to a value that may or may not be a default value when first adjusted by the installer.

The fourth region 798 of user query screen 788 may include a CANCEL button 832, a HELP button 836, and a DONE button 840. The CANCEL button 832, when selected, may cause the HVAC controller 18 to display the previous screen such as, for example, user query screen 750 shown in FIG. 22A. The HELP button 836, when selected, may cause the HVAC controller 18 to display additional information about the use of the current screen. The user may select the DONE button 840 when the user is finished adjusting the minimum and maximum delta T limits and/or the measurement time delay for the selected mode of the HVAC system 4. The DONE button 840, when selected, may cause the HVAC controller 18 to accept the minimum and maximum delta T limits and/or the measurement time entered by the user, and to apply these values to each stage of the selected mode of the HVAC system 4. In some cases, user query screen 788 may also include a DELETE SETTINGS button 838 that, when selected, may allow the user to delete the previous settings by selecting a single button rather than having to reset each of the different limit values displayed in the first box 814, the second box 816 and/or the third box 824 to "None" or "Zero." The minimum and maximum delta T limits and the measurement time delay entered by the user may provide a basis for the HVAC controller 18 to determine one or more diagnostics faults during subsequent operation of the HVAC system 4.

In many instances, the HVAC controller 18 may determine a performance level of the HVAC system 4 during subsequent operation of the HVAC system 4 based, at least in part, on a delta T limit and/or a measurement time delay entered by the user and stored in the memory 52 of the HVAC controller 18. The performance level may be determined for each mode and/or stage combination of the HVAC system 4 during its operation, but this is not required. For example, in many cases, the HVAC controller 18 may be programmed to determine a performance level of the HVAC system 4 by monitoring a current delta T during operation of the HVAC system, and comparing the current delta T to a delta T limit stored in the controller memory 52. In some cases, the delta T limit may be a user specified delta T limit stored in the controller memory 52, and may be either a maximum or a minimum delta T limit. The delta T limit(s) may be stored in the HVAC controller 18 memory 52 for each mode and/or stage combination of the HVAC system 4, as applicable. In some cases, the HVAC controller 18 may compare the current delta T to the minimum delta T limit, the maximum delta T limit, an additional delta T limit, or any combination thereof. The HVAC controller 18 may be configured to record a delta T fault when the monitored delta T falls outside of a delta T limit stored in the controller memory 52, but in some cases only if the delta T fault does not occur during one or more user specified conditions under which a delta T fault may be ignored. In some cases, the HVAC controller 18 may be configured to alert the user that a diagnostic fault has occurred based, at least in part, on a count of the number of the same type of diagnostic faults recorded by the HVAC controller 18, sometimes in a predetermined period of time or during a predetermined number of previous HVAC cycles.

Figure 23:
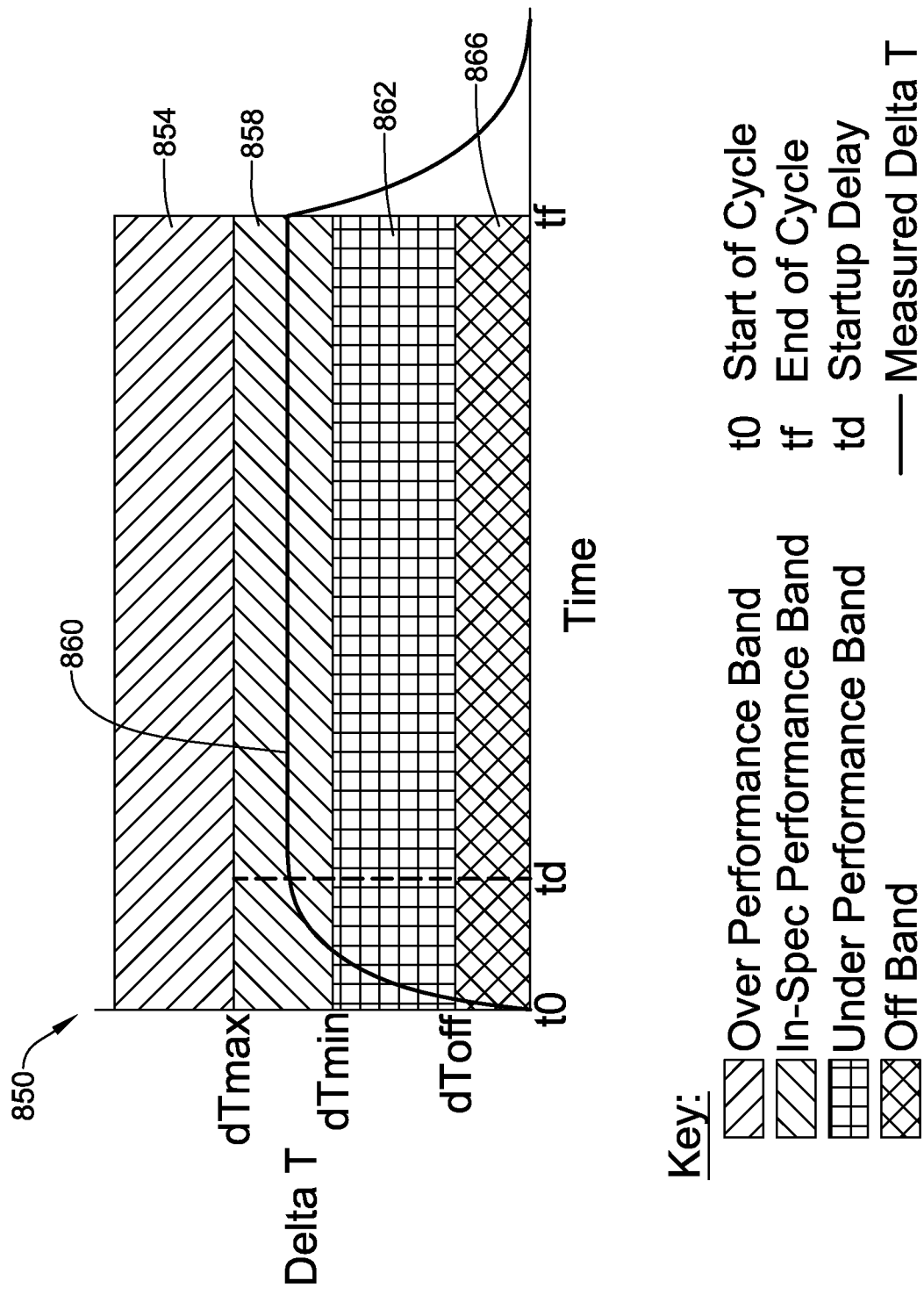
FIGS. 23 and 24 provide illustrative graphs that may be displayed upon the HVAC controllers of FIGS. 2 and 3 when monitoring a current performance of an HVAC system.

FIG. 23 is a graph 850 of a performance level of a selected mode and/or stage combination of the HVAC system 4 based on the minimum and maximum delta T limits (dTmin and dTmax, respectively), and a measurement time delay ("Td"), which is sometimes entered by the user and stored in the controller memory 52. In some cases, the performance level of the HVAC system 4 for a selected mode and/or stage combination of the HVAC system 4 may be based, at least in part, on and off limit temperature (dToff). The off limit temperature or delta Toff may be determined by the manufacturer or, in some cases, by an installer. The off limit temperature, or delta Toff, may represent a minimum delta T threshold in which the HVAC system 4 may need to reach in order for the HVAC controller 18 to determine that the HVAC system 4 is attempting to respond to a call for heating or cooling.

Graph 850, shown in FIG. 23, may display the measured delta T 860 over time, if desired. The graph 850 may be divided into four bands: an over performance band 854, an in-spec performance band 858, an under-performance band 862, and an off band 866. Each performance band in FIG. 23 band is identified by its own unique cross-hatch pattern. An HVAC system 4 operating in the over performance band 854 may be considered as exceeding the system design parameters (i.e. too much delta T across the heat exchanger), which can result in inefficient HVAC system operation and may indicate a malfunctioning HVAC system. An HVAC system 4 operating in the in-spec performance band 858 may be considered as operating according to the system design parameters, and within the diagnostic limits stored in the controller memory 52. An HVAC system 4 operating in the under-performance band 862 may be considered to be not responding adequately to a call for heating or cooling from HVAC controller 18 (too little delta T across the heat exchanger), which can also result in inefficient HVAC system operation and may indicate a malfunctioning HVAC system. An HVAC system 4 operating in the off band 866 may be considered as not responding to a call for heating or cooling from the HVAC controller 18 and may indicate a malfunctioning HVAC system. In some cases, an HVAC system 4 may not respond to a call for heating or cooling, as applicable, during a period in which the HVAC system 4 is subject to a utility load shutoff event, a defrost cycle, a power outage, or some other event in which normal HVAC system 4 operation has been suspended for a period of time. In some cases, an HVAC system 4 may not respond to a call for heating or cooling if there is a failure of one or more HVAC components of the HVAC system 4, which may require service from a contractor or the like.

In some instances, the over performance, in-spec performance, an under-performance bands 854, 858, and 862 may be based, at least in part, on minimum delta T and/or maximum delta T limits, and a measurement time delay ("Td") before a delta T measurement is taken. The off band 866 may be based, at least in part, on an off limit temperature stored in the controller memory 52. As discussed above, the off limit temperature (dToff) may be determined by the manufacturer, the installer, or in some other way. In some cases, the maximum delta T limit (dTmax) is made at least four (4) degrees greater than the minimum delta T limit (dTmin), but could be any number of degrees zero or greater. Likewise, the minimum delta T limit (dTmin) could be any number of degrees zero or greater than the off limit temperature (dToff), but this is also not required.

In some cases, the HVAC controller 18 may be configured to display graph 850 on the display 62 of the user interface 48 in response to a request entered through the user interface 48 by the user. The HVAC controller 18 may be configured to periodically update graph 850 with the measured delta T 860 over time during operation of the HVAC system 4. A different graph 850 may be displayed for each mode and/or stage combination of the HVAC system 4, as applicable. When displayed, the graph 850 that may be displayed to the user may represent a current performance level of the current mode and/or stage combination under which the HVAC system 4 is currently operating.

During operation of the HVAC system 4, the HVAC controller 18 may be programmed to determine a performance level of the HVAC system and, in some cases, alert the user when the HVAC system 4 does not meet an expected performance level (sometimes this is performed for the current stage and/or mode combination of the operating HVAC system 4). In some cases, the HVAC controller 18 may determine that the HVAC system 4 is not meeting an expected performance level when the HVAC controller 18 has determined that the HVAC system 4 is operating outside of a normal operating range (e.g. outside of the in-spec performance band 858) of the HVAC system 4. For example, the HVAC controller 18 may determine that the HVAC system 4 is not meeting an expected performance level when the HVAC controller 18 has determined that the HVAC system 4 is operating in the over performance band 805, the under-performance band 862, or in the off band 866.

As described above, the performance band may be defined, in part, on a minimum delta T limit, a maximum delta T limit, an off delta T limit, and a measurement time delay value, or some combination thereof. When the HVAC controller 18 determines that a measure delta T value 860 falls within the over performance band 854, the under-performance band 862, or in the off band 866 after the measurement time delay value ("Td") has expired, the HVAC controller 18 may determine that a delta T limit has been violated, and as a result, may record a diagnostic fault in an alerts and/or faults log stored in the controller memory 52. In some cases, the HVAC controller 18 may be programmed to display a user alert on the display 62 of the user interface 48 or otherwise provide an alert to the user indicating that the HVAC system 4 is not currently meeting an expected performance level.

In some cases, the HVAC controller 18 may be programmed to repeatedly monitor signals received from the HVAC system 4 that are indicative of a current performance level of the HVAC system 4, and to determine if the current performance of the HVAC system 4 falls below a minimum performance level for at least a first predetermined amount of time "T1". In some cases, the minimum performance level may correspond to a minimum delta T limit or off delta T limit for the HVAC system 4. As described above, a minimum delta T limit or off delta T limit may be stored in the controller memory 52, sometimes for each mode and/or stage combination of the HVAC system 4. In some cases, the first predetermined amount of time ("T1") may be determined by a user (e.g. installer) and stored in the controller memory 52, sometimes for each mode and/or stage combination of the HVAC system 4. In some cases, the first predetermined amount of time ("T1") may be set by the manufacturer. In some cases, the first predetermined amount of time ("T1") may be different for each mode and/or stage combination of the HVAC system 4.

In some cases, the HVAC controller 18 may be programmed to repeatedly monitor signals received from the HVAC system 4 that are indicative of a current performance level of the HVAC system 4, and to determine if the current performance of the HVAC system 4 rises above a maximum performance level for at least a first predetermined period of time "T1". In some cases, the maximum performance level may correspond to a maximum delta T limit for the HVAC system 4. As described above, a maximum delta T limit may be stored in the controller memory 52, sometimes for each mode and/or stage combination of the HVAC system 4. In some cases, the first predetermined amount of time ("T1") may be determined by a user (e.g. installer) and stored in the controller memory 52, sometimes for each mode and/or stage combination of the HVAC system 4. In some cases, the first predetermined amount of time ("T1") may be set by the manufacturer. In other cases, the first predetermined amount of time ("T1") may be different for each mode and/or stage combination of the HVAC system 4.

Figure 24:
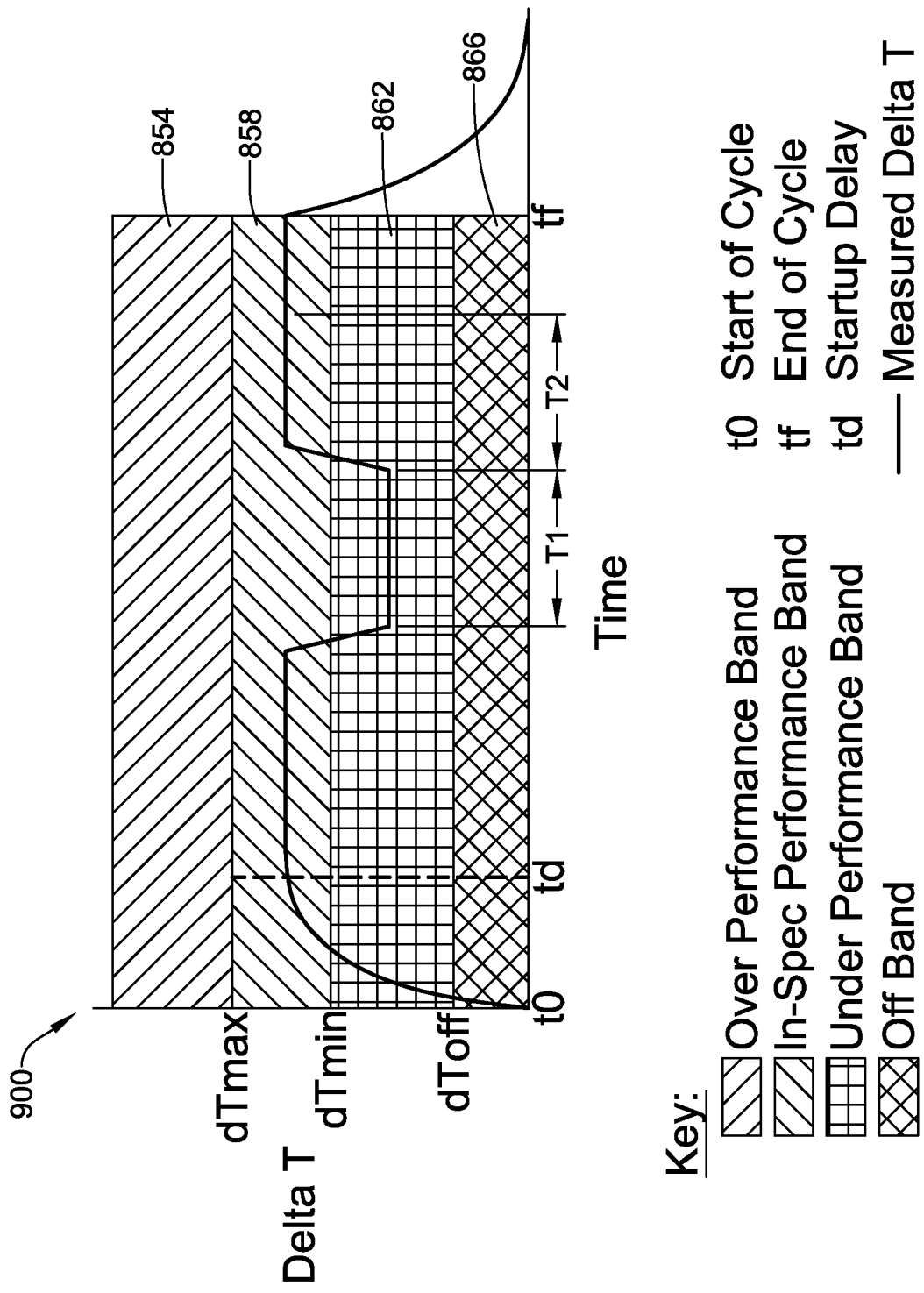

The HVAC controller 18 may be programmed to repeatedly sample a current delta T value 860 of the HVAC system 4, and to compare the measured delta T value 860 to previously-determined minimum and maximum delta T limits or an off delta T limit, as described above. From this, the HVAC controller 18 may determine the current performance level of the HVAC system for the current operating stage combination and/or mode of the HVAC system 4. FIG. 24 is a graph 900 showing a monitored performance of an HVAC system 4 over time in which, for a variety of reasons, the HVAC system 4 may not have met an expected performance level. In the example shown, the HVAC controller 18 may determine that the HVAC system 4 has fallen below a minimum delta T value for at least a first predetermined amount of time "T1", which occurs after the measurement time delay ("Td") for the current HVAC cycle. In response, the HVAC controller 18 may be configured to display a user alert on the display 62 of the user interface 48, or otherwise provide an alert to the user, indicating that the HVAC system 4 does not meet an expected performance level. In certain instances, the HVAC controller 18 may rescind the alert or remove the alert from the display 62 of the HVAC controller 18 if the current performance level subsequently rises and remains above the minimum performance for at least a second predetermined amount of time "T2", as shown in graph 900 of FIG. 24. Graph 900 of FIG. 24, like graph 850 of FIG. 23, may be displayed on the display 62 of the HVAC controller 18 in response to a request by a user, and may be periodically updated. In some cases, the first predetermined amount of time "T1" may be different than the second predetermined amount of time "T2". In other cases, the first and second predetermined amount of times "T1" and "T2" may be equal to one another, but this is not required.

In some cases, the HVAC controller 18 may be configured to determine if the current performance level of the HVAC system 4 falls below a minimum performance level or rises above a maximum performance level for the first predetermined amount of time "T1" during a single cycle of the HVAC system 4. For example, the current performance level of the HVAC system 4 may fall below a minimum performance level during an HVAC cycle if the HVAC system 4 is returning to normal operation after a utility load shutoff event or a defrost cycle. In such an instance, the HVAC system 4 may fall below a minimum performance level for a first cycle or part of a first cycle, but may reach an expected performance level by the next subsequent cycle or later part of the first cycle, at which point any alert that may have been indicated by the HVAC controller 18 may be rescinded. If, however, a situation arises in which the HVAC system 4 still has not reached an expected minimum performance level at the end of the current cycle or by the start of the next cycle, the HVAC controller 18 may log a diagnostic fault and may continue to provide an indication of an alert to the user. In some cases, the HVAC controller 18 may be programmed to determine if the HVAC cycle was too short to adequately respond to a call for cool or heat. In such an instance, the HVAC controller 18 may be programmed to ignore a fault when the HVAC controller 18 has determined that the HVAC cycle was too short. Instead, the HVAC controller 18 may accept and evaluate performance data from the next or subsequent one or more cycles before determining whether or not the current performance level of the HVAC system 4 meets a minimum or expected performance level.

Figure 25:
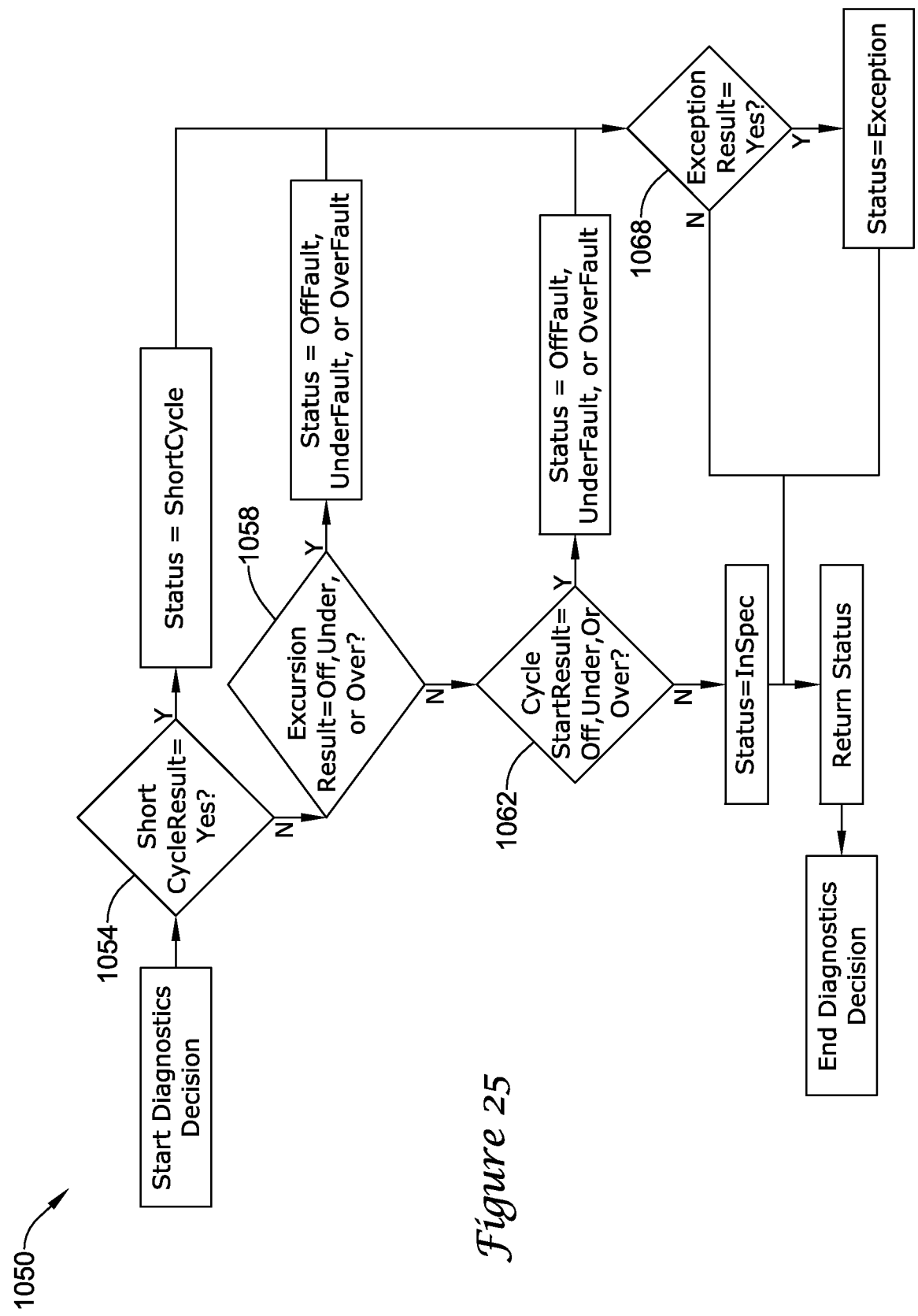
FIGS. 25-27 provide flow charts of illustrative tests that may be executed by an HVAC controller to determine if an HVAC cycle is operating properly.

In some cases, the HVAC controller 18 may be programmed to execute one or more tests to determine if the HVAC system 4 is functioning properly before the current performance level of the HVAC system 4 is evaluated. In some cases, the HVAC controller 18 may be programmed to perform the one or more tests during each HVAC cycle, but this is not required. In some cases, the HVAC controller 18 may be programmed to execute a short cycle test, an excursion test, a cycle start test, and/or an exception test to determine if the HVAC system is functioning properly during the selected cycle. FIG. 25 is a flow chart 1050 showing selected tests as they may be executed and/or evaluated by the HVAC controller 18 for an HVAC system 4 that is not subject to a utility shutoff event or defrost cycle to determine if a fault occurred during an HVAC cycle. This is just one example.

In some cases, the short cycle test 1054 may be used by the HVAC controller 18 to determine if an HVAC cycle was too short to consider for diagnostics. An HVAC cycle may be considered too short for diagnostics if the HVAC cycle lasted less than, for example, Td+1 minute.

An excursion test 1058 may be used by the HVAC controller 18 to determine if the HVAC system 4 operated in the over performance band 854, the under-performance band 862 or the off-band 866, for at least a predetermined amount of time. In some cases, each stage combination of the HVAC system 4 may be permitted to operate in the over performance band 854, the under-performance band 862 and/or the off-band 866 for a limited amount of time without triggering a fault. In some cases, the off-band 866 may be considered in common with the under-performance band 866. These limits may be predetermined by the HVAC controller 18, sometimes based on the configuration of the HVAC system 4. If the HVAC controller 18 has determined that an excursion has occurred, a fault may be recorded by the HVAC controller 18 in a faults log stored in the controller memory 52. In some cases, the off-band 866 may be considered in common with the under-performance band 866.

In some cases, the HVAC controller 18 may execute a cycle start test 1062. The cycle start test 1062 may be executed by the HVAC controller 18 to determine if the current HVAC cycle started as expected. The cycle start test 1062 may be used to determine if the HVAC system 4 was operating in the over performance band 854, the under-performance band 862, or the off band 866 (FIGS. 23 and 24) after the period Td, a period Td+1 minute, a period based on the settings Td, and/or any other predetermined period expires. In some cases, the off-band 866 may be considered in common with the under-performance band 866.

In some cases, the HVAC controller 18 may also be programmed to execute an exception test 1068. The exception test 1068 may be used by the HVAC controller 18 to determine if there may be any reason detected in the environment or the equipment setup that would indicate that the HVAC cycle should not be used to determine a current performance of the HVAC system 4. For example, if the outside air temperature at the time the HVAC system 4 exceeded a predetermined limit, the HVAC controller 18 may determine that there may be an exception, and the data obtained during that HVAC cycle may be disregarded when determining the current performance level of the HVAC system 4 (which may have otherwise resulted in a fault).

Figure 26:
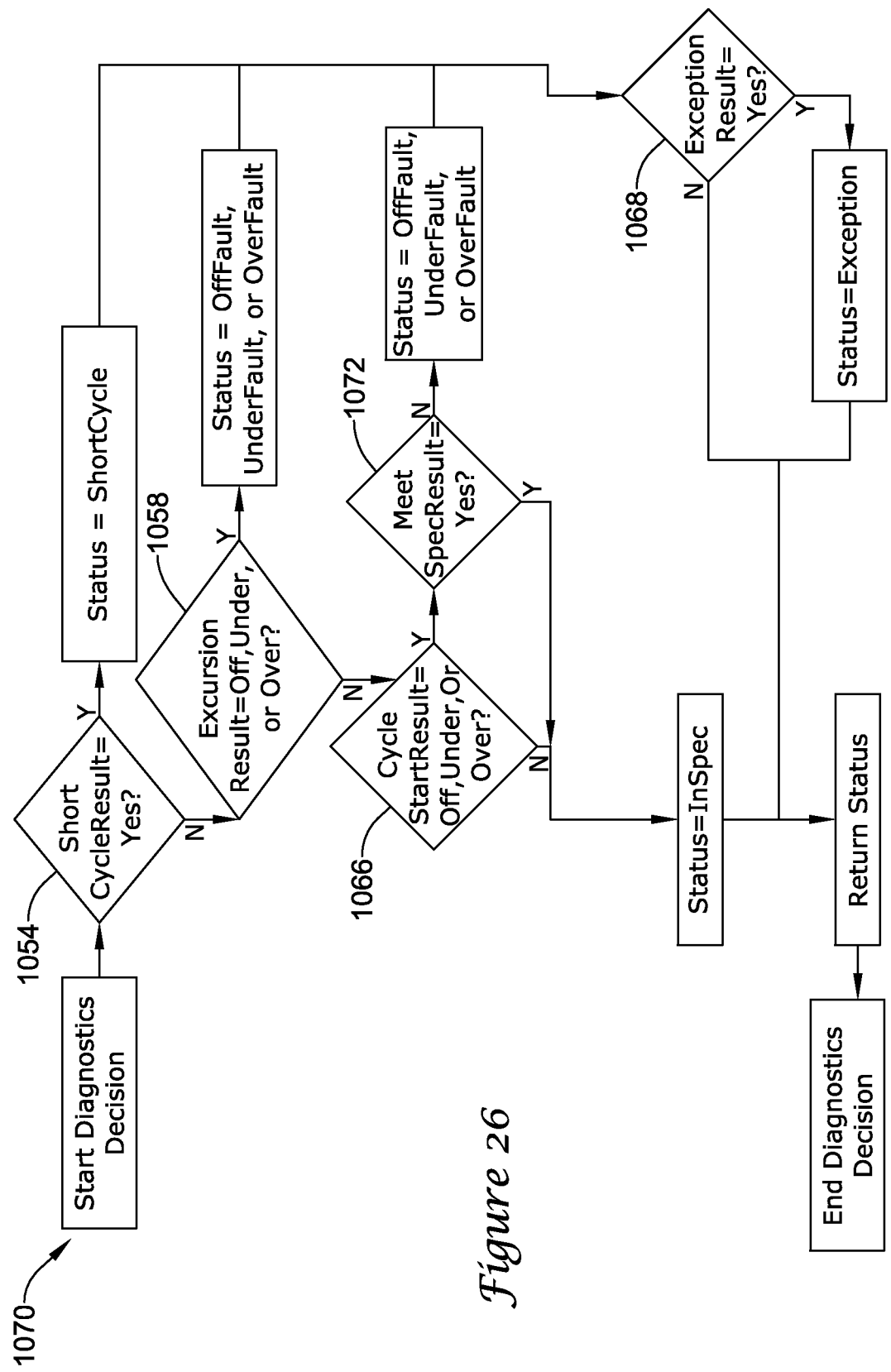

In some cases, and as indicated above, the HVAC system 4 may be subject to a utility shutoff event or defrost cycle. In such cases, the HVAC controller 18 may be programmed to execute at least one other test, sometimes in addition to the short cycle test 1054, the excursion test 1058, the cycle start test 1062, and the exceptions test 1068, to determine if the HVAC system is functioning properly. FIG. 26 shows a flow chart 1070, showing each of the tests as they may be executed and/or evaluated by the HVAC controller 18 for an HVAC system 4 that include one or more equipment stages that are subject to a utility shutoff event or a defrost cycle to determine if a fault occurred during an HVAC cycle. This is just one example.

In addition to the four tests described above, and in the illustrative flow chart of FIG. 26, the HVAC controller 18 may execute a meets specifications test 1072. The meets specifications test 1072 may be used by the HVAC controller 18 to determine if the HVAC system 4 ever operated within the in-spec performance band 858 (FIGS. 23 and 24). If the HVAC controller 18 determines that the HVAC system 4 was never able to operate in the in-spec performance band 858 for at least a predetermined amount of time, then an excursion may be provisionally recorded by the HVAC controller 18 based on the results of the cycle start test 1062. Next, the HVAC controller 18 may determine if an equipment or environmental exception may have occurred. If yes, then the data from the current HVAC cycle may be discarded by the HVAC controller 18, and may not be used by the HVAC controller 18 to determine a current performance level of the HVAC system 4. If no, then a fault may be recorded by the HVAC controller 18 based on the results of the cycle start test.

Figure 27:
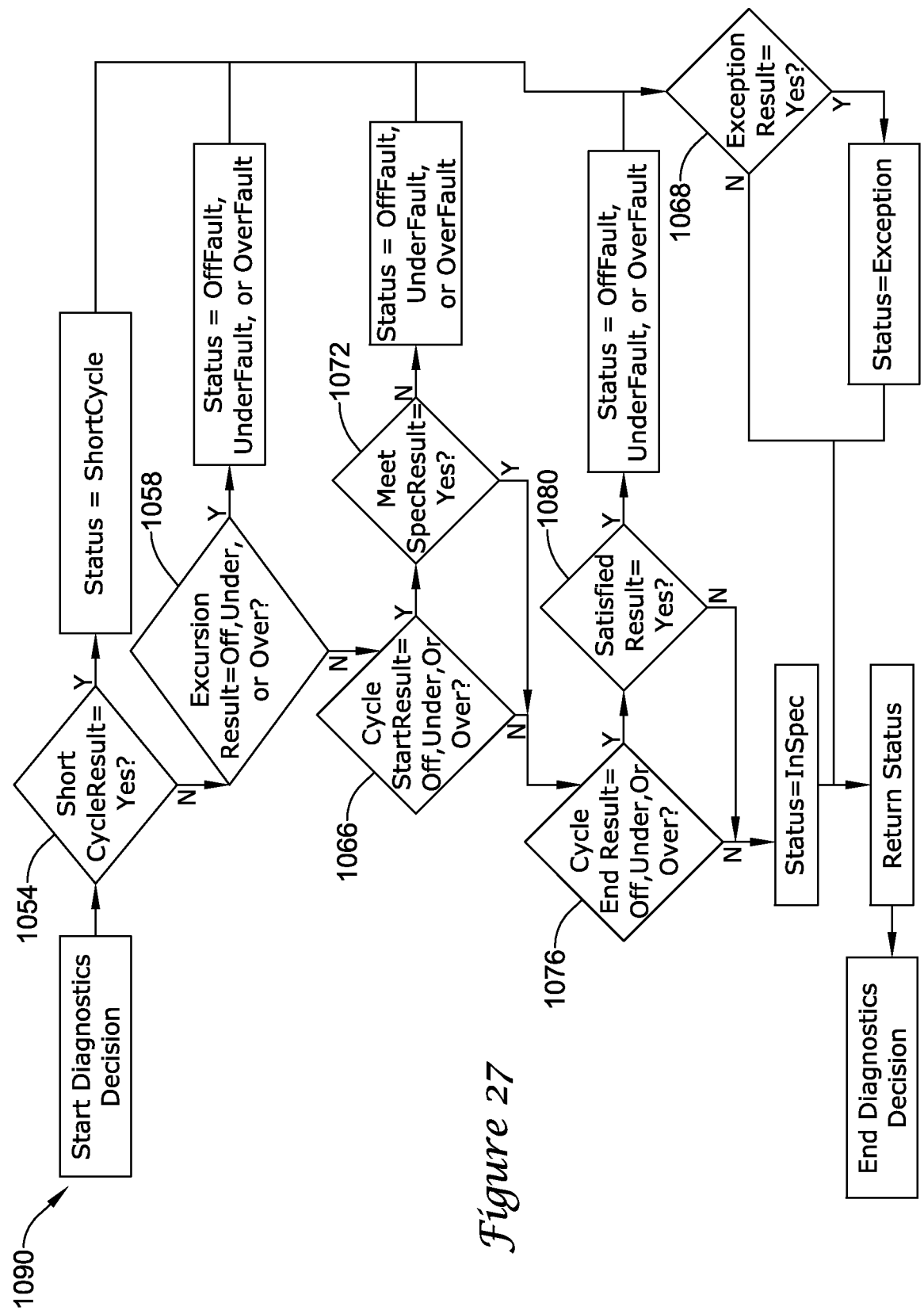

In some cases, the HVAC controller 18 may be optionally programmed to execute a cycle end test 1076 and/or a satisfied call test 1080. FIG. 27 shows a flow chart 1090, showing each of the tests as they may be executed and/or evaluated by the HVAC controller 18 for an HVAC system 4 that includes one or more equipment stages that may be subject to a utility shutoff event or defrost cycle and that may include one or both of a cycle end test and satisfied call test to determine if a fault occurred during an HVAC cycle. This is just one example.

A cycle end test 1076 may be executed by the HVAC controller 18 to determine if the call for heat or cool ended with the HVAC system 4 operating in the in-spec performance band 858. A satisfied call test may be executed by the HVAC controller 18 to determine if a call for heat or cool ended due to it being satisfied by the HVAC system 4.

The HVAC controller 18 may be programmed to combine the results of one or more of these tests to determine if the HVAC system 4 is operating properly for the cycle during which the current performance level of the HVAC system 4 is evaluated. If the HVAC controller 18 determines that the HVAC system 4 was functioning properly during the HVAC cycle, the HVAC controller 18 may use the HVAC cycle to determine a current performance level of the HVAC system 4. The determination that a fault has occurred can be made at any time when enough data is present to complete all of the tests that may affect the determination outcome.

In some cases, the HVAC controller 18 may be programmed to monitor a count of the number of times a current performance level of the HVAC system 4 falls outside the normal operating parameters of the HVAC system 4, as determined by the maximum delta T limit, the minimum delta T limit and/or the off delta T limit, over a predetermined amount of time or over a predetermined number of HVAC cycles. In some cases, the HVAC controller 18 may be configured to provide an alert only after a predetermined number of diagnostic faults such as, for example, a delta T fault, are detected during a predetermined number of HVAC cycles. Also, the HVAC controller 18 may be programmed to determine whether or not a diagnostic fault has occurred during one or more user specified conditions under which a fault may be ignored or allowed by the HVAC controller 18. If the HVAC controller 18 determines that a diagnostic fault has occurred during a condition in which the user has specified that a delta T fault may be ignored, the HVAC controller 18 may, in some cases, still record the diagnostic fault in the memory 52, but may provide no indication to a user that a diagnostic limit such as, for example a delta T limit has been violated.

In some cases, the HVAC controller 18 may be programmed to identify and classify the type of diagnostic faults that have occurred. The HVAC controller 18 may then record the fault in a fault and alerts log according to its fault type. In some cases, the HVAC controller 18 may be configured to record a diagnostic fault only after a predetermined number of faults of the same fault type have been identified by the HVAC controller 18. Additionally, in some instances, the HVAC controller 18 may be configured to provide an alert to the user only after a predetermined number of faults of the same fault type have been identified by the HVAC controller 18. Exemplary fault types include, but are not limited to, delta T faults, faults related to a dismissal or a delay of an alert provided to a user, faults related to a filter change notification, an off fault which may indicate that the system was not responding or off for at least part of an HVAC operating cycle, an under fault which may indicate that the system was underperforming for at least part of an HVAC operating cycle, and an over fault which may indicate that the system was over performing for at last part of an HVAC operating cycle.

In some cases, diagnostic faults may be identified and classified by the HVAC controller 18 for each mode and/or stage combination of the HVAC system 4. For example, the HVAC controller 18 may identify a delta T fault while operating the first heating stage of the HVAC system 4, and this delta T fault may have a first fault type. Additionally, the HVAC controller may identify a delta T fault while operating the first heating stage and a second heating stage of the HVAC system 4, and this delta T fault may have a second fault type. These faults may be classified differently by the HVAC controller 18, and may be sorted and/or filtered accordingly. These are just some examples.

In some cases, the HVAC controller 18 may be configured to receive and accept a number for the predetermined number of faults for a particular fault type from a user via the user interface 48 of the HVAC controller 18. For example, and referring back to FIG. 18B, the HVAC controller 18 may be configured to display a user query screen such as, for example, user query screen 474 that may prompt or query a user to enter a number of faults of the same type such as, for example, a delta T fault that may occur before the HVAC controller 18 records a fault and/or provides an alert to the user that a fault has occurred. In some instances, as shown in the illustrative example provided in FIG. 18B, user query screen 474 may also be configured to query the user for a predetermined number of operating cycles of the HVAC system of which a particular fault type may occur before the fault is recorded and/or an alert is provided to the user by the HVAC controller 18. In some cases, the HVAC controller 18 may be configured to receive and accept a predetermined number of faults of a particular fault type and/or a predetermined number of cycles (or predetermined time period) over which the predetermined number of faults need to occur, for each mode and/or stage combination of the HVAC system 4.

In some cases, as described herein, the HVAC controller 18 may be configured to ignore (or allow) a diagnostic fault during one or more user specified conditions. For example, in some cases, during certain conditions that are sometimes specified by a user, the HVAC controller 18 may be configured to not record a detected fault and/or not provide an alert to the user that a fault has occurred. The conditions under which a diagnostic fault may be ignored by the HVAC controller 18 may relate to a variety of conditions including, but not limited to, an indoor air temperature, an indoor humidity level, an outdoor air temperature, an outdoor humidity level, call for humidification, a utility load shutoff event, a defrost cycle, among others. These are just some examples. More than one condition under which certain diagnostic faults may be ignored by the HVAC controller 18 may be specified by the user. In some cases, each condition under which certain diagnostic faults may be ignored by the HVAC controller 18 may be independent of one another.

In some cases, the period of time in which the HVAC system 4 did not meet an expected performance level may correspond to a period of time in which the current operating mode of the HVAC system 4 was subject to a utility load shutoff event or, in some case, a defrost cycle. In certain regions of the country, a user may opt to have a utility saver switch (not shown) applied to their HVAC system 4 in exchange for additional cost savings from the local utility company. During periods of heavy usage, the utility company may temporarily engage the utility saver switch, which may trigger a utility shutoff event for a user's HVAC system 4. For example, the utility company may remotely cycle a user's air conditioning system on and off for periods of time to reduce the overall peak energy usage on the utility system.

A utility load shutoff event or defrost cycle may not apply to all types of HVAC systems 4. Cooling systems that may include a utility shutoff saver switch may include those systems that have an electrically driven cooling stage, such as an air-to-air heat pump, air conditioning with an air-to-air heat exchanger, or sometimes a geothermal heat pump. Heating systems that may include a utility shutoff saver switch may include those systems that have an electrically driven heating stage. These are just some examples. In some cases, during the initial set-up the HVAC system 4, the user (e.g. installer) may indicate the type of heating and or cooling equipment through the user interface 48 of the HVAC controller 18, but this is not required. In other cases, the HVAC controller 18 may be configured to detect the equipment types for both heating and cooling upon activation of the HVAC controller 18. Upon indication of certain types of equipment, such as for example the HVAC equipment listed above, the HVAC controller 18 may be programmed to recognize that the HVAC system 4 may include a utility saver switch for either heating or cooling, as applicable, and therefore, under certain operating conditions, may be subject to a utility shutoff event.

When the HVAC controller 18 determines that the current performance of the HVAC system 4 has not met a minimum performance level, the HVAC controller 18 may display an alert indicating a diagnostic fault on the display 62 of the HVAC controller 18. Additionally, if the HVAC controller 18 determines that the HVAC equipment (as indicated by the user or detected by the HVAC controller 18) may be subject to a utility saver switch or defrost cycle, the alert may be appended with a statement that may indicate to the user that the fault may be due to a utility load shutoff event or defrost cycle.

Figure 28A:
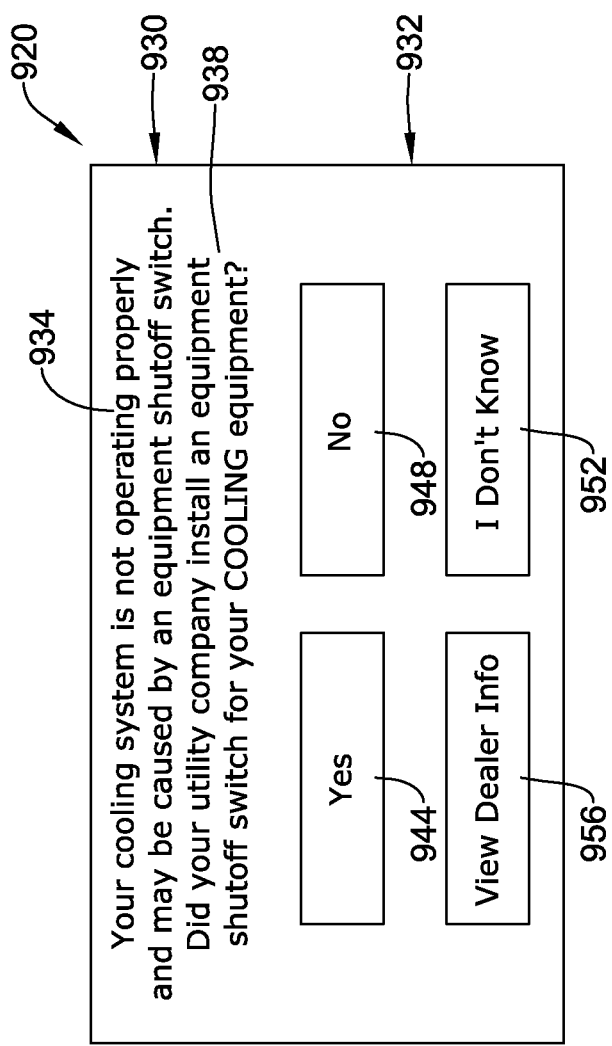
FIGS. 28A-28D and 29A-29B provide illustrative examples of screens that may be displayed upon the HVAC controllers of FIGS. 2 and 3 when the HVAC system may be subject to a utility saver switch.

FIGS. 28A-28D provide a number of illustrative screens 920, 930, 940, and 950 that may be displayed on the display 62 of the HVAC controller 18 to query a user about a utility shutoff event when the HVAC controller 18 determines that the HVAC system 4 has not met a minimum performance level, and that the HVAC system 4 may be subject to a utility saver switch. For example, FIG. 28A provides an illustrative screen 920 that may include an alert indicating that the HVAC system (e.g. cooling) is not operating properly and also may display a query as to whether a utility shutoff switch has been installed by the utility company for the cooling equipment. It must be understood that similar screens may be displayed relating one or more types of heating equipment of an HVAC system, as applicable.

User query screen 920, as shown in FIG. 28A may include a first region 930 and a second region 932. First region 930 may include a first user message 934 and a second user message 938. In some cases, the first user message 934 may include an alert indicating that the system is not operating properly. The first user message 934 may also include additional information about the system or the alert that may be useful to a user, if desired. In some cases, the second user message 938 may include a user query that queries a user about a utility saver switch or other condition (e.g. defrost cycle) that may have contributed to conditions that triggered the alert.

Second region 932 of screen 920 may include one or more options for responding to the second user message 938 containing the user query. In some cases, for example, second region 932 may include a first option 944 labeled "Yes", and a second option 948 labeled "No". Second region 932 may also include a third option 952 labeled "I don't know" or "Uncertain", which may allow a user to respond to the user query with some uncertainty. In some cases, the second region 932 may also include a fourth option 956 that, when selected, may present the user with information about a dealer or service company (e.g. phone number, email address, physical address, web address, etc.).

Figure 28B:
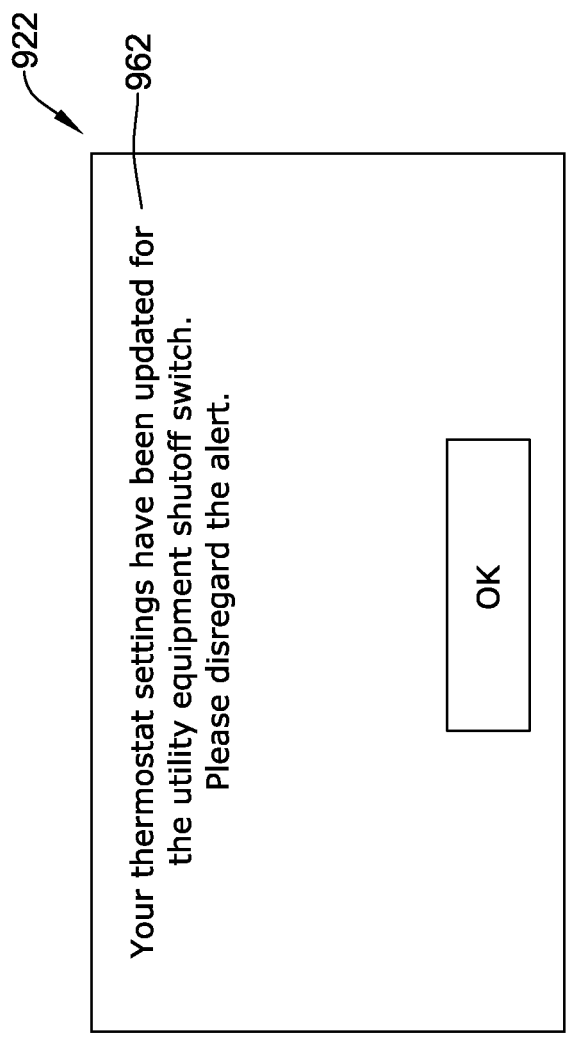

Upon selection of the first option 944 labeled "Yes", confirming that the current operating mode of the HVAC system (e.g. cooling) is subject to a utility saver switch, the HVAC controller 18 may be configured to display screen 922 shown in FIG. 28B. Screen 922 may include a user message 962 acknowledging confirmation of a utility saver switch. User message 962 may also indicate that the alert has been dismissed and that the user should disregard the alert. Additionally, screen 922 may include a button 966 labeled "OK" or "Done" that, when selected, may cause the HVAC controller 18 to display a home screen such as, for example, home screen 72 of FIG. 4A.

In some cases, upon receiving confirmation of a utility saver switch through the user interface, the HVAC controller 18 may be configured to update certain settings stored in the controller memory 52 pertaining to the HVAC system 4 setup and equipment configuration. By updating the equipment settings stored in the controller memory 52, the HVAC controller 18 may no longer display an alert to the user under certain conditions that may be triggered by a utility load shutoff event.

Figure 28C:
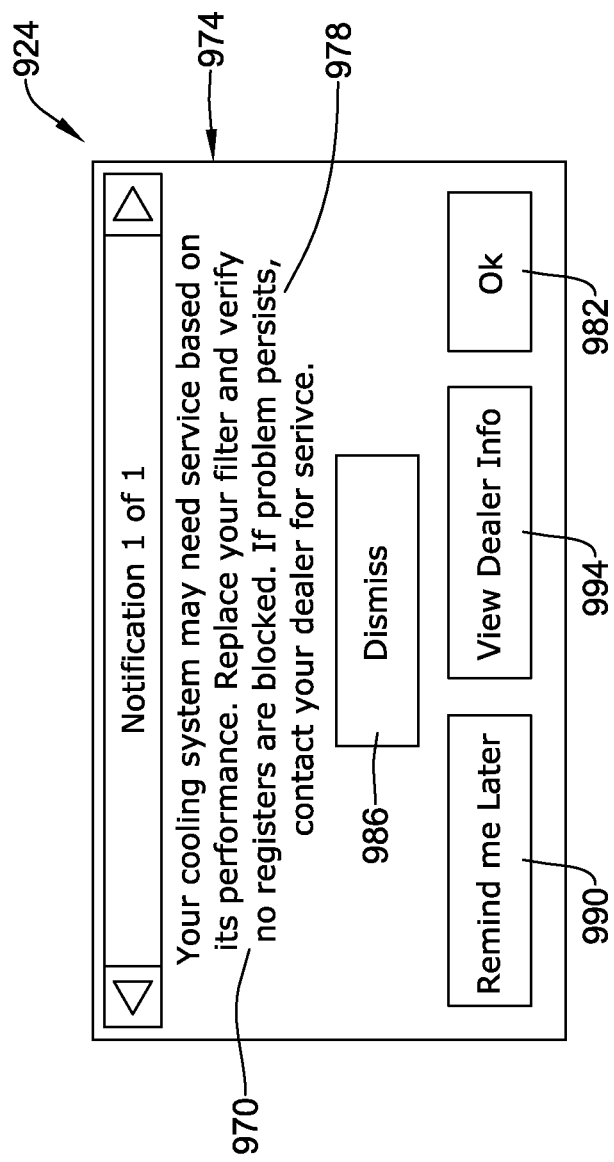

In some cases, if second option 948 labeled "No" is selected by a user indicating that the HVAC system is not subject to a utility saver switch, the HVAC controller 18 may be configured to display screen 924 as illustrated in FIG. 28C, which may include a further user message 970 in a first region 974 of screen 924. User message 970 may propose further possible causes for the alert and may include a user prompt 978 instructing the user to take a specific action. For example, user prompt 978 instructs the user to replace the air filter. User prompt 978 may also include additional information or instruction to the user. For example, user prompt 978 also instructs the user to contact a dealer if the problem persist.

In some cases, screen 924 may also include one or more options for responding to the user message 970 and/or user prompt 978. In some cases, screen 924 may display a first option 982. First option 982, when selected, may provide indication to the HVAC controller 18 that the instructed action was followed by the user. For example, first option 982 as shown in FIG. 28C provides confirmation to the HVAC controller 18 that a new filter was installed. Upon confirmation that a new filter was installed, the HVAC controller 18 may dismiss or delay the alert for a predetermined amount of time, or take some other action.

In some case, screen 924 may provide additional options for responding to the alert. For example, in some cases, screen 924 may provide an option 986 that, when selected, may instruct the HVAC controller 18 to clear or dismiss the alert. Screen 924 may provide another option 990 that, when selected, may delay or snooze the alert for a predetermined amount of time. Screen 924 may also provide an option 994 that, when selected, may display information about a dealer or service provider including relevant contact information. These are just some examples.

Figure 28D:
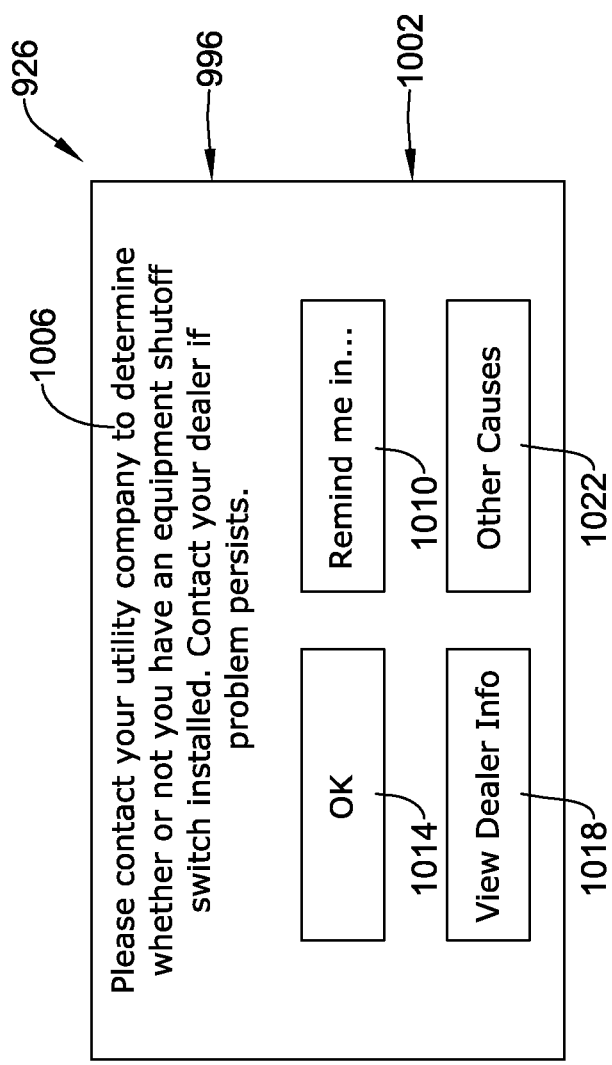

Referring back to FIG. 28A, in some cases, a user may be unaware or may not know whether or not a utility saver switch has been installed on their HVAC system 4. As such, a user may select third option 952 labeled "I don't know" or "Uncertain", thereby responding to the alert 934 displayed in the first region 930 of user query screen 920 with some uncertainty. Upon selection of third option 952, indicating that the user is uncertain as to whether or not their HVAC system 4 includes a utility saver switch, HVAC controller 18 may be programmed to display screen 926 as shown in FIG. 28D.

Screen 926 is divided into a first region 996 and a second region 1002 in the illustrative embodiment. First region 996 may include a user message 1006. User message 1006 may include additional instruction to the user about the alert displayed on screen 920 and/or may prompt the user to take action. For example, user message 1006 instructs the user to contact their utility company to determine if a utility saver switch has been installed. In some cases, user message 1006 may instruct the user to contact their dealer or service provider if the problem persists.

Screen 926 may provide one or more options for responding to the user message 1006 displayed in the first region 1002 of screen 926. In some cases, screen 926 provides at least one option 1010 that, when selected, allows a user to delay or snooze the alert 934 displayed on user query screen 920. Screen 926 may also include an option 1014 that, when selected, acknowledges the alert and which may cause the HVAC controller 18 to display a home screen such as, for example, home screen 72 of FIG. 4A. The HVAC controller 18 may or may not continue to display an alert to the user. Screen 926 may also include an option 1018 that, when selected, may cause the controller to display information about a dealer or service provide such that the user may contact the dealer or service provider. In some cases, screen 926 may include an option 1022 that, when selected, may cause the HVAC controller 18 to display a further screen that provides one or more possible causes for the alert. For example, in some cases, option 1022, when selected, may cause HVAC controller 18 to display a screen such as screen 924 of FIG. 28C, which may include a user message 970 suggesting that one possible cause for the alert may be a dirty filter and which may prompt the user to install a new filter. Additional potential causes may also be displayed, as appropriate.

While the illustrative screens 920, 922, 924 and 926 as shown in FIGS. 28A-28D generally relate to a utility shutoff event caused, at least in part, by a utility saver switch, it must be understood that the HVAC controller 18 may be programmed to display a similar set of screens on the display 62 of the HVAC controller 18 for events that may be caused, at least in part, by a defrost cycle. These are just some examples.

Figure 29A:
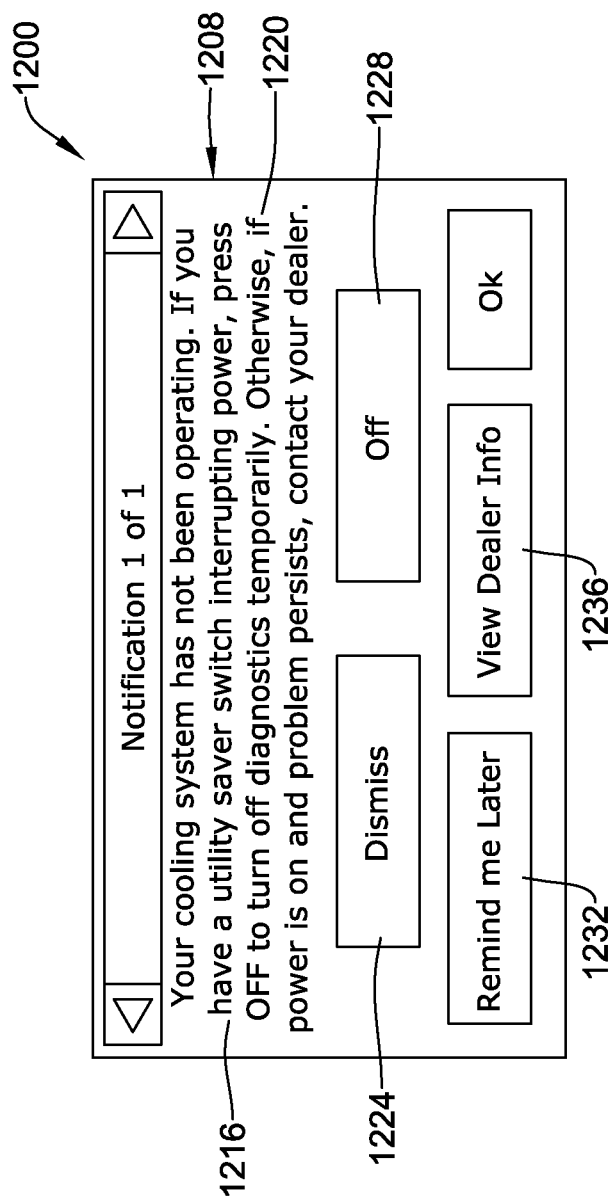
Figure 29B:
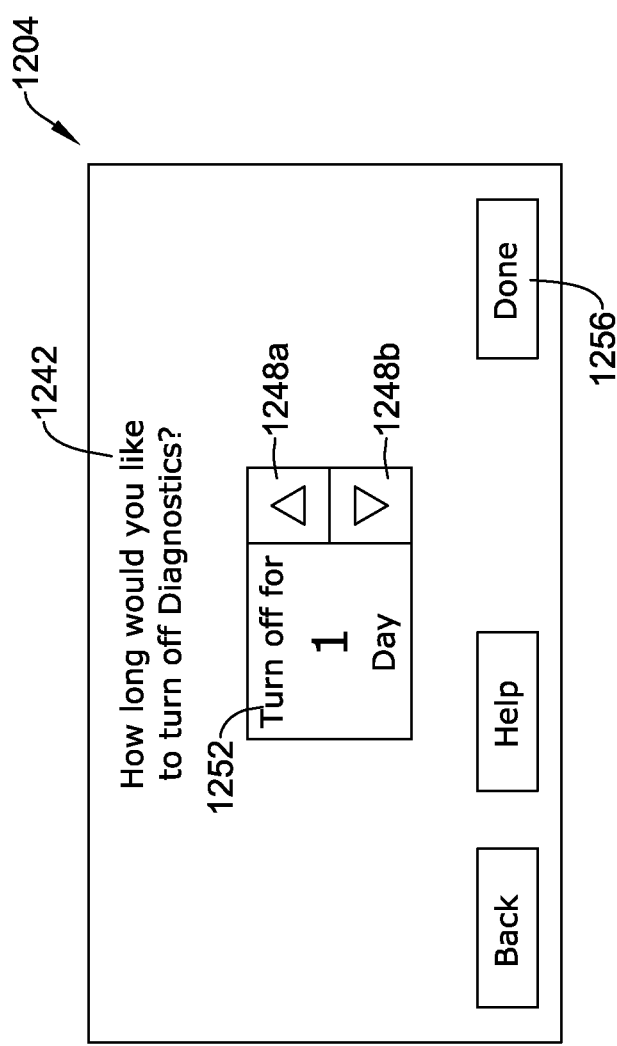

FIGS. 29A-29B provide another grouping of illustrative screens 1200 and 1204 that may be displayed on the display 62 of the HVAC controller 18 to query a user about a utility shutoff event when the HVAC controller 18 determines that the HVAC system 4 has not met a minimum performance level, and that the HVAC system 4 may be subject to a utility saver switch. For example, FIG. 29A provides an illustrative screen 1200 that may include an alert indicating that the HVAC system (e.g. cooling) is not operating properly, and that may instruct the user to take a certain action.

Screen 1200, as shown in FIG. 29A, may include a first region 1208 and a second region 1212. First region 1208 may include a first user message 1216 and a second user message 1220. In some cases, the first user message 1216 may include an alert indicating that the system is not operating properly. The first user message 1216 may also include additional information about the system or the alert that may be useful to a user, if desired. In some cases, the second user message 1220 may include a user instruction that may instruct a user to temporarily turn off diagnostics if the system includes a utility save switch and may be subject to a utility shutoff event.

Second region 1212 of screen 1200 may include one or more options for responding to the first and/or the second user message 1216 and/or 1220. In some cases, for example, second region 1212 may include a first option 1224 labeled "Dismiss", and a second option 1228 labeled "Off". Second region 932 may also include a third option 952 labeled "Remind me later," "Snooze," or "Delay," which may allow a user to temporarily snooze or delay the alert for a predetermined amount of time. In some cases, the second region 1220 may also include a fourth option 1236 that, when selected, may present the user with information about a dealer or service company (e.g. phone number, email address, physical address, web address, etc.).

Upon selection of the second option 924 labeled "Off", confirming that the current operating mode of the HVAC system (e.g. cooling) is subject to a utility saver switch, the HVAC controller 18 may be configured to display screen 1204 shown in FIG. 29B. Screen 1204 may include a user prompt 1242 that may prompt the user to set a period of time in which diagnostics may be temporarily disabled or turned off. The user may use the first and second arrow keys 1248a, 1248b to increase or decrease the period of time in which diagnostics may be turned off or temporarily disabled. The period of time may range from 1 day to several days. For example, in some cases, the period of time may range from 1 day up to 365 days. The value 1252 of the number of days set by the user may be displayed adjacent to the first and second arrow keys 1248a, 1248b, but this is not required. After the user has set a value 1252 for the number of days for which diagnostics may be disabled, the user may then select a button 1256 labeled "Done" or "OK" to confirm the number of days for which diagnostics may be disabled. Additionally, selection of button 1256 causes the controller 18 to temporarily disable diagnostics for the number of days set by the user.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An HVAC controller configured to control one or more components of an HVAC system that has a blower for supplying air from a return air duct to a supply air duct through an air-to-air heat exchanger, the HVAC controller comprising:
a user interface including a display;
a memory;

an I/O block configured to receive one or more signals from the HVAC system and configured to provide one or more control signals to the HVAC system;

a controller coupled to the memory, the user interface, and the I/O block, the controller configured to:

monitor one or more signals received via the I/O block that are related to a current performance level of the HVAC system, wherein the current performance level is based, at least in part, on a current delta T value across the air-to-air heat exchanger of the HVAC system that is derived from the one or more signals, wherein the current delta T value represents a difference between a return air temperature from the return air duct prior to passage through the heat exchanger and a discharge air temperature from the supply air duct after passage through the heat exchanger;

determine if the current performance level of the HVAC system falls and remains below a minimum performance level for at least a first predetermined amount of time, the controller configured to repeatedly update if the current performance level of the HVAC system remains below the minimum performance level for at least the first predetermined amount of time, wherein the minimum performance level of the HVAC system is based, at least in part, on a pre-determined minimum delta T limit across the air-to-air heat exchanger, wherein the pre-determined minimum delta T limit is stored in the memory;

display an alert on the display of the HVAC controller if the controller determines that the current performance level has fallen and remained below the minimum performance level for at least the first predetermined amount of time; and control the HVAC system based at least in part on one or more of the signals received via the I/O block.

2. The HVAC controller according to claim 1, wherein the controller removes the alert from the display of the HVAC controller if the current performance level subsequently rises and remains above the minimum performance level for at least a second predetermined amount of time.

3. The HVAC controller according to claim 2, wherein the first predetermined amount of time is different from the second predetermined amount of time.

4. The HVAC controller according to claim 1, wherein the first predetermined amount of time comprises a utility shutoff period component.

5. The HVAC controller according to claim 1, wherein the first predetermined amount of time comprises a defrost cycle period component.

6. The HVAC controller according to claim 1, wherein the HVAC system includes two or more stages, and wherein respective first predetermined amounts of time are stored in the memory of the HVAC controller for each of at least two stage combinations of the two or more stages.

7. The HVAC controller according to claim 6, wherein the controller of the HVAC system retrieves from the memory and then uses the particular first predetermined amount of time that corresponds to the currently active stage combination.

8. The HVAC controller according to claim 1, wherein the controller determines if the current performance level of the HVAC system falls and remains below the minimum performance level for at least the first predetermined amount of time during a single cycle of the HVAC system.

9. The HVAC controller according to claim 1, wherein the HVAC system comprises a forced air furnace, and the air-to-air heat exchanger is part of the forced air furnace.

10. The HVAC controller according to claim 1, wherein the controller records the alert in a log stored in the memory of the HVAC controller.

11. A method of monitoring operation of an HVAC system that includes a blower for supplying air from a return air duct to a supply air duct through an air-to-air heat exchanger, the HVAC system including one or more HVAC components that are controlled, at least in part, by an HVAC controller having a user interface with a display, a memory, a controller, and an I/O block configured to receive one or more signals from the HVAC system and configured to provide one or more control signals to the HVAC system, the method comprising:

receiving, by the I/O block of the HVAC controller, one or more signals from the HVAC system that are related to a current performance level of the HVAC system, wherein the current performance level is based, at least in part, on a current delta T value across the air-to-air heat exchanger of the HVAC system that is derived from the one or more signals from the HVAC system, wherein the current delta T value represents a difference between a return air temperature from the return air duct prior to passage through the heat exchanger and a discharge air temperature from the supply air duct after passage through the heat exchanger;

repeatedly updating, by the controller, the current performance level of the HVAC system over time to determine an amount of time that the current performance level of the HVAC system falls and remains below a minimum performance level, wherein the minimum performance level of the HVAC system is based, at least in part, on a pre-determined minimum delta T limit across the air-to-air heat exchanger, wherein the pre-determined minimum delta T limit is stored in the memory;

comparing, by the controller, the amount of time the current performance level of the HVAC system remains below the minimum performance level to a first pre-determined amount of time that is stored in the memory;

determining, by the controller, that the current performance level of the HVAC system is below the minimum performance level for at least the first predetermined amount of time and displaying an alert on the display of the HVAC controller in response to determining that the current performance level of the HVAC system is below the minimum performance level for at least the first predetermined amount of time; and controlling, by the controller, the HVAC system based at least in part on one or more of the signals received via the I/O block.

12. The method according to claim 11, further comprising:

determining, by the controller, that the current performance level subsequently rises and remains above the minimum performance level for at least a second predetermined amount of time; and removing, by the controller, the alert from the display of the HVAC controller in response to determining that the current performance level subsequently rises and remains above the minimum performance level for at least the second predetermined amount of time.

13. The method according to claim 12, wherein the first predetermined amount of time is different from the second predetermined amount of time.

14. The method according to claim 11, wherein the first predetermined amount of time comprises a utility shutoff period component.

15. The method according to claim 11, wherein the first predetermined amount of time comprises a defrost cycle period component.

16. The method according to claim 11, wherein the HVAC system includes two or more stages, and wherein respective first predetermined amounts of time are stored in the memory of the HVAC controller for each of at least two stage combinations of the two or more stages.

17. The method according to claim 16, further comprising, retrieving, by the controller and from the memory, the particular first predetermined amount of time that corresponds to a currently active stage combination for use in determining that the current performance level subsequently rises and remains above the minimum performance level for at least the first predetermined amount of time.

18. The method according to claim 11, wherein determining that the current performance level of the HVAC system falls and remains below the minimum performance level for at least the first predetermined amount of time comprises determining that the current performance level of the HVAC system falls and remains below the minimum performance level for at least the first predetermined amount of time during a single cycle of the HVAC system.

19. The method according to claim 11, wherein the HVAC system comprises a forced air furnace, and the air-to-air heat exchanger is part of the forced air furnace.

20. The method according to claim 11, further comprising recording the alert in a log stored in the memory of the HVAC controller.

21. An HVAC controller configured to control one or more components of a forced air furnace that includes a blower for supplying air from a return air duct to a supply air duct through an air-to-air heat exchanger, the HVAC controller comprising:

a user interface including a display;
a memory;
an I/O block configured to receive one or more signals from the forced air furnace and configured to provide one or more control signals to the forced air furnace; and
a controller coupled to the memory, the user interface and the I/O block, the controller configured to:
   monitor one or more signals received via the I/O block that are related to a current delta T of the forced air furnace, wherein the current delta T is representative of a temperature difference across the air-to-air heat exchanger of the forced air furnace, and wherein the current delta T value represents a difference between a return air temperature from the return air duct prior to passage through the heat exchanger and a discharge air temperature from the supply air duct after passage through the heat exchanger;
   determine if the current delta T of the forced air furnace falls and remains below a minimum delta T limit across the forced air furnace for at least a first predetermined amount of time during a single cycle of the forced air furnace, the controller configured to repeatedly update if the current delta T of the forced air furnace remains below the minimum delta T limit for at least the first predetermined amount of time;
   display an alert on the display of the HVAC controller if the controller determines that the current delta T of the forced air furnace falls and remains below the minimum delta T limit for at least the first predetermined amount of time;
   remove the alert from the display of the HVAC controller if the current delta T subsequently rises and remains above the minimum delta T limit for at least a second predetermined amount of time; and
   control the forced air furnace based at least in part on one or more of the signals received via the I/O block.

* * * * *